(12) United States Patent
Iwamoto

(10) Patent No.: US 8,199,283 B2
(45) Date of Patent: Jun. 12, 2012

(54) VERTICAL ALIGNMENT TYPE LIQUID CRYSTAL DISPLAY DEVICE WITH VIEWING ANGLE CHARACTERISTICS IMPROVED BY DISPOSING OPTICAL PLATES

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 554 days.

(21) Appl. No.: 12/367,680

(22) Filed: Feb. 9, 2009

(65) Prior Publication Data
US 2009/0213313 A1   Aug. 27, 2009

(30) Foreign Application Priority Data

Feb. 27, 2008 (JP) ................. 2008-046597
Feb. 27, 2008 (JP) ................. 2008-046599
Mar. 26, 2008 (JP) ................. 2008-081583

(51) Int. Cl.
*G02F 1/1335* (2006.01)
(52) U.S. Cl. ........... 349/102; 349/96; 349/118; 349/119
(58) Field of Classification Search ............ 349/96–103, 349/117–119, 130
See application file for complete search history.

(56) References Cited

U.S. PATENT DOCUMENTS

| | | | |
|---|---|---|---|
| 4,889,412 A | 12/1989 | Clerc et al. | |
| 5,751,384 A * | 5/1998 | Sharp | 349/18 |
| 6,339,460 B1 | 1/2002 | Saitoh | |
| 6,642,981 B1 | 11/2003 | Ohmuro et al. | |
| 6,693,692 B1 * | 2/2004 | Kaneko et al. | 349/117 |
| 6,791,650 B2 | 9/2004 | Tanuma et al. | |
| 7,667,802 B2 | 2/2010 | Ohsawa et al. | |
| 7,880,839 B2 | 2/2011 | Nakamura | |
| 7,948,591 B2 | 5/2011 | Sakai | |
| 2003/0169391 A1 | 9/2003 | Uchida et al. | |
| 2009/0122243 A1 * | 5/2009 | Sugiyama et al. | 349/118 |

FOREIGN PATENT DOCUMENTS

| | | |
|---|---|---|
| JP | 62-210423 A | 9/1987 |
| JP | 2000-039610 A | 2/2000 |
| JP | 2000-131693 A | 5/2000 |
| JP | 2003-262869 A | 9/2003 |
| JP | 2005-234254 A | 9/2005 |

* cited by examiner

*Primary Examiner* — Dung T. Nguyen
(74) *Attorney, Agent, or Firm* — Holtz, Holtz, Goodman & Chick, PC

(57) ABSTRACT

First and second polarizers are disposed in cross Nichol configuration. A liquid crystal cell is disposed between the two polarizers and establishes vertical alignment in a state of no voltage application. An even number of optical films having optical anisotropy and disposed between the liquid crystal cell and first polarizer. A retardation of the liquid crystal cell is in a range between 300 nm and 1500 nm; and each optical film satisfies nx>ny≧nz, an in-plane retardation is smaller than 300 nm, a thickness direction retardation is in a ranger between 50 nm and 300 nm, an angle between an in-plane slow axis of the optical film disposed nearest to the first polarizer and an absorption axis of the first polarizer is smaller than 45°, and the slow axes of mutually adjacent optical films are perpendicular to each other.

8 Claims, 35 Drawing Sheets

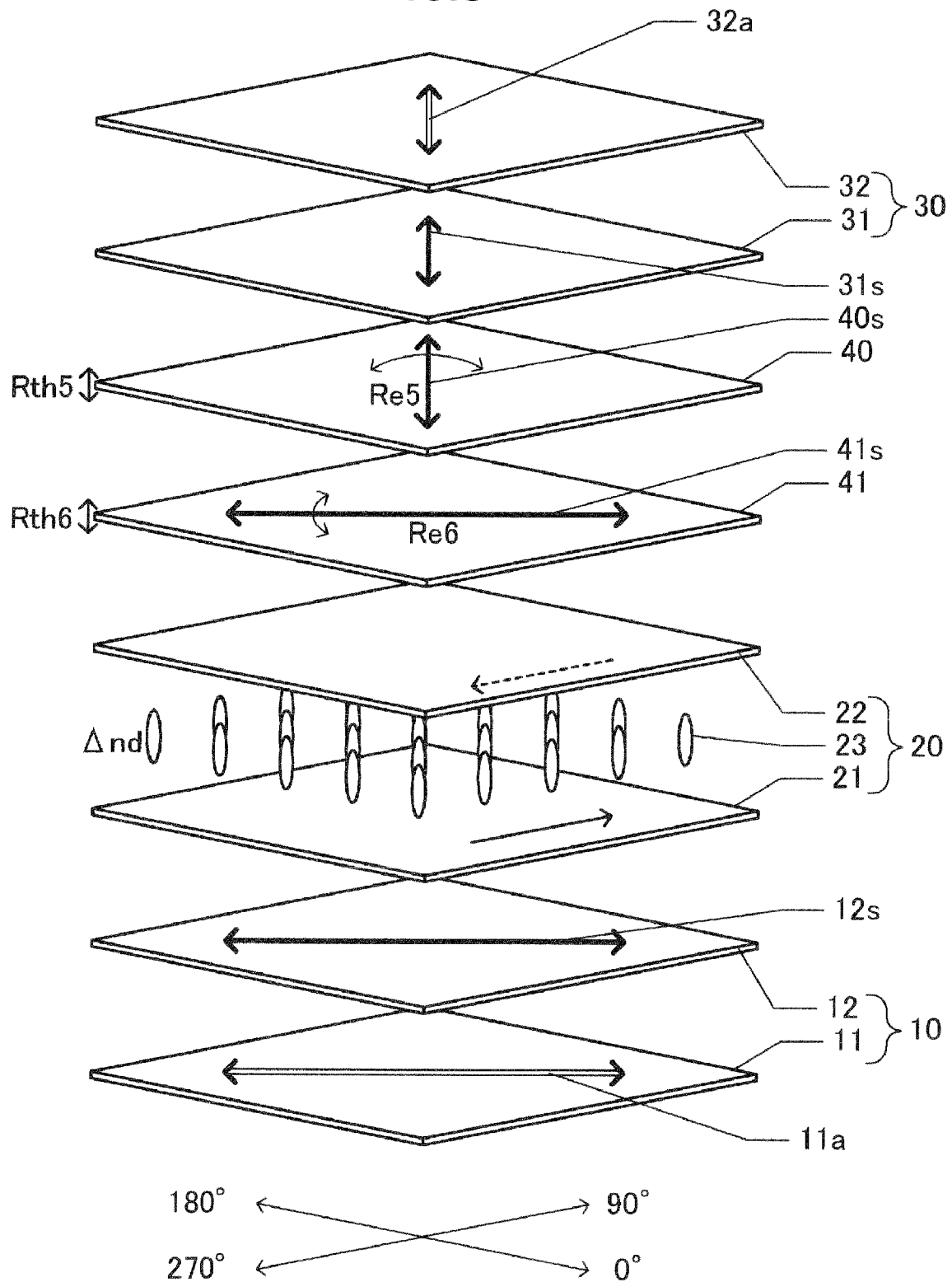

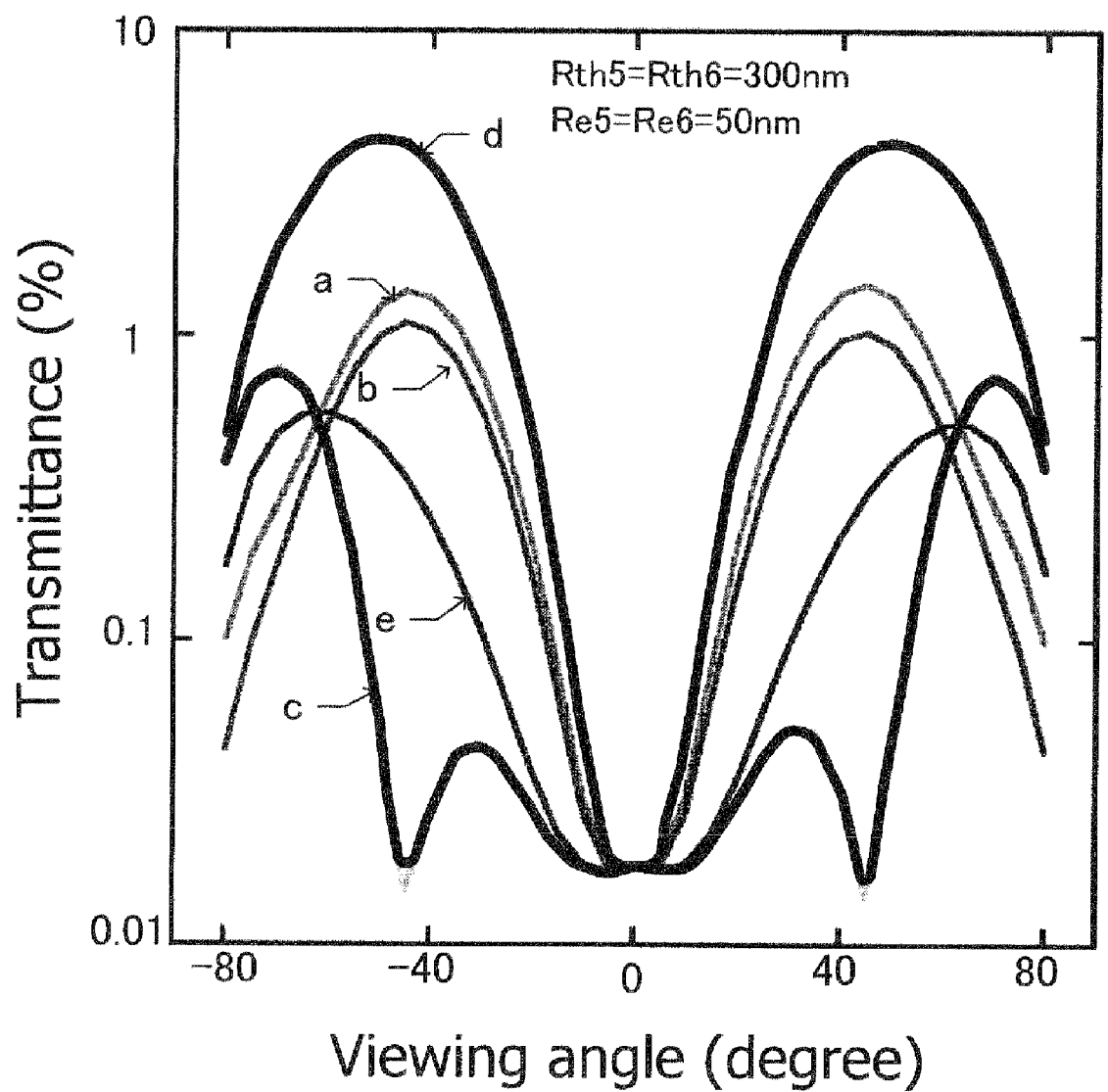

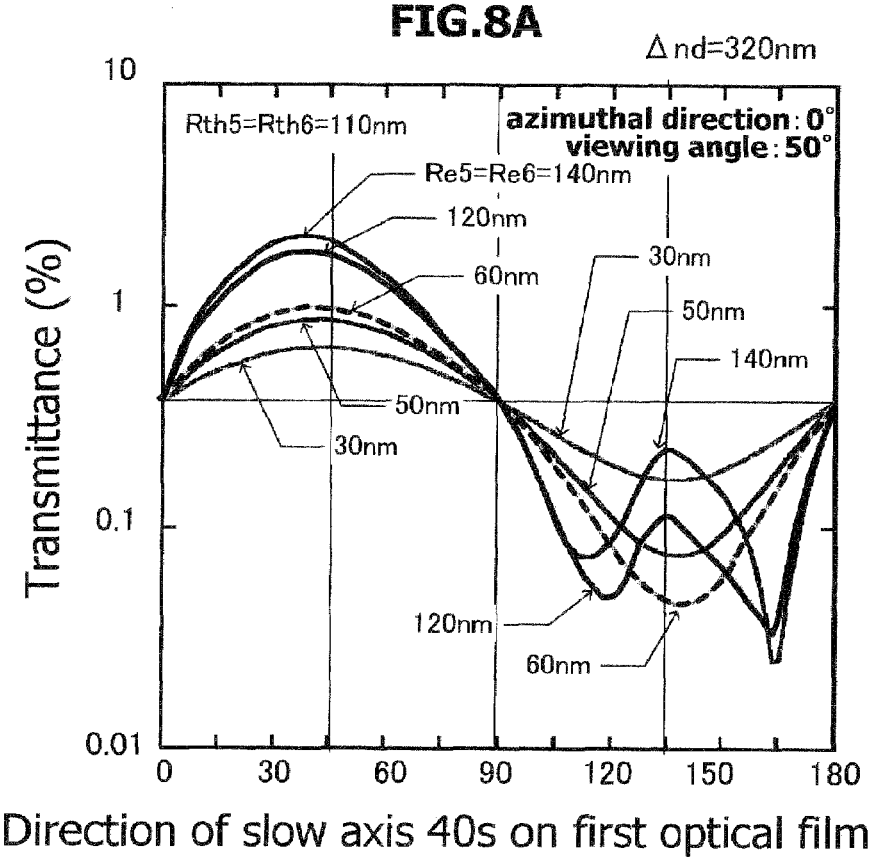
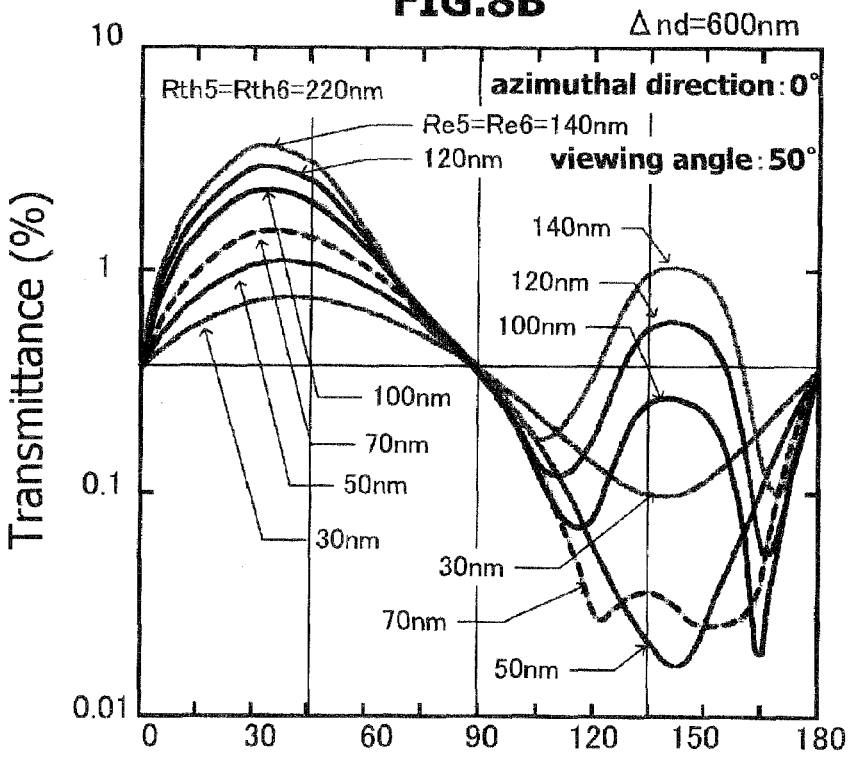

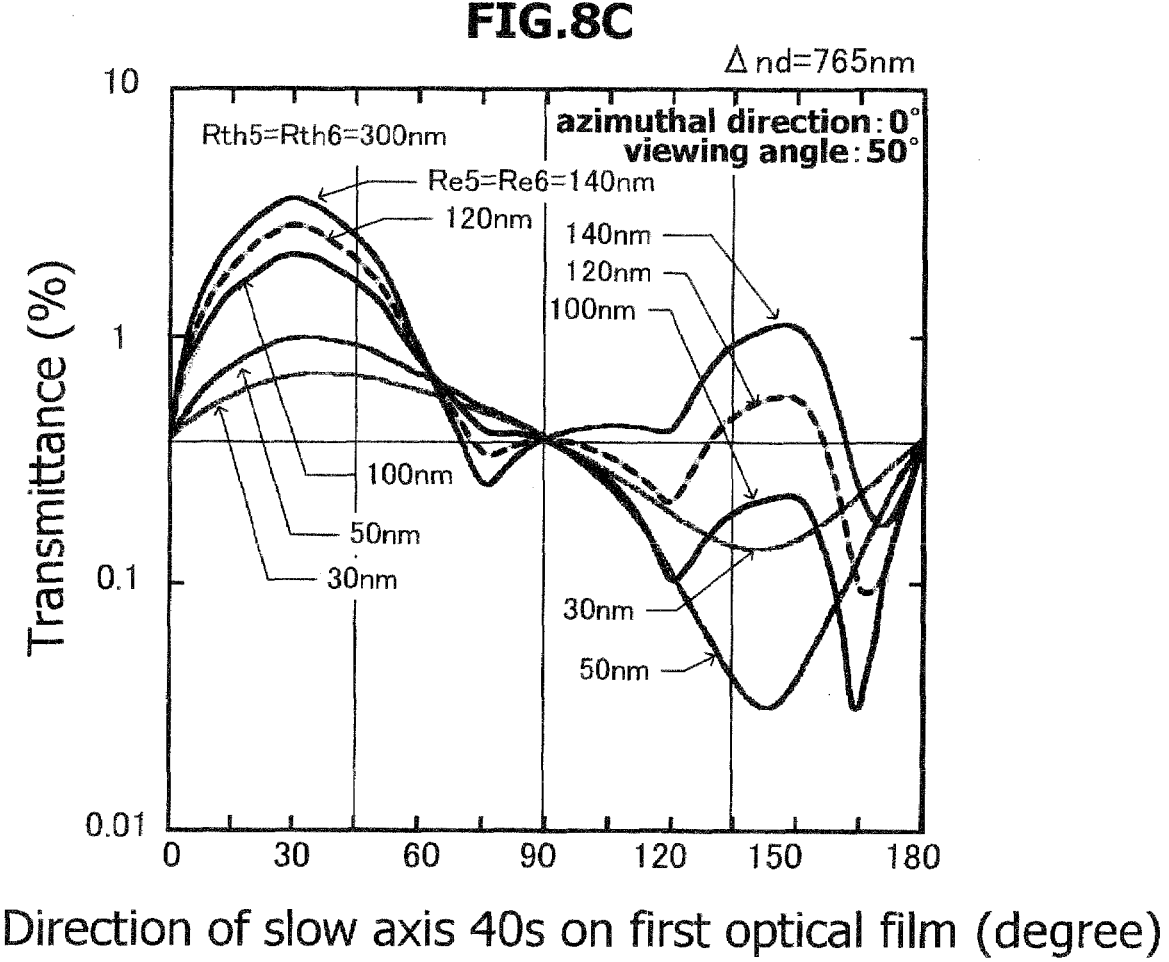

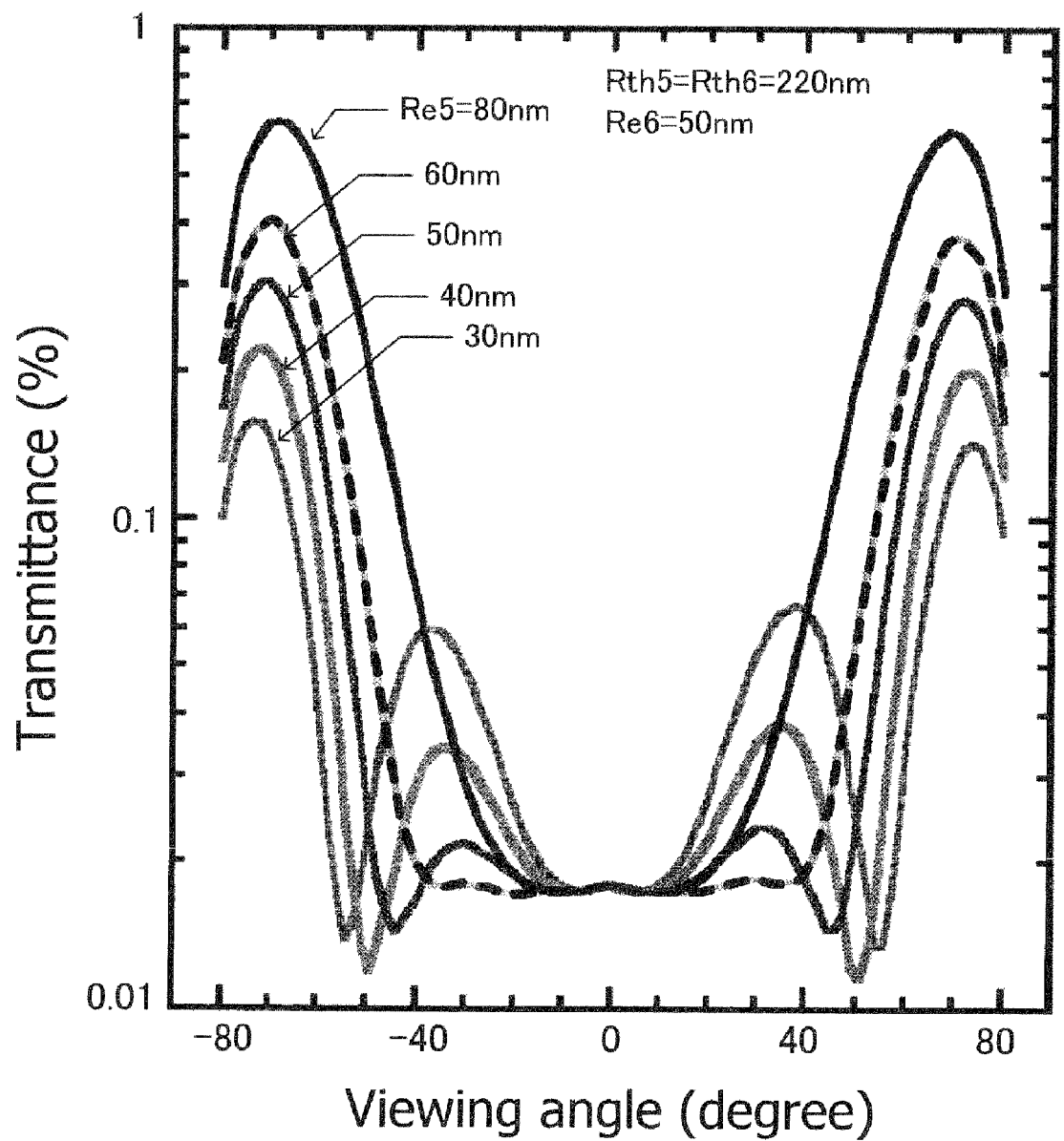

Φ5=45°
Φ6=90°

Φ5=135°
Φ6=30°

Φ5=135°
Φ6=45°

Φ5=135°
Φ6=60°

VERTICAL ALIGNMENT TYPE LIQUID CRYSTAL DISPLAY DEVICE WITH VIEWING ANGLE CHARACTERISTICS IMPROVED BY DISPOSING OPTICAL PLATES

CROSS REFERENCE TO RELATED APPLICATION

This application is based on and claims priority of Japanese Patent Applications Nos. 2008-046599, 2008-046597 and 2008-081583, filed on Feb. 27, 2008, Feb. 27, 2008 and Mar. 26, 2008, the entire contents of which are incorporated herein by reference.

FIELD

The present invention relates to a liquid crystal display device having vertically aligned liquid crystal molecules and a pair of cross-Nichol disposed polarizers.

BACKGROUND

As an in-vehicle display device, a liquid crystal display device capable of reducing the weight and using a battery equipped in a vehicle without change has been paid attention. There is a need of lowering brightness of a background display area and a dark display area in order to enhance expensive looking. A normally black type liquid crystal display unit has been developed which uses a light emitting diode as a light source of a backlight to emit light generally at a single wavelength and increase a contrast dramatically only in this wavelength range.

A display device utilizing a vertical alignment mode (VA mode) liquid crystal cell has been paid attention as a liquid crystal display device capable of realizing high-quality normally black display independent from an emission wavelength of a backlight. In a VA mode liquid crystal cell, liquid crystal molecules are vertically aligned relative to a substrate surface when voltage is not applied or off-voltage is applied (collectively called "in an off state" in some cases). "Vertically aligned" does not mean that a direction of a director of liquid crystal molecules is strictly vertical to the substrate surface, but it means that the director of liquid crystal molecules is aligned along a direction nearly vertical to the substrate surface as compared to that the director is inclined from a substrate normal direction when voltage is applied (called "in an on state" in some cases). This liquid crystal cell is disposed between two polarizers in approximately cross-Nichol configuration to constitute a liquid crystal display unit and realize normally black display.

The optical characteristics of a vertical alignment mode liquid crystal cell are approximately isotropic when observed along a substrate normal direction, and the optical characteristics of a liquid crystal display unit are influenced by the optical characteristics of polarizers in cross-Nichol configuration. A transmittance becomes therefore very low, and a high contrast can be realized relatively easily. However, when observed along an oblique direction, optical leak occurs in the black display state. This is because birefringence occurs in the liquid crystal layer, and the transmission axes of two polarizers shift from the perpendicular relation. In order to suppress a contrast, when observed along an oblique direction, from being lowered, the following various methods have been proposed.

JP-SHO-62-210423 discloses a liquid crystal display unit having a viewing angle compensator having negative uniaxial optical anisotropy or negative biaxial optical anisotropy inserted at one or both positions between a liquid crystal cell and two polarizers. The positive optical anisotropy of a liquid crystal cell in a thickness direction is compensated by the viewing angle compensator having the negative optical anisotropy in a thickness direction. The "viewing angle compensator having the negative biaxial optical anisotropy" means a viewing angle compensator having a relation of nx>ny>nz where nx, ny and nz are x-, y- and z-components of a refractive index in which an x-axis is a slow (lag phase) axis direction in an in-plane of a substrate or film, a y-axis is a fast (advance phase) axis direction and a z-axis is a thickness direction. The "viewing angle compensator having the negative uniaxial optical anisotropy" means a viewing angle compensator having a relation of nx=ny>nz. JP-A-2000-131693 discloses the effective conditions for an in-plane phase difference and an arrangement of the azimuth of an in-plane slow axis of a viewing angle compensator having biaxial optical anisotropy.

A viewing angle compensator having negative uniaxial optical anisotropy is called a "negative C plate". A viewing angle compensator having negative biaxial optical anisotropy is herein called a "negative biaxial film". A viewing angle compensator having positive uniaxial optical anisotropy with its slow axis being oriented in an in-plane direction, i.e., an optical film having a relation of nx>ny=nz, is called a "positive A plate". The positive A plate can be considered as a special example wherein the refractive indices ny and nz of a negative biaxial film are equal to each other.

JP-A-2000-39610 discloses a method of using an approximately half-wavelength plate having biaxial optical anisotropy, and a negative C plate. With this method, since the half-wavelength plate is required to provide a phase difference of approximately a half wavelength when observed along any direction, a half wavelength plate having positive biaxial optical anisotropy is required in practical uses. However, it is difficult to realize a half-wavelength plate having positive biaxial optical anisotropy.

JP-A-2003-262869 discloses a method of using a combination of a negative biaxial film and a negative C plate. With this method, an in-plane retardation of the biaxial film is limited to 190 nm or smaller, and a retardation of a liquid crystal layer is limited to 200 to 500 nm. A retardation of a liquid crystal layer is represented by Δnd where Δn is refractive index anisotropy of liquid crystal material and d is a thickness of the liquid crystal layer.

SUMMARY

It is known that an increase in a retardation of a liquid crystal cell is effective for promoting steepness of a change in a transmittance with respect to a change in voltage applied to a liquid crystal display device. In order to multiplex-drive a VA mode liquid crystal display unit at a duty of ¼ to ¹⁄₂₄₀, it is preferable to set a retardation Δnd of a liquid crystal layer larger than 320 nm, and more preferably larger than 360 nm. This is because as a retardation of the liquid crystal layer becomes small, it becomes difficult to maintain both the high contrast characteristics, which is a feature of a normally black type VA mode liquid crystal display unit, and a high transmittance during an on-voltage application in high duty driving.

Negative biaxial films are distributed in markets which are formed by executing a biaxial stretching process for a base film made of norbornene based cyclic olefin polymer (hereinafter described as "norbornene based COP") or by executing a stretching process for a triacethyl cellulose (hereinafter described as "TAC") base film.

From the viewpoint of ensuring in-plane uniformity of a retardation, generally a negative biaxial film made of norbornene based COP has ranges of an in-plane retardation Re of 30 nm to 300 nm, a thickness direction retardation Rth of 300 nm or smaller and an Nz factor of 1 to 12. Re, Rth and Nz are given by Re=(nx−ny)/d, Rth=((nx+ny)/2−nz)×d, and Nz=(nx−nz)/(nx−ny), where nx is a refractive index in an in-plane slow axis direction, ny is a refractive index in an in-plane fast axis direction, nz is a refractive index in a thickness direction and d is a thickness. It is difficult to ensure in-plane uniformity of a retardation of a biaxial film having Re, Rth and Nz in excess of the above-described ranges.

The ranges of a retardation and Nz factor of a TAC based biaxial film distributed in markets are narrower than a biaxial film using norbornene based COP. Generally, an in-plane retardation Re is in a range between 40 nm and 70 nm, and a thickness direction retardation Rth is in a range between 120 nm and 220 nm.

An ideal C plate has an in-plane retardation Re of 0, whereas an in-plane retardation Re of a C plate actually distributed in markets is not strictly 0. An in-plane retardation Re of a general C plate is set preferably to 7 nm or smaller, and more preferably to 5 nm or smaller. C plates widely distributed in markets are TAC films having a thickness direction retardation Rth of about 50 nm, and it is difficult to purchase C plates having a different thickness direction retardation Rth.

A range of a retardation of a liquid crystal layer is restricted when viewing angle compensation for a normally black type VA mode liquid crystal display unit is performed by a conventional viewing angle compensation method using a negative biaxial film and a negative C plate generally available in markets.

An object of the present invention is to provide a liquid crystal display unit capable of having a wide retardation range of a liquid crystal cell whose viewing angle can be compensated by using readily available optical anisotropic films.

According to one aspect of the present invention, there is provided a liquid crystal display device comprising:
first and second polarizers mutually cross Nichol disposed;
a liquid crystal cell disposed between the first and second polarizers and establishing vertical alignment in a state of no voltage application; and
an even number of optical films having optical anisotropy and disposed between the liquid crystal cell and the first polarizer,
wherein:
a retardation of the liquid crystal cell is not smaller than 300 nm and not larger than 1500 nm; and
each of the optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is an azimuth perpendicular to a film surface, an in-plane retardation is not larger than 300 nm, a thickness direction retardation is not smaller than 50 nm and not larger than 300 nm, an angle between an in-plane slow axis of the optical film disposed nearest to the first polarizer and an absorption axis of the first polarizer is not larger than 45°, and the slow axes of mutually adjacent optical films are mutually perpendicular.

According to another aspect of the present invention, there is provided a liquid crystal display device comprising:
first and second polarizers mutually cross Nichol disposed;
a liquid crystal cell disposed between the first and second polarizers and establishing vertical alignment in a state of no voltage application; and
an odd number of three or more optical films having optical anisotropy and disposed between the liquid crystal cell and the first polarizer,
wherein:
a retardation of the liquid crystal cell is not smaller than 550 nm and not larger than 1500 nm; and
each of the optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is an azimuth perpendicular to a film surface, an in-plane retardation is not smaller than 30 nm not larger than 300 nm, a thickness direction retardation is not smaller than 50 nm and not larger than 300 nm, an angle between an in-plane slow axis of the optical film disposed nearest to the first polarizer and an absorption axis of the first polarizer is not smaller than 45° and not larger than 135°, and the slow axes of mutually adjacent optical films are mutually perpendicular.

According to another aspect of the present invention, there is provided a liquid crystal display device comprising:
first and second polarizers mutually cross Nichol disposed;
a liquid crystal cell disposed between the first and second polarizers and establishing vertical alignment in a state of no voltage application; and
a first optical film disposed between the liquid crystal cell and the first polarizer and having optical anisotropy;
a second optical film disposed between the first optical film and the liquid crystal cell and having optical anisotropy; and
a third optical film disposed between the second polarizer and the liquid crystal cell and having optical anisotropy;
wherein:
each of the first to third optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is an azimuth perpendicular to a film surface, an in-plane retardation is not smaller than 0 nm and not larger than 300 nm, and a thickness direction retardation is not smaller than 50 nm and not larger than 300 nm;
a slow axis of the first optical film is parallel to an absorption axis of the first polarizer;
a slow axis of the second optical film and a slow axis of the third optical film are mutually perpendicular; and
an angle between an in-plane axis of the second optical film and an absorption is 75° to 105°.

According to another aspect of the present invention, there is provided a liquid crystal display device comprising:
a liquid crystal cell establishing vertical alignment in a state of not voltage application;
first and second polarizers mutually cross Nichol disposed and sandwiching the liquid crystal cell;
a first optical film disposed between the liquid crystal cell and the first polarizer and having optical anisotropy;
a second optical film disposed between the first optical film and the liquid crystal cell and having optical anisotropy;
a third optical film disposed between the second polarizer and the liquid crystal cell and having optical anisotropy; and
a fourth optical film disposed between the third optical film and the second polarizer and having optical anisotropy,
wherein:
each of the first to fourth optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is an azimuth perpendicular to a film surface, and the first to fourth optical films have approximately same optical characteristics;

a slow axis of the first optical film is approximately parallel to an absorption axis of the first polarizer;

a slow axis of the first optical film is approximately perpendicular to a slow axis of the second optical film;

a slow axis of the fourth optical film is approximately parallel to an absorption axis of the second polarizer; and a slow axis of the third optical film is approximately perpendicular to a slow axis of the fourth optical film.

By disposing a plurality of optical films having the above-described optical anisotropy, it becomes possible to adopt readily available optical films.

By disposing two optical films having the above-described optical anisotropy on each side, it becomes possible to broaden the range capable of compensating a viewing angle.

BRIEF DESCRIPTION OF THE DRAWINGS

FIG. 5 is a schematic diagram showing the outline structure of a liquid crystal display unit according to a first embodiment.

FIGS. 7A to 7C are graphs showing viewing angle characteristics of the liquid crystal display unit shown in FIG. 5.

FIGS. 8A to 8C are graphs showing the relation between an azimuth of an in-plane slow axis and a transmittance of a first optical film of the liquid crystal display unit shown in FIG. 5.

FIG. 9 is a graph showing the viewing angle characteristics of the liquid crystal display unit shown in FIG. 5.

DESCRIPTION OF EMBODIMENTS

Description will now be made on preferred conditions for improving the viewing angle characteristics in black state of a normally black type VA mode liquid crystal display unit, by using a conventional optical film arrangement.

Figure 1:
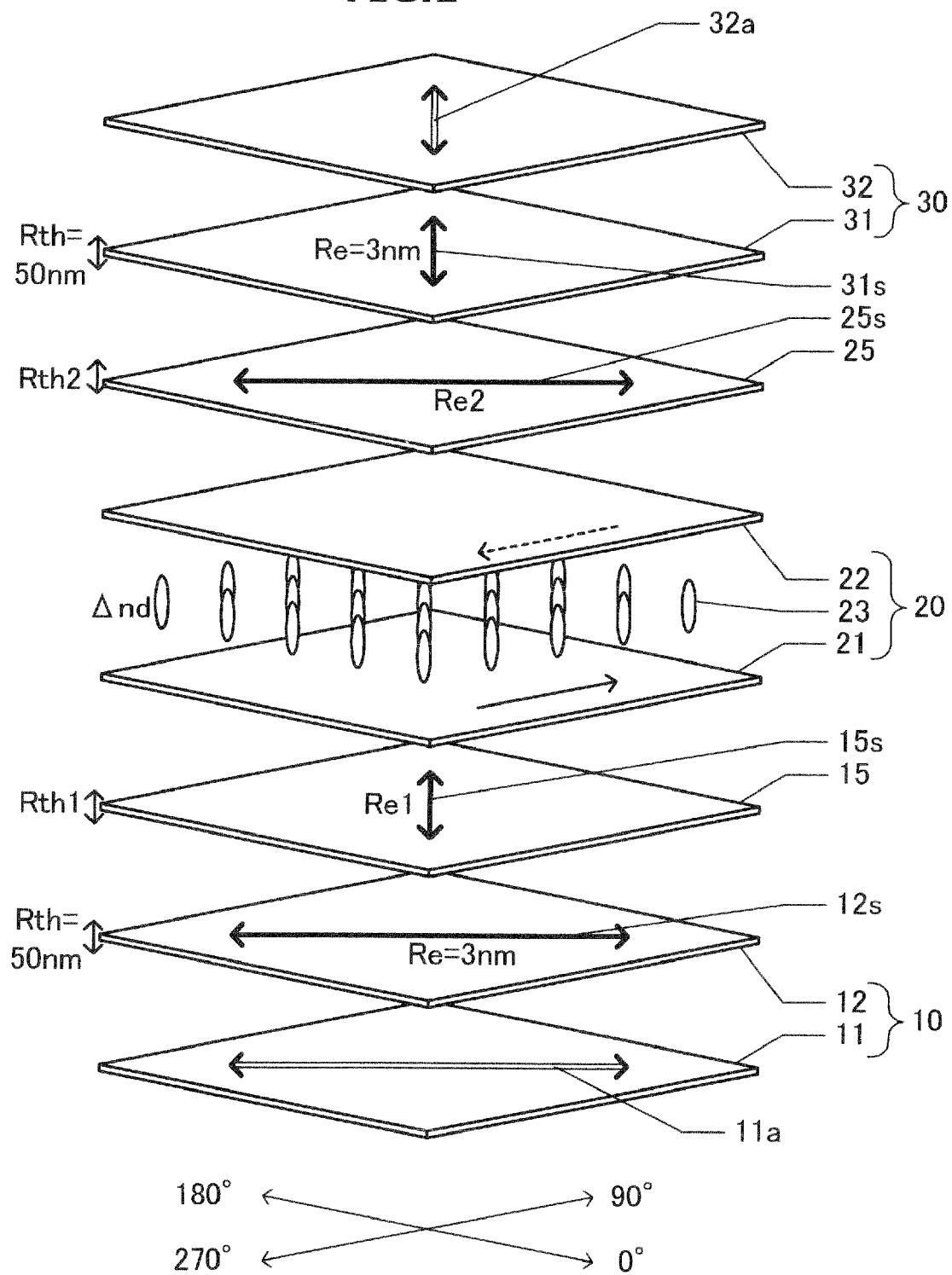
FIG. 1 is a schematic diagram showing the outline structure of a liquid crystal display unit according to a reference example.

FIG. 1 is a schematic diagram showing a conventional normally black type VA mode liquid crystal display unit. A liquid crystal cell 20 is disposed between a rear side polarizer 10 and a front side polarizer 30 in cross-Nichol configuration. A negative biaxial film 15 is disposed between the rear side polarizer 10 and liquid crystal cell 20. Another negative biaxial film 25 is disposed between the front side polarizer 30 and liquid crystal cell 20.

The liquid crystal cell 20 includes a pair of substrates 21 and 22 and liquid crystal material 23 held in a space between the substrates. Common electrodes and segment electrodes are formed on opposing surfaces of the substrates 21 and 22, respectively, and vertical alignment films are also formed on the opposing surfaces. The vertical alignment films have already been subjected to a rubbing process to obtain mutually antiparallel rubbing directions. This rubbing process may use the method disclosed, e.g., in JP-A-2005-234254.

A distance between the substrates 21 and 22 is adjusted by a spherical spacer to set a distance of, e.g., 2 to 6 μm. A refractive index anisotropy Δn of the liquid crystal material is in a range between 0.08 and 0.25, and a dielectric constant anisotropy Δε is negative. A pretilt angle (angle between a director of liquid crystal molecules and a substrate surface) is about 89.9°. Since liquid crystal molecules are oriented generally vertically to the substrate surface, the liquid crystal layer is isotropic when observed along a substrate normal direction. After the liquid crystal material 23 is injected between the substrate 21 and 22, the liquid crystal layer is cured for one hour at a temperature higher by about 20° C. than an isotropic phase temperature to obtain the liquid crystal cell 20.

As the rear side polarizer 10 and front side polarizer 30, SHC13U manufactured by Polatechno Co. Ltd. may be used. The rear side polarizer 10 is constituted of a TAC base film 12 and a polarizing layer 11 formed on the surface of the TAC base film 12. The front side polarizer 30 is constituted of a TAC base film 31 and a polarizing layer 32. The TAC base films 12 and 31 are disposed at positions inner than the polarizing layers 11 and 32 (on the liquid crystal cell 20 side). An in-plane retardation Re of each of the TAC base films 12 and 31 is 3 nm, and a thickness direction retardation Rth is 50 nm. Outer surfaces of the polarizing layers 11 and 32 are covered with a protective film made of TAC or the like.

As the negative biaxial films 15 and 25, for example, a norbornene based COP film subjected to a biaxial stretching process may be used. The optical characteristics of both the films were set equal to each other. Namely, an in-plane retardation Re1 of the biaxial film 15 is equal to an in-plane retardation Re2 of the biaxial film 25, and a thickness direction retardation Rth1 of the biaxial film 15 is equal to a thickness direction retardation Rth2 of the biaxial film 25.

A backlight is disposed outside the rear side polarizer 10, and the liquid crystal display unit is visually observed from the side of the front side polarizer 30.

Azimuth angles are defined in such a manner that in a state that the liquid crystal display unit is observed from the front side, right and left are at 0° and 180° and up and down are at 90° and 270°, respectively. Azimuths of an absorption axis 11a and an in-plane slow axis 12s of the rear side polarizer 10 are set to 45°, and azimuths of an absorption axis 32a and an in-plane slow axis 31s of the front side polarizer 30 are set to 135°.

An in-plane slow axis 15s of the negative biaxial film 15 disposed on the rear side is set to an azimuth perpendicular to the absorption axis 11a of the nearby rear side polarizer 10, i.e., to an azimuth of 135°. An in-plane slow axis 25s of the negative biaxial film 25 disposed on the front side is set to an azimuth perpendicular to the absorption axis 32a of the nearby front side polarizer 30, i.e., to an azimuth of 45°.

An azimuth of pretilt of the liquid crystal material 23 of the liquid crystal cell 20 is set to 90°.

The relation between a transmittance and an in-plane retardation Re of the biaxial film when observing the liquid crystal display unit in a black state at a viewing angle of 45° is calculated by simulation, at retardations Δnd of 360 nm, 600 nm and 900 nm.

Figure 2:
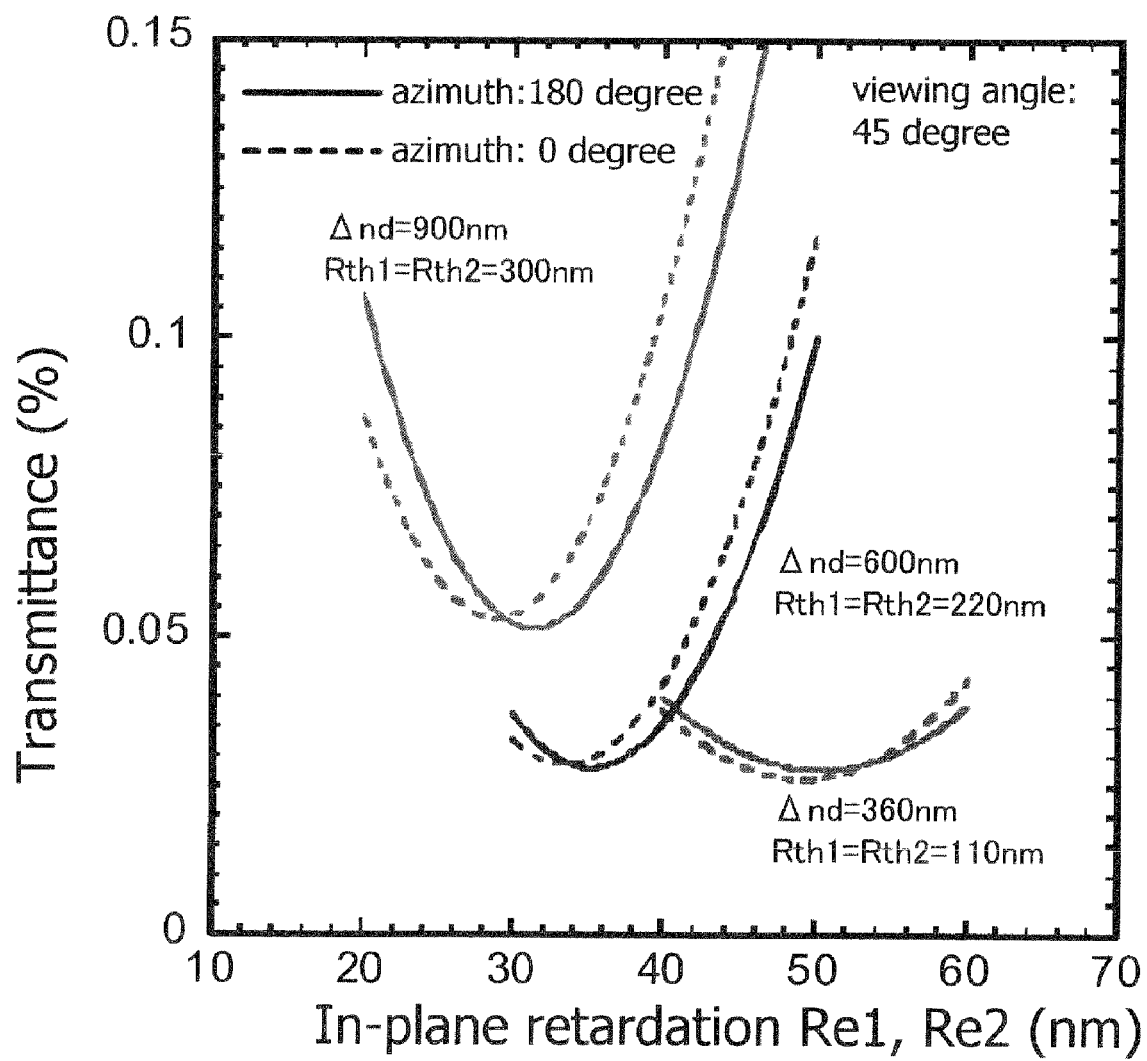
FIG. 2 is a graph showing a relation between an in-plane retardation and a transmittance of an optical film used in the liquid crystal display unit of the reference example.

FIG. 2 shows simulation results. The abscissa represents retardations Re1 and Re2 of the biaxial films 15 and 25 in the unit of "nm", and the ordinate represents a transmittance in the unit of "%". Each of the thickness direction retardations Rth1 and Rth2 of the biaxial films 15 and 25 is set to 110 nm, 220 nm and 300 nm at the retardations Δnd of the liquid crystal cell 20 of 360 nm, 600 nm and 900 nm, respectively.

A solid line in FIG. 2 indicates a transmittance when observed along a visual line inclined by 45° toward the azimuth of 180°, and a broken line indicates a transmittance when observed along a visual line inclined by 45° toward the azimuth of 0°. The reason why the transmittance is different between the azimuths of 0° and 180° is that the pretilt angle of the liquid crystal cell 20 was set to 89.9°. If the pretilt angle is 90°, i.e., if the liquid crystal molecules are strictly aligned vertically, the transmittances at the azimuths of 0° and 180° are equal to each other.

A contrast can be increased by selecting the in-plane retardations Re1 and Re2 of the biaxial films 15 and 25 so as to minimize the transmittance. It can be understood that the in-plane retardations Re1 and Re2 minimizing the transmittance depend on the retardation Δnd of the liquid crystal cell 20. A biaxial film having a different in-plane retardation Re could be used for a liquid crystal cell having a different retardation. Generally, the optimum retardation Δnd of the liquid crystal cell 20 depends upon the multiplex driving duty conditions, so the retardation Δnd of liquid crystal cell 20 is determined based on the duty condition. It is therefore necessary to use a negative biaxial film having different optical characteristics for a liquid crystal display unit by different duty conditions.

Figure 3:
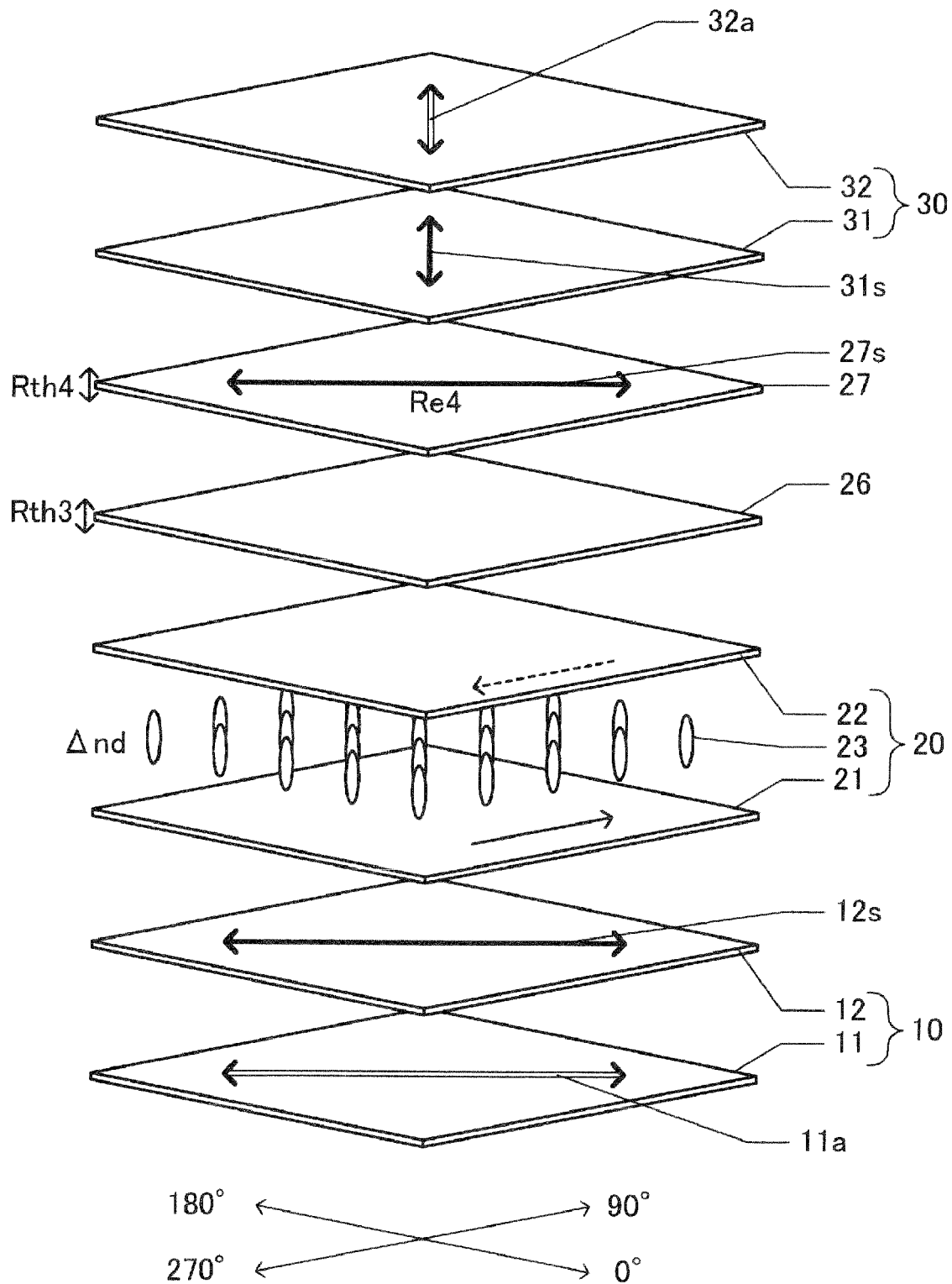
FIG. 3 is a schematic diagram showing the outline structure of a liquid crystal display unit according to another reference example.

FIG. 3 is a schematic diagram showing a conventional liquid crystal display unit which performs viewing angle compensation by using a negative biaxial film and a negative C plate. In the example shown in FIG. 3, an optical film is not disposed between the rear side polarizer 10 and the liquid crystal cell 20, whereas a negative C plate 26 and a negative biaxial film 27 are sequentially disposed between the front side polarizer 30 and liquid crystal cell 20 from the liquid crystal cell 20 toward the front side polarizer 30. An in-plane slow axis 27s of the negative biaxial film 27 is perpendicular to an absorption axis 32a of the front side polarizer 30. Namely, an azimuth of the in-plane slow axis 27s is 45°. Other structures are the same as those of the liquid crystal display unit shown in FIG. 1.

Figure 4:
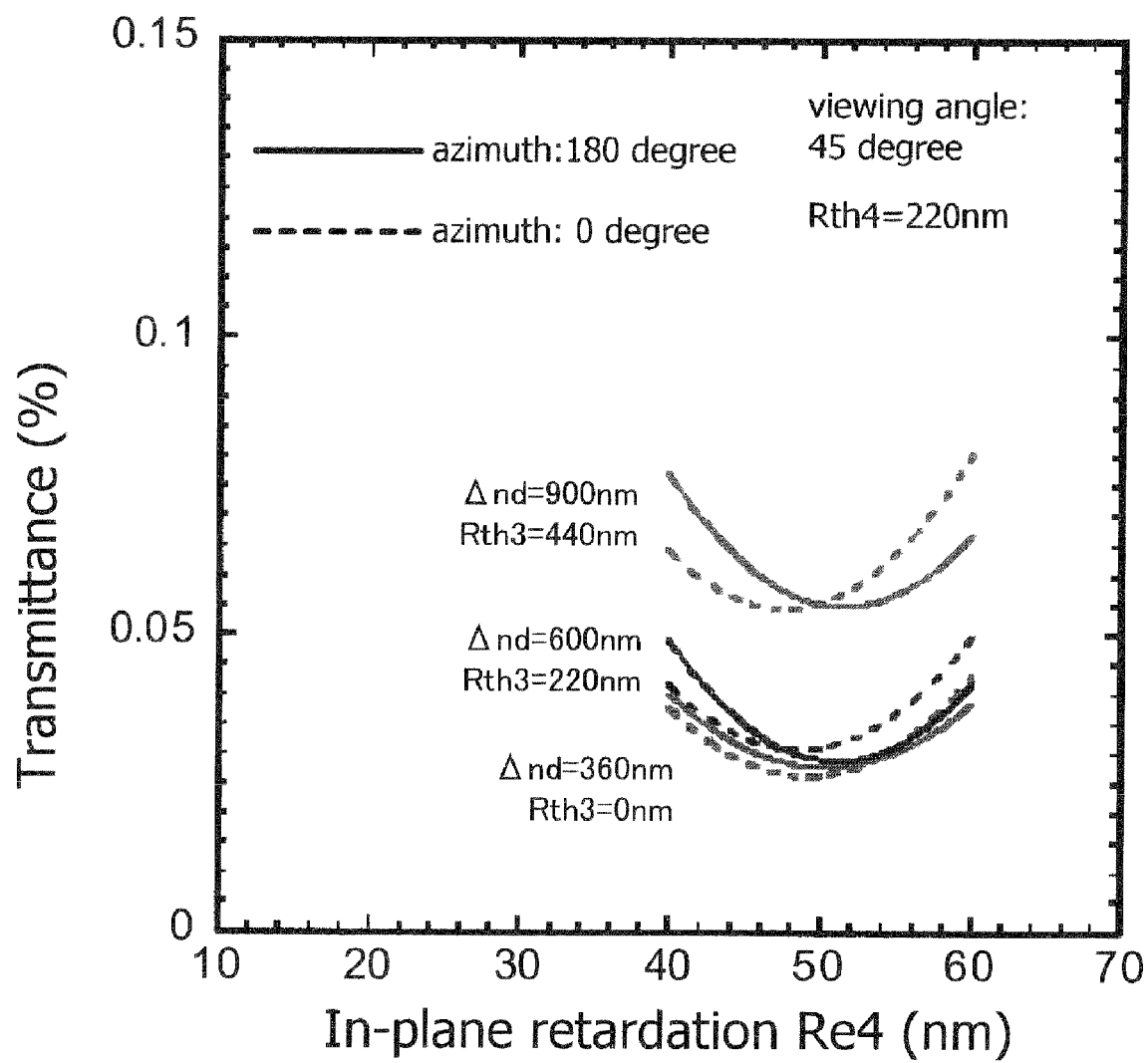
FIG. 4 is a graph showing a relation between an in-plane retardation and a transmittance of a negative biaxial film used in the liquid crystal display unit of the other reference example.

FIG. 4 shows results of the same simulation as those shown in FIG. 2. A thickness direction retardation Rth4 of the biaxial film 27 is set to 220 nm. A thickness direction retardation Rth3 of the negative C plate 26 is set to 0 nm, 220 nm and 440 nm at the retardations Δnd of the liquid crystal cell 20 of 360 nm, 600 nm and 900 nm, respectively. The C plate having the thickness direction retardation Rth3 of 0 nm is a transparent plate having no optical anisotropy.

The transmittance is minimum at an in-plane retardation Re4 of the negative biaxial film 20 of about 50 nm, irrespective of retardation Δnd of the liquid crystal cell 20. It is therefore possible to adopt negative biaxial films having the same optical characteristics for a plurality of liquid crystal display units having different retardations Δnd of the liquid crystal cell 20. Further, the negative biaxial film and C plate used for the liquid crystal display unit whose liquid crystal cell 20 has a retardation Δnd of 360 nm or smaller can be used in common. It is therefore possible to reduce cost.

The C plate 26 and negative biaxial film 27 are disposed between the front side polarizer 30 and liquid crystal cell 20 in the example shown in FIG. 3. It has been confirmed from simulations that the similar effects can be obtained even if one of the C plate 26 and negative biaxial film 27 is disposed between the front side polarizer 30 and liquid crystal cell 20 and the other is disposed between the rear side polarizer 10 and liquid crystal cell 20. A liquid crystal display unit was really manufactured, and it has been confirmed that the simulation analysis results are satisfied.

It is however difficult to realize the C plate 26 having an in-plane retardation Re of 0 in a wide range.

[First Embodiment]

FIG. 5 is a schematic diagram showing the outline structure of a liquid crystal display unit according to the first embodiment. No optical film is disposed between a rear side polarizer 10 and a liquid crystal cell 20. A first optical film 40 and a second optical film 41 are disposed between a front side polarizer 30 and liquid crystal cell 20. The first optical film 40 is disposed on the side of the front side polarizer 30, and the second optical film 41 is disposed on the side of the liquid crystal cell 20. Other structures are the same as those of the liquid crystal display unit shown in FIG. 1.

A negative biaxial film or a positive A plate is used as the first optical film 40 and second optical film 41. Namely, the first optical film 40 and second optical film 41 have optical anisotropy satisfying nx>ny≧nz. In-plane retardations Re5 and Re6 of the first optical film 40 and second optical film 41 were both set to 50 nm. Viewing angle characteristics were obtained by simulation by various azimuths of an in-plane slow axis 40s of the first optical film 40 and an in-plane slow axis 41s of the second optical film 41.

Figure 7A:
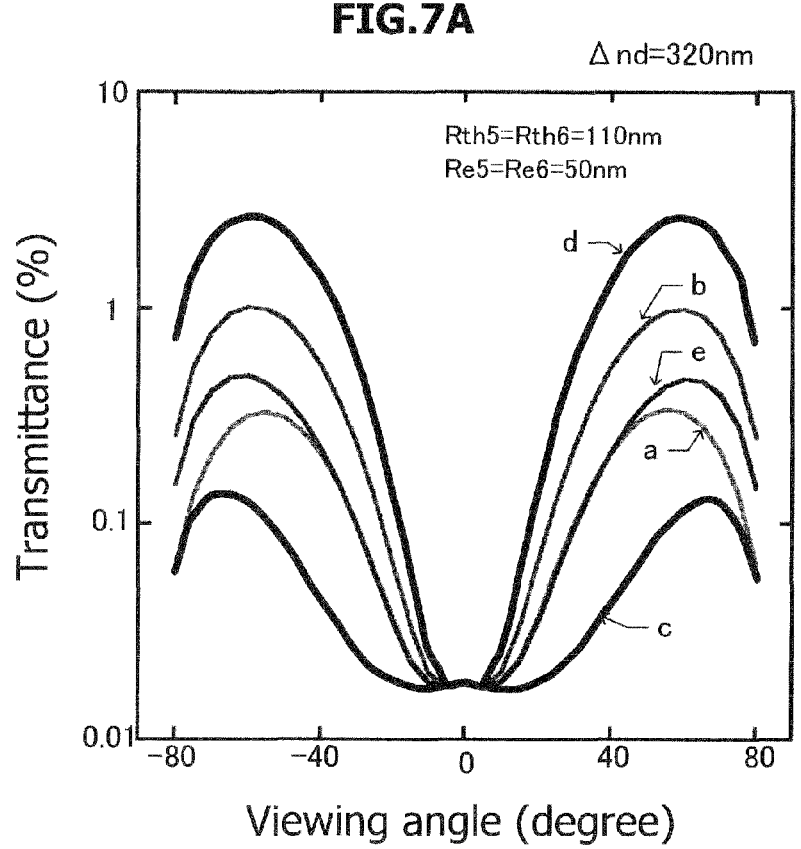
Figure 7B:
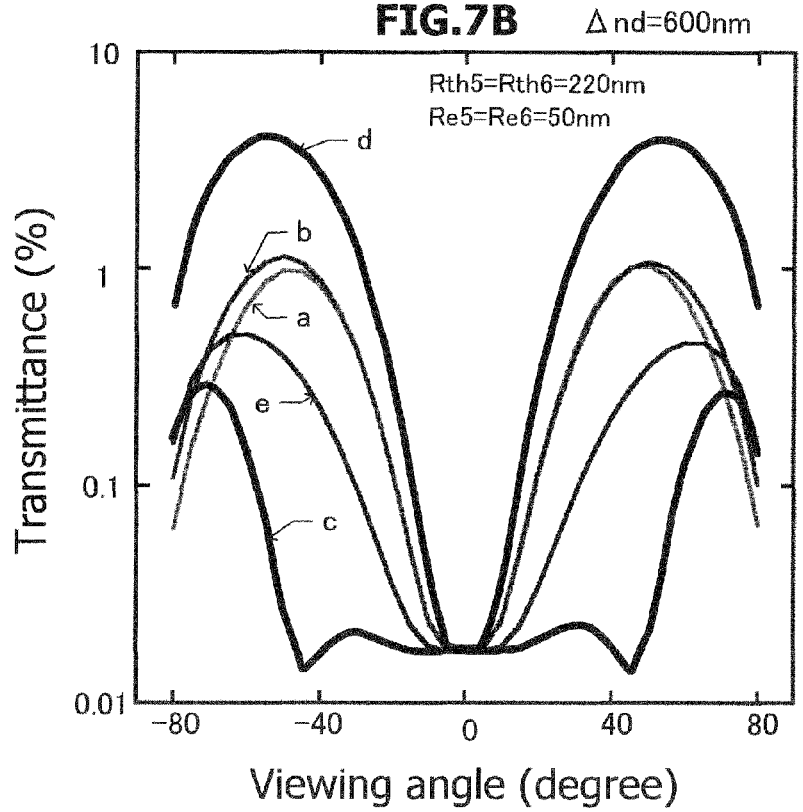

FIGS. 7A to 7C show viewing angle characteristics with respect to the right/left directions at the retardations Δnd of the liquid crystal cell of 320 nm, 600 nm and 765 nm. The abscissa represents a viewing angle in the unit of "degree (°)", and the ordinate represents a transmittance in the unit of "%". The "viewing angle" is an angle between a normal of the substrate surface of the liquid crystal display unit and a visual line. In FIGS. 7A to 7C, a viewing angle inclined toward the azimuth of 0° (right side) has a positive sign, and a viewing angle inclined toward the azimuth angle of 180° (left side) has a negative sign.

A thickness direction retardation Rth5 of the first optical film 40 and a thickness direction retardation Rth6 of the second optical film 41 were equal to each other, and had 110 nm, 220 nm and 300 nm at the retardations Δnd of the liquid crystal cell of 320 nm, 600 nm and 765 nm, respectively. The liquid crystal cell 20 in a black state functions as nearly a positive C plate. The thickness direction retardations of the first optical film 40 and second optical film 41 are determined mainly in such a manner that the function of the liquid crystal cell 20 as a positive C plate is compensated.

Figure 6A:
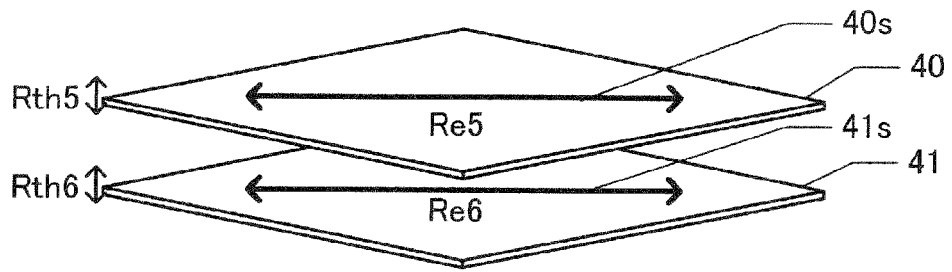
FIGS. 6A to 6E are schematic diagrams showing an example of the azimuths of in-plane slow axes of two optical films used in the optical display unit shown in FIG. 5.
Figure 6B:
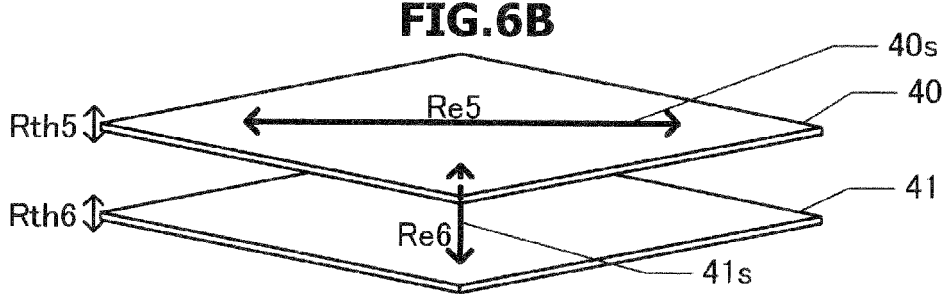
Figure 6C:
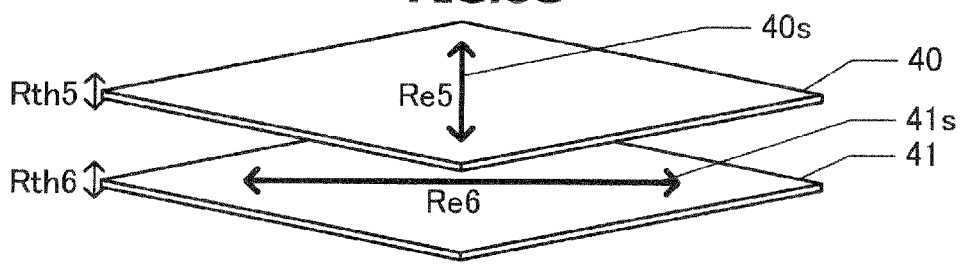
Figure 6D:
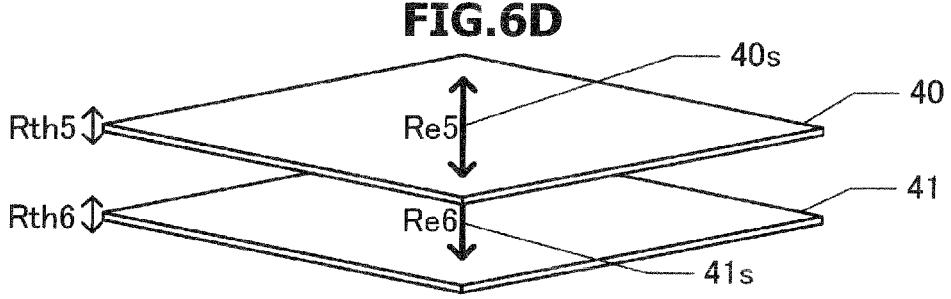
Figure 6E:
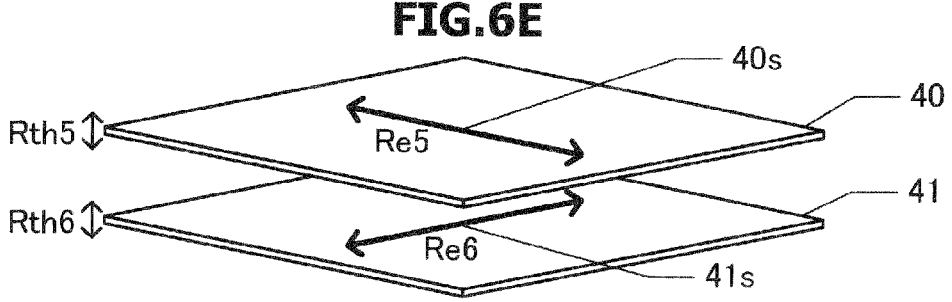

FIG. 6A shows the case wherein azimuths of the slow axes 40s and 41s are both set to 45°. FIG. 6B shows the case wherein the azimuths of the slow axes 40s and 41s are se to 45° and 135°, respectively. FIG. 6C shows the case wherein the azimuths of the slow axes 40s and 41s are set to 135° and 45°, respectively. FIG. 6D shows the case wherein azimuths of the slow axes 40s and 41s are both set to 135°. FIG. 6E shows the case wherein the azimuths of the slow axes 40s and 41s are set to 0° and 90°, respectively.

Curves a to e in FIGS. 7A to 7C indicate transmittances of the arrangements shown in FIGS. 6A to 6E, respectively. As shown in FIG. 6C, irrespective of retardation Δnd of the liquid crystal cell, the best viewing angle characteristics can be obtained by setting the azimuth of the slow axis 40s of the first optical film 40 to 135° and setting the azimuth of the slow axis 41s of the second optical film 41 to 45°. Further, as shown in FIG. 6E, relatively good viewing angle characteristics can be obtained by setting the azimuth of the slow axis 40s of the first optical film 40 to 0° and setting the azimuth of the slow axis 41s of the second optical film 41 to 90°.

Further, as shown in FIG. 6D, irrespective of retardation Δnd of the liquid crystal cell 20, the viewing angle characteristics are worst by setting the azimuths of the slow axis 40s of the first optical film 40 and the slow axis 41s of the second optical film 41 both to 135°. As shown in FIG. 6A, the viewing angle characteristics are relatively bad by setting the azimuths of the slow axis 40s of the first optical film 40 and the slow axis 41s of the second optical film 41 both to 45°.

It can be predicted from the above-described evaluation results that it is preferable that the slow axis 40s of the first optical film 40 and the slow axis 41s of the second optical film 41 are made perpendicular to each other.

Viewing angle characteristics were obtained by simulation by changing the azimuth of a slow axis while the slow axis 40s of the first optical film 40 and the slow axis 41s of the second optical film 41 are maintained perpendicular to each other.

FIGS. 8A to 8C show simulation results. The abscissa represents an azimuth of the slow axis 40s of the first optical film 40 in the unit of "degree (°)", and the ordinate represents a transmittance in the unit of "%". FIGS. 8A to 8C show evaluation results at the retardations Δnd of the liquid crystal cell 20 of 320 nm, 600 nm and 765 nm, respectively. In all cases, an azimuth of inclining a visual line was set to 0°, and a viewing angle was set to 50°.

A thickness direction retardation Rth5 of the first optical film 40 and a thickness direction retardation Rth6 of the second optical film 41 were 110 nm, 220 nm and 300 nm at the retardations Δnd of the liquid crystal cell of 320 nm, 600 nm and 765 nm, respectively, as in the case of the simulation shown in FIGS. 7A to 7C. An in-plane retardation Re5 of the first optical film 40 and an in-plane retardation Re6 of the second optical film 41 were set equal to each other, and a transmittance was obtained by changing the in-plane retardation in the range of 30 nm to 140 nm.

As the azimuth of the slow axis 40s is set to 0° (180°) and 90°, the transmittance becomes independent on the in-plane retardations Re5 and Re6. The simulation results suggest that the in-plane retardations of the first optical film 40 and second optical film 41 are cancelled out and only the thickness direction retardations are workable. Namely, it can be considered that a combination of the first optical film 40 and second optical film 41 has the same function as that of the C plate.

When the azimuth of the slow axis 40s of the first optical film 40 is in a range between 90° and 180°, i.e., when an angle between the absorption axis 32a of the front side polarizer 30 and slow axis 40s is 45° or smaller, a transmittance becomes relatively low. In order to obtain a high contrast, it is therefore preferable to set the angle between the absorption axis 32a of the front side polarizer 30 and slow axis 40s to 45° or smaller. This preferable condition is applicable when the retardation Δnd of the liquid crystal cell 20 is in a range between 300 nm and 1500 nm, when the in-plane retardation of each of the optical films 40 and 41 is 300 nm or smaller and when the thickness direction retardation is in a range between 50 nm and 300 nm.

When the in-plane retardations Re5 and Re6 of the first optical film 40 and second optical film 41 are in a range between 30 nm and 70 nm, there is a tendency that a transmittance lowers in a range between 90° and 180° (i.e., when the angle between the absorption axis 32a and slow axis 40s of the front side polarizer 30 is 45° or smaller) of the azimuth of the slow axis 40s of the first optical film 40. The transmittance becomes lowest particularly when the azimuth of the slow axis 40s is near at 135°. It has been confirmed that the above-described preferred condition is applicable when the thickness direction retardations Rth5 and Rth6 of the optical films 40 and 41 are in a range between 110 nm and 300 nm.

When the in-plane retardations Re5 and Re6 of the first optical film 40 and second optical film 41 are in a range between 100 nm and 140 nm, the transmittance takes a maximum value near at 135° with respect to the azimuth of the slow axis 40s and takes a minimum value in a range between 90° and 135° or in a range between 135° and 180° with respect to the azimuth of the slow axis 40s. There is a tendency that a transmittance lowers in a range between 90° and 120° or in a range between 150° and 180° with respect to the azimuth of the slow axis 40s of the first optical film 40 (i.e., when the angle between the absorption axis 32a of the front side polarizer 30 and slow axis 40s is 15° or larger and 45° or smaller). A still lower transmittance can be obtained when the azimuth of the slow axis 40s is set in a range between 160° and 175°. It has been confirmed that the above-described preferred condition is applicable when the thickness direction retardations Rth5 and Rth6 of the optical films 40 and 41 are in a range between 110 nm and 300 nm. The above-described preferred condition is applicable also in a range between 140 nm and 300 nm with respect to the in-plane retardations Re5 and Re6 of the optical films 40 and 41.

Generally, in a case where a liquid crystal display unit is observed along a visual line inclined toward the azimuth parallel to the absorption axis of a polarizer, better viewing angle characteristics can be obtained than a case where the liquid crystal display unit is observed along a visual line inclined toward the azimuth that has 45° relative to the absorption axis (to the right and left side in the first embodiment). Under the preferred condition described with reference to FIGS. 8A to 8C, it can be predicted that good viewing angle characteristics obtained when inclining the visual line to the azimuth parallel to the absorption axis of a polarizer, can be obtained even when inclining the visual line to the right/left direction.

FIGS. 7A to 8C show the case where the optical films 40 and 41 have the same optical characteristics. Next, description will be made on a case where in-plane retardations of the optical films are different from each other.

FIG. 9 shows simulation results of viewing angle dependency of a transmittance when the in-plane retardation Re5 of the first optical film 40 is changed in a range between 30 nm and 80 nm. The abscissa represents a viewing angle in the unit of "degree (°)" along which the liquid crystal display unit is observed, and the ordinate represents a transmittance in the unit of "%". A retardation Δnd of the liquid crystal cell 20 is set to 600 nm, and thickness direction retardations Rth5 and Rth6 of the first optical film 40 and second optical film 41 are both set to 220 nm. An in-plane retardation Re6 of the second optical film 41 is set to 50 nm. An azimuth of the slow axis 40s of the first optical film 40 is set to 135° and an azimuth of the slow axis 41s of the second optical film is set to 45°, namely the arrangement shown in FIG. 6C being adopted.

When there is a large difference between the in-plane retardation Re5 of the first optical film 40 and the in-plane retardation Re6 of the second optical film 41, there appears a rise in the transmittance starting from a relatively shallow viewing angle of about 10° to 20°. When the in-plane retardation Re5 of the first optical film 40 is equal to the in-plane retardation Re6 of the second optical film 41, the transmittance starts rising at a viewing angle of 20°. However, a rising degree is small and the transmittance starts lowering as the viewing angle exceeds 30°. When the in-plane retardation Re5 of the first optical film 40 is 60 nm, the transmittance will not rise until the viewing angle reaches 40°.

Degradation of the viewing angle characteristics is small when a difference is 10 nm or smaller between each of the in-plane retardations Re5 and Re6 of the optical films 40 and 41 and an average of the in-plane retardations of the two optical films 40 and 41.

In the above-described first embodiment, although the negative biaxial film is used as the first and second optical films 40 and 41, a positive A plate may be used instead of the negative biaxial film.

From the viewpoint of compensating a positive thickness direction retardation of the liquid crystal cell 20 in a black state, it is preferable that a total of the thickness direction retardation Rth5 of the first optical film 40 and the thickness direction retardation Rth6 of the second optical film 41 falls in a range between 0.5 times and 1 time as large as the retardation Δnd of the liquid crystal cell 20 (between half of the retardation Δnd and the retardation Δnd).

When being applied to an actual liquid crystal display unit, the first optical film 40 and second optical film 41 having the same optical anisotropy are preferably adopted from the viewpoint of reducing the number of types of components.

Liquid crystal display units having the structure shown in FIG. 5 are manufactured and the viewing angle characteristics are evaluated in order to confirm validity of the simulation results.

A first sample is a liquid crystal display unit in which a retardation Δnd of the liquid crystal cell 20 is 608 nm, in-plane retardations Re5 and Re6 of the first optical film 40 and second optical film 41 are both 50 nm, and thickness direction retardations Rth5 and Rth6 are both 220 nm. An azimuth of the slow axis 40s of the first optical film 40 is set to 135°, and an azimuth of the slow axis 41s of the second optical film 41 is set to 45°. This sample corresponds to a sample represented by the curve c in FIGS. 7B and 7C.

When voltage is not applied and a visual line is inclined toward the right/left direction, a good black state hardly having optical leak is able to be obtained up to a viewing angle of 50°. As the viewing angle is increased, optical leak is observed and a tendency similar to the simulation results is observed.

A second sample is a liquid crystal display unit in which a retardation Δnd of the liquid crystal cell 20 is 430 nm, in-plane retardations Re5 and Re6 of the first optical film 40 and second optical film 41 are both 120 nm, and thickness direction retardations Rth5 and Rth6 are both 160 nm.

An azimuth of the slow axis 40s of the first optical film 40 is set to 90°, and an azimuth of the slow axis 41s of the second optical film 41 is set to 0°. In this case, a good black state hardly having optical leak is able to be obtained up to a viewing angle of 25° toward the right/left direction. The liquid crystal display unit is observed along a visual line at a viewing angle of 50° and at azimuth angles of 0° and 180° (i.e., right/left azimuths), while the perpendicular conditions of the slow axes of the two optical films 40 and 41 were maintained and the first optical film 40 and second optical film 41 were rotated. A phenomenon that the transmittance becomes lowest has been confirmed when the azimuth of the slow axis 40s is set to 160° and the azimuth of the slow axis 41s is set to 70°. This phenomenon corresponds to the case wherein a minimum value is obtained at an azimuth of the slow axis 40s near at 160° to 170° when the in-plane retardations Re5 and Re6 are 120 nm in FIGS. 8A to 8C.

[Second Embodiment]

Figure 10:
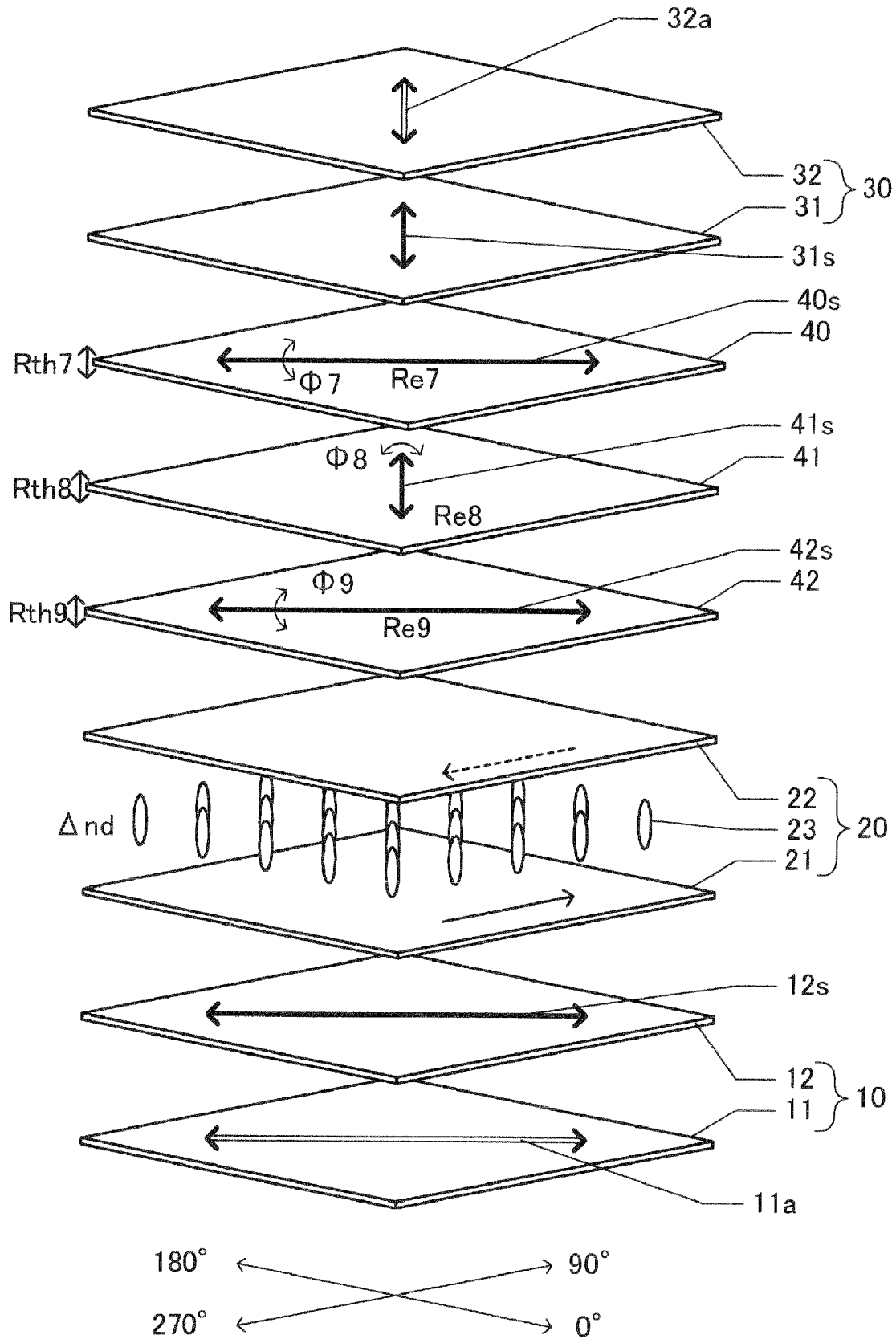
FIG. 10 is a schematic diagram showing the outline structure of a liquid crystal display unit according to a second embodiment.

FIG. 10 is a schematic diagram showing the outline structure of a liquid crystal display unit according to the second embodiment. In the first embodiment, although two optical films are disposed between the front side polarizer 30 and liquid crystal cell 20, in the second embodiment, three negative biaxial films are disposed, i.e., a first optical film 40, a second optical film 41 and a third optical film 42. Other structures are the same as those of the first embodiment.

Figure 11:
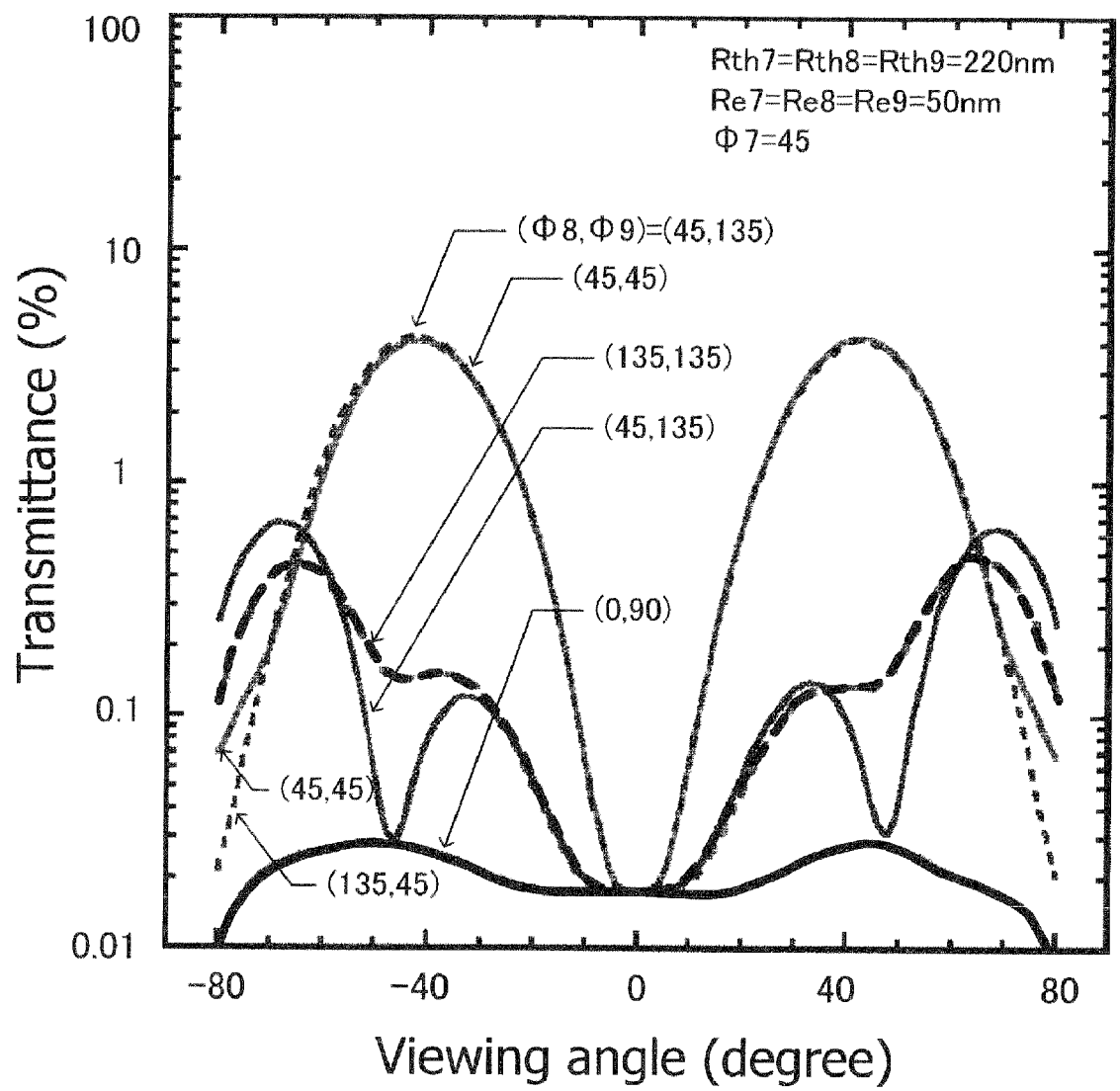
FIG. 11 is a graph showing the viewing angle characteristics of the liquid crystal display unit shown in FIG. 10.

FIG. 11 shows simulation results of the viewing angle characteristics of the liquid crystal display device of the second embodiment. The abscissa represents a viewing angle in the unit of "degree (°)", and the ordinate represents a transmittance in the unit of "%". A retardation Δnd of the liquid crystal cell 20 is set to 900 nm, in-plane retardations Re7 to Re9 of the first to third optical films 40 to 42 are all set to 50 nm, and thickness direction retardations Rth7 to Rth9 are all set to 220 nm. An azimuth Φ7 of a slow axis 40s of the first optical film 40 is set to 45°. A viewing angle dependency of a transmittance is calculated for various combinations of an azimuth Φ8 of a slow axis 41s of the second optical film 41 and an azimuth Φ9 of a slow axis 42s of the third optical film 42.

It has been found that good viewing angle characteristics are obtained by setting the azimuth Φ8 of the slow axis 41s of the second optical film 41 to 0° and the azimuth Φ9 of the slow axis 42s of the third optical film 42 to 90°.

A transmittance is obtained when the azimuth Φ8 of the slow axis 42s of the third optical film 42 is changed, while maintaining the perpendicular conditions between the slow axis 41s of the second optical film 41 and the slow axis 42s of the third optical film 42.

Figure 12:
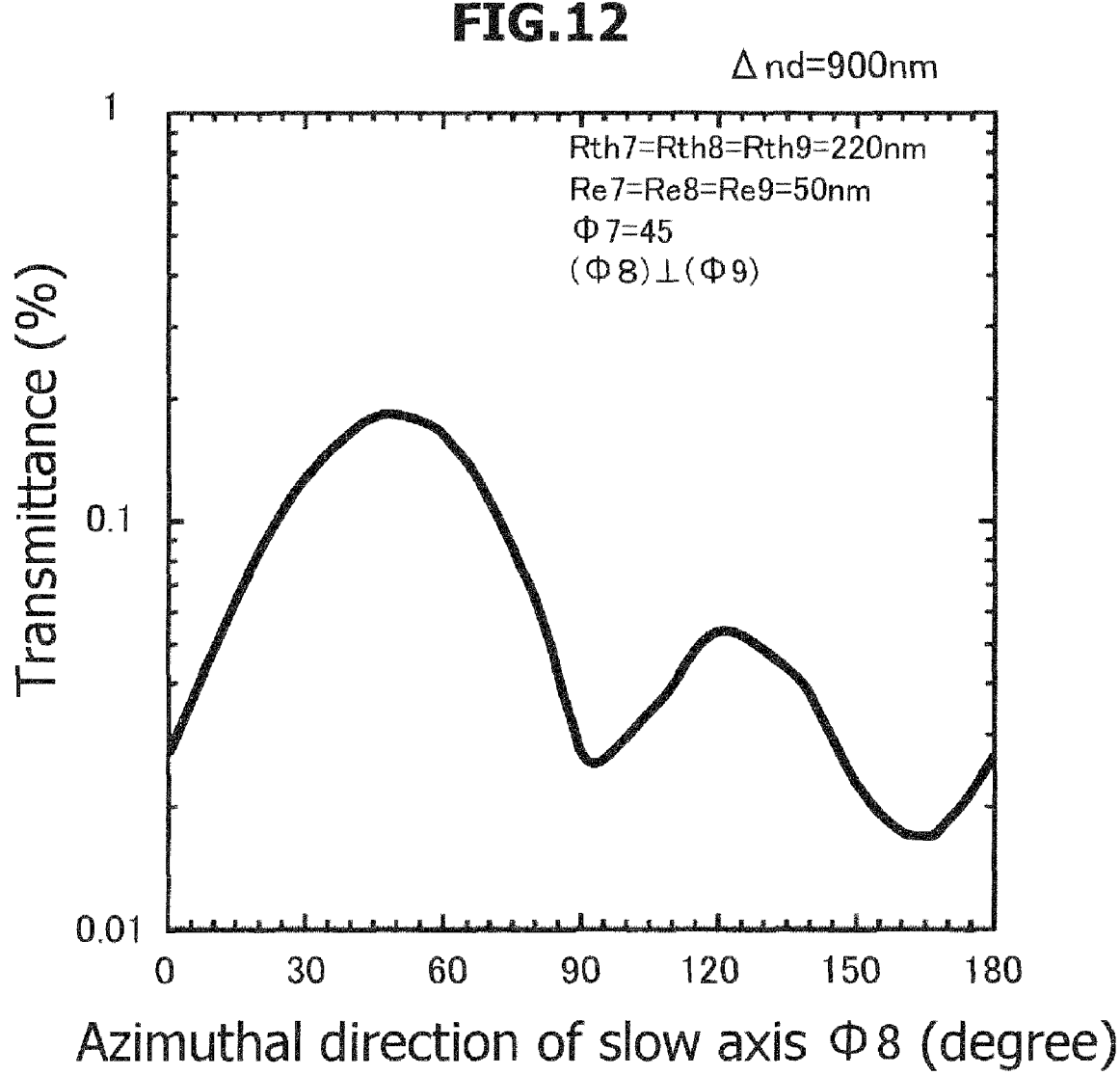
FIG. 12 is a graph showing the relation between an azimuth of an in-plane slow axis and a transmittance of a second optical film of the liquid crystal display unit shown in FIG. 10.

FIG. 12 shows the results. The abscissa represents the azimuth Φ8 of a slow axis 41s of the second optical film 41 in the unit of "degree (°)", and the ordinate represents a transmittance in the unit of "%". An azimuth of a visual line is set to 0°, and a viewing angle is set to 50°. It can be understood that as the azimuth Φ8 of the slow axis 41s is set in a range between 90° and 180°, a transmittance becomes lower than in a range between 0° and 90°.

It is difficult to adhere two optical films precisely so as to make the slow axes cross perpendicularly, and the slow axes sometimes shift from the perpendicular relation. In the following, consideration will be made on the influence of a shift from the perpendicular relation between the slow axis 41s of the second optical film 41 and the slow axis 42s of the third optical film 42.

When the slow axis 41s of the second optical film 41 and the slow axis 42s of the third optical film 42 are disposed parallel or perpendicular to the absorption axes 32a and 11a of the front side and rear side polarizers, optical anisotropy of the second and third optical films 41 and 42 is hard to be observed. Therefore, even if the slow axis 41s and slow axis 42s shift from the perpendicular relation, its influence is small. For example, a transmittance will not vary remarkably when observing squarely.

However, when the slow axis 41s and slow axis 42s are disposed at an angle of 45° relative to the absorption axes 32a and 11a of the polarizers, optical anisotropy of the second and third optical films 41 and 42 is observed remarkably. Therefore, if the slow axis 41s and slow axis 42s shift from the perpendicular relation even by 0.5°, a transmittance when observing squarely rises greatly, resulting in a lowered contrast.

It is therefore preferable to dispose the slow axis 41s of the second optical film 41 and the slow axis 42s of the third optical film 42 parallel or perpendicular to the absorption axes 32a and 11a of the front side and rear side polarizers.

Similar simulation is conducted by setting the azimuth Φ7 of the slow axis 40s of the first optical film 40 to 135° and changing the azimuths of the slow axis 41s of the second optical film 41 and the slow axis 42s of the third optical film 42. It has been found from the simulation results that it is favorable that the azimuth Φ7 of the slow axis 40s of the first optical film 40 is set to 45°. It can be understood from this that it is more preferable to dispose the absorption axis 32a of the front side polarizer 30 and the slow axis 40s of the first optical film 40 at an angle therebetween that is in a range between 45° and 135°, than to dispose both the axes in parallel. This preferable condition is applicable when the retardation Δnd of the liquid crystal cell 20 is in a range between 550 nm and 1500 nm, when the in-plane retardation of each of the optical films 40 to 42 is in a range between 30 nm and 300 nm and when the thickness direction retardation is in a range between 50 nm and 300 nm.

Simulation of the viewing angle characteristics is conducted by changing a combination of the in-plane retardations Re7 to Re9 of the first to third optical films 40 to 42. It has been found from the simulation results that it is preferable to set all the in-plane retardations Re7 to Re9 equal to each other. It has also been found that the viewing angle characteristics not inferior to the case wherein all the in-plane retardations Re7 to Re9 are equal, can be obtained when there is a difference not larger than 10 nm between each of the in-plane retardations Re7 to Re9 and an average of the retardations Re7 to Re9.

It is preferable that the in-plane retardation Re7 of the first optical film 40 disposed nearest to the front side polarizer 30 is set to 30 nm to 80 nm. Regarding the thickness direction retardations, although it is not necessary for the optical films 40 to 42 to have the same value, it is preferable that a total of the thickness direction retardations of the three optical films 40 to 42, i.e., Rth7+Rth8+Rth9, falls in a range between 0.5 times and 1 time the retardation Δnd of the liquid crystal cell 20 (between half of the retardation Δnd and the retardation Δnd).

A liquid crystal display unit is manufactured in which a retardation Δnd of the liquid crystal cell is about 900 nm, in-plane retardations Re7 to Re9 of the three optical films 40 to 42 are all 50 nm, thickness direction retardations Rth7 to Rth9 are all 220 nm, and azimuths Φ7 to Φ9 of the slow axes are 45°, 135° and 45°, respectively. The viewing angle characteristics of the liquid crystal display unit are actually measured and it is confirmed that the above-described simulation results are almost satisfied.

[Third Embodiment]

Figure 13:
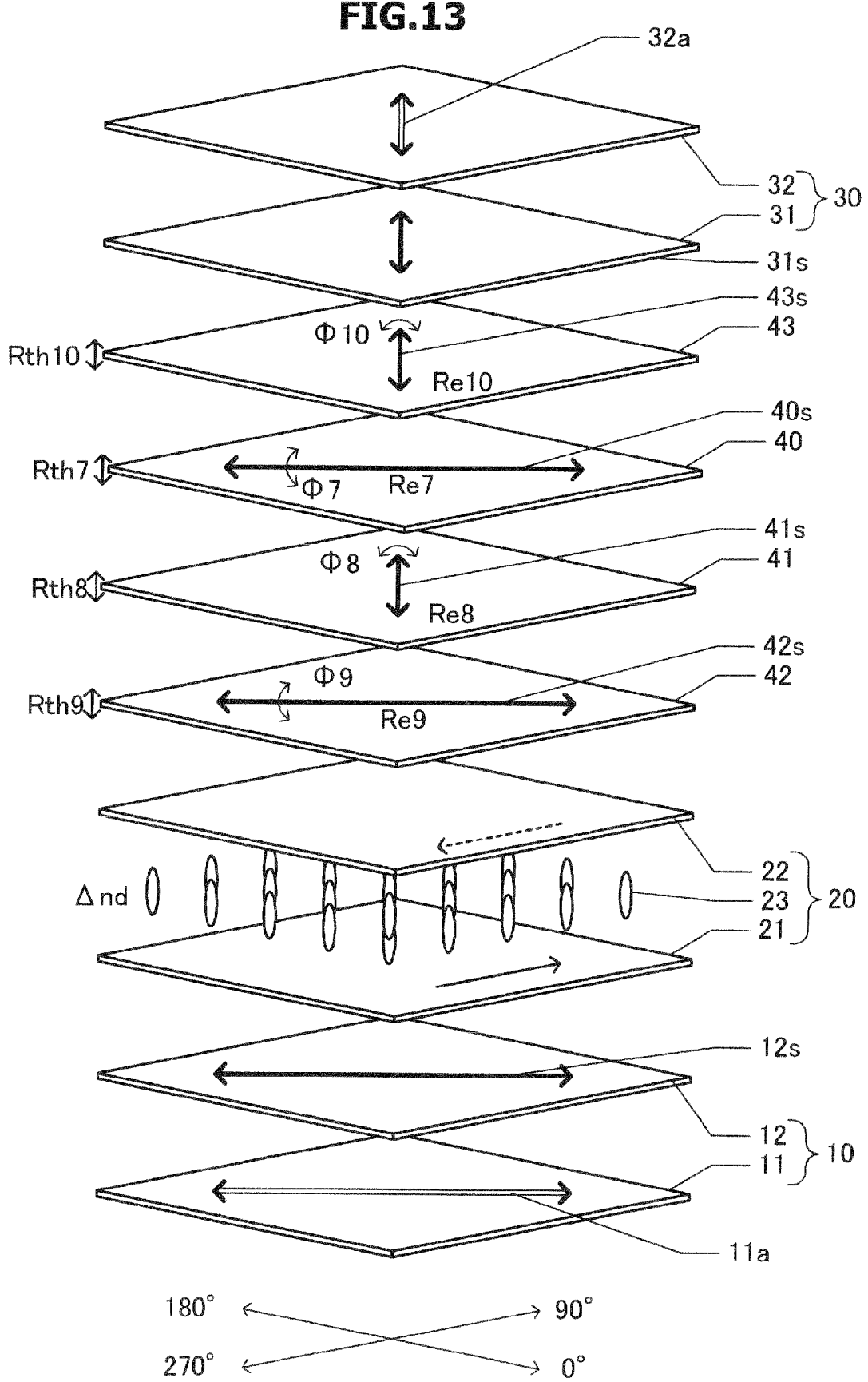
FIG. 13 is a schematic diagram showing the outline structure of a liquid crystal display unit according to a third embodiment.

FIG. 13 is a schematic diagram showing the outline structure of a liquid crystal display unit according to the third embodiment. In the second embodiment, although three optical films 40 to 42 are disposed between the front side polarizer 30 and liquid crystal cell 20, in the third embodiment, a fourth optical film 43 having negative biaxial anisotropy is disposed between the first optical film 40 and front side polarizer 30. Four optical films 40 to 43 in total are therefore disposed.

A retardation Δnd of the liquid crystal cell is set to 1180 nm, in-plane retardations Re7 to Re10 of the first to fourth optical films 40 to 43 are all set to 50 nm, and thickness direction retardations Rth7 to Rth10 are all set to 220 nm. Simulation of the viewing angle characteristics is conducted for various combinations of azimuths of in-plane slow axes of the optical films 40 to 43. It has been found from the simulation results that the best viewing angle characteristics can be obtained by making the in-plane slow axes of adjacent two optical films perpendicular to each other and disposing the in-plane slow axes 43s of the fourth optical film 43 nearest to the front side polarizer 30 to be parallel to the absorption axis 32a of the front side polarizer 30. It has also been found that relatively good viewing angle characteristics can be obtained by setting an angle between the in-plane slow axis 43s of the fourth optical film 43 and the absorption axis 32a of the front side polarizer 30 to 45° or smaller than 45°.

If a negative biaxial film is further laminated, the retardation Δnd of the liquid crystal layer can be compensated. However, in order to maintain a good display state when voltage is applied, it is preferable to set the retardation Δnd of the liquid crystal layer to 1500 nm or smaller than 1500 nm.

Next, a modification of the third embodiment will be described. In the third embodiment, although four optical films 40 to 43 are disposed between the liquid crystal cell 20 and front side polarizer 30 as shown in FIG. 13, in the modification, five optical films are disposed. A retardation Δnd of the liquid crystal layer is set to 1480 nm, and the in-plane retardation and thickness direction retardation of each optical film are set to be the same as the third embodiment.

Simulation of the viewing angle characteristics is conducted for various combinations of azimuths of in-plane slow axes of the optical films. It has been found from the simulation results that the best viewing angle characteristics can be obtained by making the in-plane slow axes of adjacent two optical films perpendicular to each other and disposing the in-plane slow axes of the optical film nearest to the front side polarizer 30 to be perpendicular to the absorption axis 32a of the front side polarizer 30. It has also been found that relatively good viewing angle characteristics can be obtained when an angle between the in-plane slow axis of the optical film nearest to the front side polarizer 30 and the absorption axis 32a of the front side polarizer 30 is in a range between 45° and 135°.

It can be understood from the above-described simulation results that if the number of positive A plates or negative biaxial films disposed between the liquid crystal cell and front side polarizer is even, it is preferable to set an angle between the in-plane slow axis of the optical film nearest to the front side polarizer and the absorption axis of the front side polarizer in a range between −45° to 45°, or more preferable to set the angle to 0°. It can also be understood that if the number is odd and larger than 3, it is preferable to set an angle between the in-plane slow axis of the optical film nearest to the front side polarizer and the absorption axis of the front side polarizer in a range between 45° and 135°, or more preferable to set the angle to 90°. In either case, it is preferable to dispose the in-plane slow axes of adjacent optical films to be perpendicular to each other.

[Fourth Embodiment]

Figure 14:
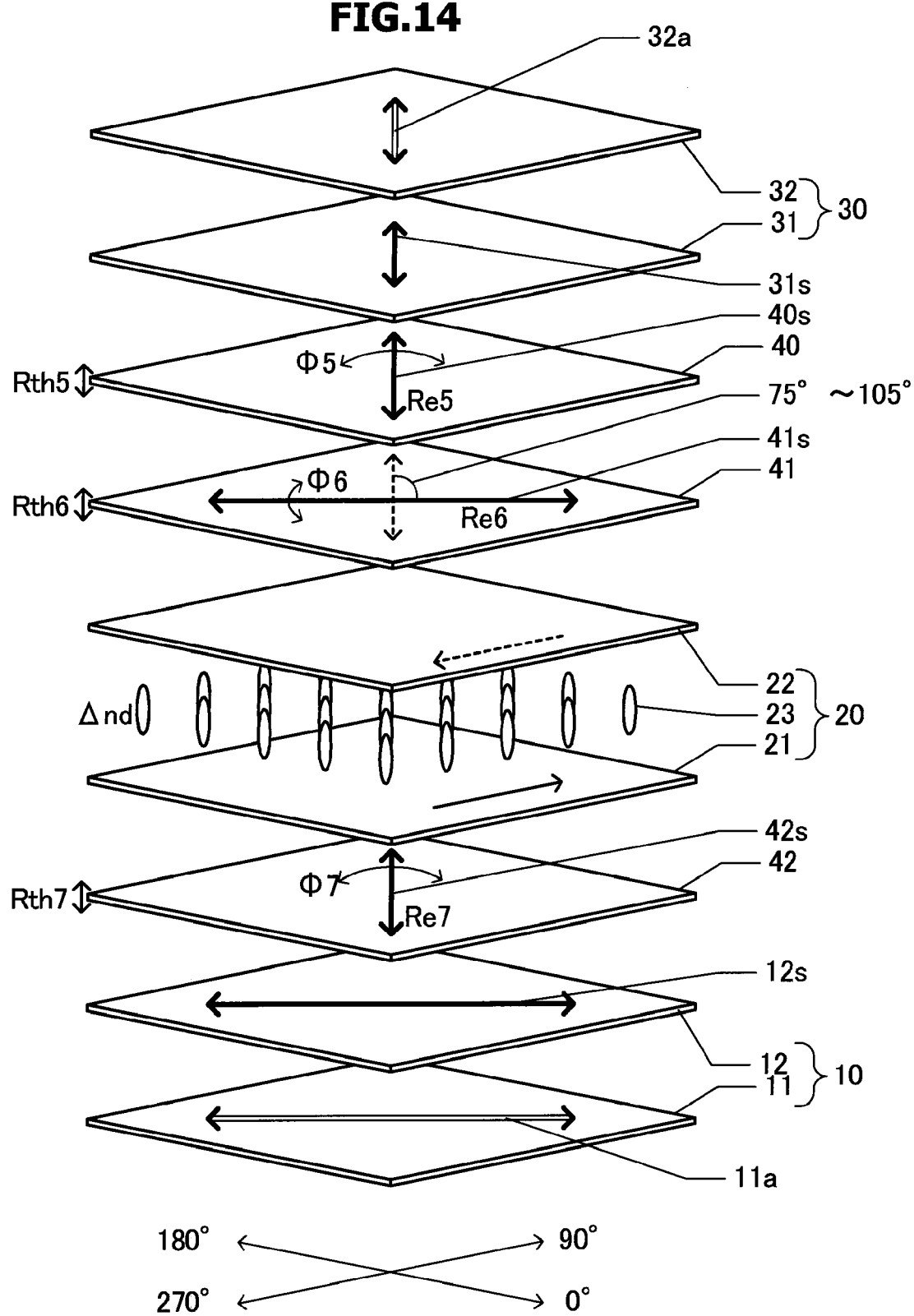
FIG. 14 is a schematic diagram showing the outline structure of a liquid crystal display unit according to a fourth embodiment.

FIG. 14 is a schematic diagram showing the outline structure of a liquid crystal display unit according to the fourth embodiment. A first optical film 40 and a second optical film 41 are disposed between a front side polarizer 30 and liquid crystal cell 20. The first optical film 40 is disposed on the side of the front side polarizer 30, and the second optical film 41 is disposed on the side of the liquid crystal cell 20. A third optical film 42 is disposed between a rear side polarizer 10 and liquid crystal cell 20. The structures of the rear side polarizer 10, liquid crystal cell 20 and front side polarizer 30 are the same as those of the liquid crystal display unit shown in FIG. 1.

A retardation Δnd of the liquid crystal cell 20 is, for example, 410 nm. A negative biaxial film or a positive A plate is used as the first to third optical films 40 to 42. Namely, the first to third optical films 40 to 42 have optical anisotropy satisfying nx>ny≧nz. In-plane retardations Re5 to Re7 of the first to third optical films 40 to 42 are, for example, 50 nm, and thickness direction retardations Rth5 to Rth7 are, for example, 90 nm.

An azimuth of an absorption axis 11a of the rear side polarizer 10 is set to 45°, and an azimuth of an absorption axis 32a of the front side polarizer 30 is set to 135°. An in-plane slow axis 41s of the second optical film 41 and an in-plane slow axis 42s of the third optical film 42 are disposed to be perpendicular to each other. A transmittance is obtained by simulation by setting an azimuth angle Φ5 of a slow axis 40s of the first optical film 40 to 45° and 135° and changing an in-plane slow axis azimuth Φ6 of the second optical film in a range between 0° and 180°.

Figure 15:
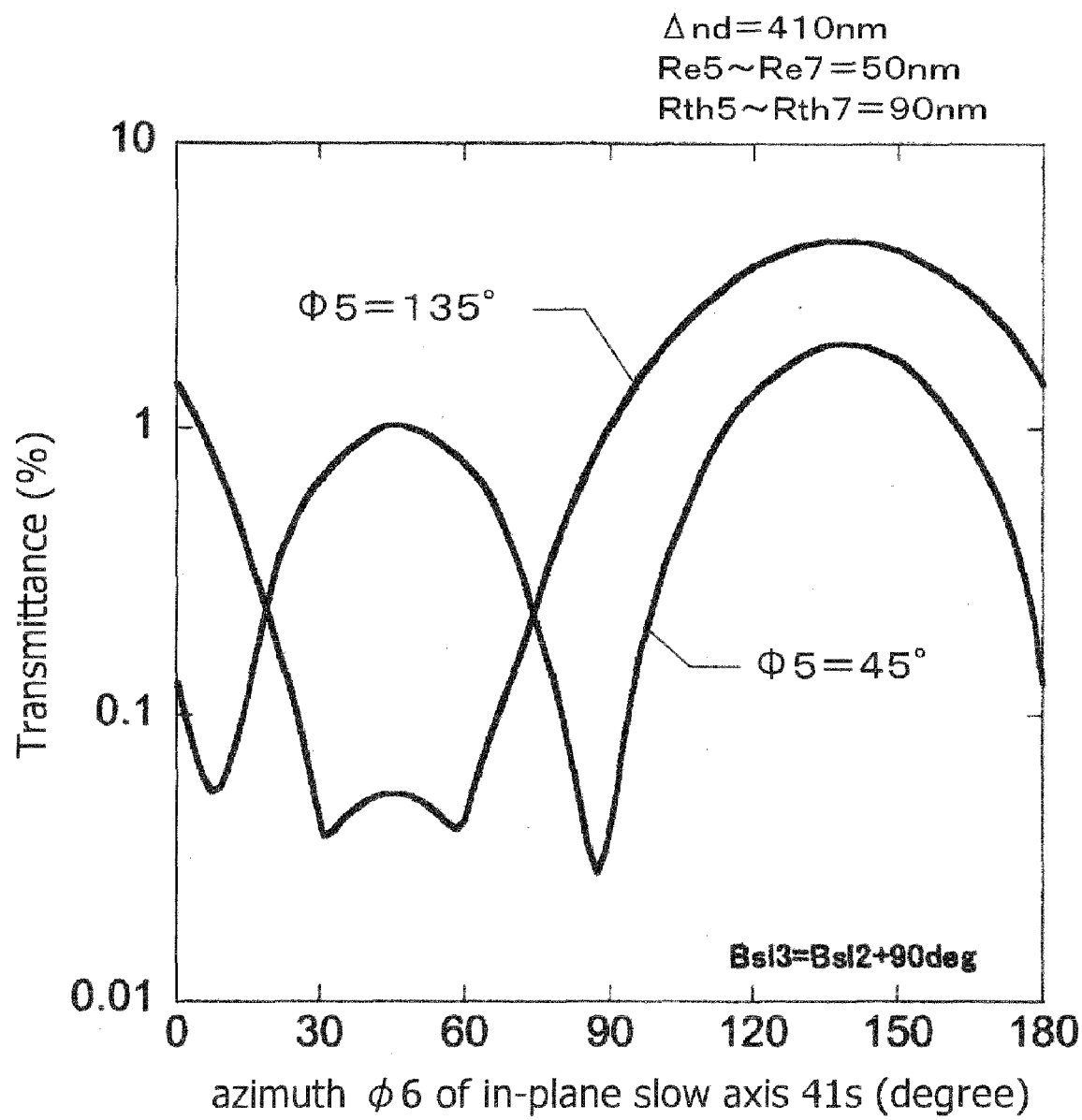
FIG. 15 is a graph showing simulation results of the relation between an azimuth of an in-plane slow axis and a transmittance of a second optical film of the liquid crystal display unit of the fourth embodiment.

FIG. 15 shows simulation results. The abscissa represents an in-plane slow axis direction Φ6 in the unit of "degree (°)", and the ordinate represents a transmittance in the unit of "%". The transmittance is obtained through observation under the conditions of an azimuth of 0° and a viewing angle of 50°. The "viewing angle" is defined as an angle between a normal direction of a liquid crystal cell and a visual line.

There is a tendency that a transmittance lowers in a range between 10° and 20° and in a range between 80° and 90° with respect to the in-plane slow axis azimuth Φ6, at the in-plane slow axis azimuth Φ5 of 45°. On the other hand, there is a tendency that a transmittance lowers in a range between 30° and 60° with respect to the in-plane slow axis azimuth Φ6 at the in-plane slow axis azimuth Φ5 of 135°. The simulation results shown in FIG. 15 are obtained through observation at a visual line inclined toward the azimuth of 0°. The all-around viewing angle characteristics are calculated next.

Simulation results of the all-around viewing angle characteristics are shown in FIGS. 16A to 16D. FIGS. 16A to 16D show equi-transmittance curves. A center indicates a transmittance at a viewing angle of 0°, i.e., when facing squarely, and four concentric circles correspond to the transmittances at viewing angles of 20°, 40°, 60° and 80° sequentially from the innermost circle toward the outer circle. Right, upper, left and lower directions correspond to azimuths of 0°, 90°, 180° and 270°, respectively. Transmittances indicated by the equi-transmittance curves are 0.02%, 0.05%, 0.1%, 0.2%, 0.5% and 1% sequentially from the innermost curve toward the outer curve.

Figure 16A:
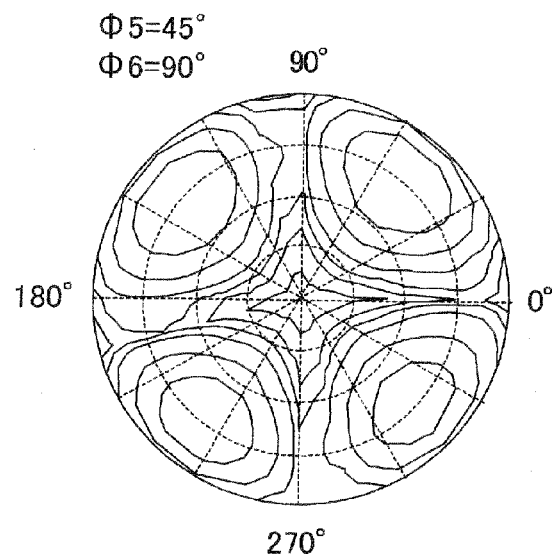
FIGS. 16A to 16D are graphs showing simulated equi-transmittance curves of the liquid crystal display unit of the fourth embodiment.
Figure 16B:
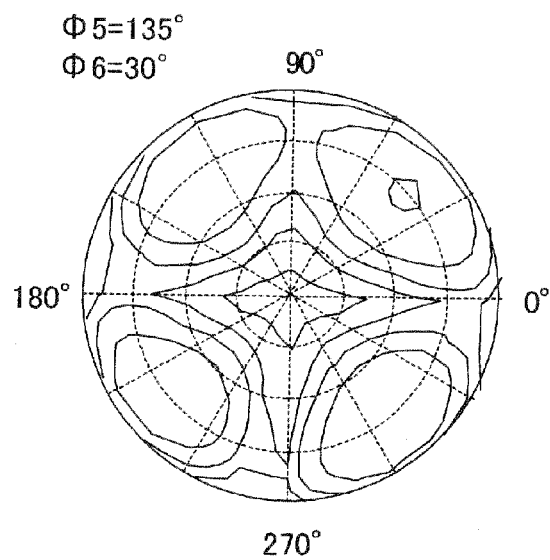
Figure 16C:
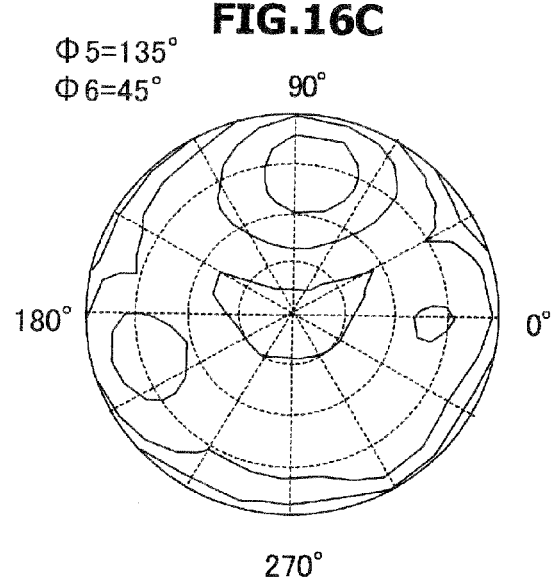
Figure 16D:
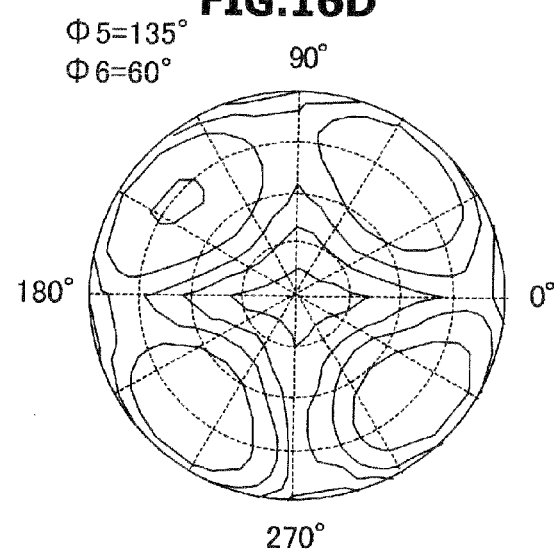

FIG. 16A shows the viewing angle characteristics at in-plane slow axis azimuths of Φ5=45° and Φ6=90°, FIG. 16B shows the viewing angle characteristics at in-plane slow axis azimuths of Φ5=135° and Φ6=30°, FIG. 16C shows the viewing angle characteristics at in-plane slow axis azimuths of Φ5=135° and Φ6=45°, and FIG. 16D shows the viewing angle characteristics at in-plane slow axis azimuths of Φ5=135° and Φ6=60°.

Although the viewing angle characteristics in the upper, lower, right and left azimuths are relatively good at the in-plane slow axis azimuths Φ5 and Φ6 of 45° and 90, respectively, an increase in the transmittance is remarkable when the visual line is inclined toward the azimuths of 45° and 135°. Simulation is conducted for the other conditions that a transmittance lowers at the in-plane slow axis azimuth Φ5 of 45°, i.e., for the conditions of the in-plane slow axis azimuth Φ6 of 15°, and similar to the case of the in-plane slow axis azimuth Φ6 of 90°, it has been found that an increase in the transmittance is remarkable when the visual line is inclined toward the azimuths of 45° and 135°. In contrast, as shown in FIGS. 16B to 16D, at the in-plane slow axis azimuth Φ5 of 135°, an increasing tendency of the transmittance when the visual line is inclined toward the azimuths of 45° and 135° is small. Particularly at the in-plane slow axis azimuth Φ6 of 45°, it has been found that an increase in the transmittance, when the visual line is inclined toward the azimuths of 45° and 135°, is extremely small.

Figure 17:
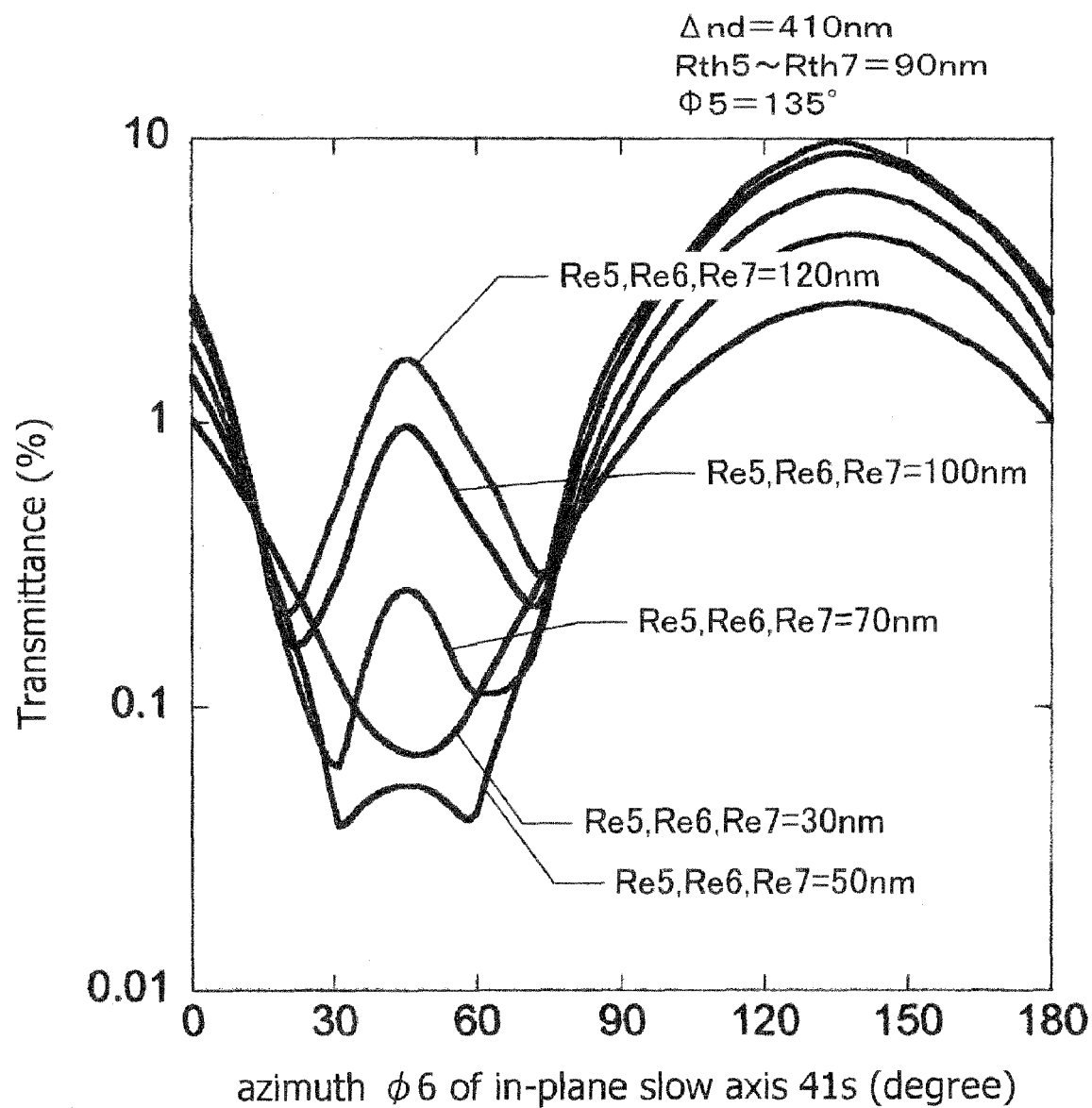
FIG. 17 is a graph showing simulation results of the relation between an azimuth of an in-plane slow axis and a transmittance of a second optical film when in-plane retardations of first to third optical films of the liquid crystal display unit of the fourth embodiment are set equal.

FIG. 17 shows simulation results of transmittances when the in-plane retardations Re5 to Re7 of the first to third optical films 40 to 42 are changed under the conditions in which these in-plane retardations Re5 to Re7 are equal to one another. Simulation is conducted at each of the in-plane retardations Re5 to Re7 of 30 nm, 50 nm, 70 nm, 100 nm and 120 nm. The in-plane slow axis azimuth Φ5 is set to 135°, and the in-plane slow axis 41s of the second optical film 41 and the in-plane slow axis 42s of the third optical film 42 are perpendicular to each other. The abscissa of FIG. 17 represents an in-plane slow axis azimuth Φ6 in the unit of "degree (°)", and the ordinate represents a transmittance in the unit of "%". The transmittance is observed along a visual line of an azimuth of 0° and a viewing angle of 50°.

When the in-plane retardations Re5 to Re7 are smaller than 50 nm, there is a tendency that the transmittance takes a minimum value near at an in-plane slow axis azimuth Φ6 of 45°. On the other hand, when the in-plane retardations Re5 to Re7 are larger than 50 nm, the transmittance takes a minimum value near at an in-plane slow axis azimuth Φ6 of 30° and 60° and a maximum value near at an in-plane slow axis azimuth Φ6 of 45°. As the in-plane retardations Re5 to Re7 become larger than 50 nm, the transmittance increases with this tendency being maintained. As seen from these evaluation results, it is preferable to set the in-plane retardations Re5 to Re7 in a range between 30 nm and 70 nm in order to obtain relatively good viewing angle characteristics.

Figure 18:
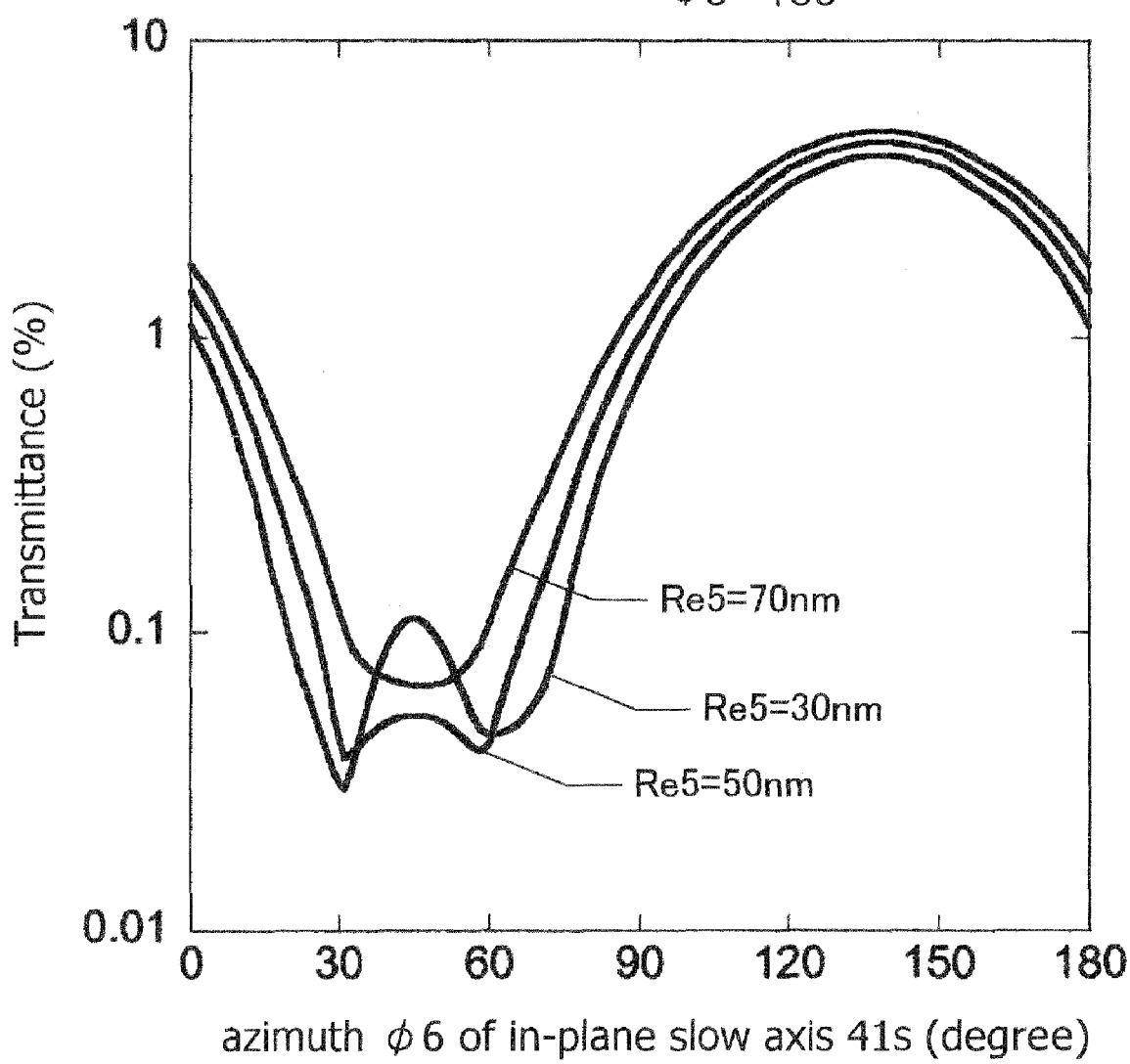
FIG. 18 is a graph showing simulation results of the relation between an azimuth of an in-plane slow axis and a transmittance of a second optical film when in-plane retardations of second and third optical films of the liquid crystal display unit of the fourth embodiment are set equal and the in-plane retardation of the first film is changed.

FIG. 18 shows simulation results of viewing angle characteristics when the in-plane retardation Re5 of the first optical film 40 is different from the in-plane retardations Re6 and Re7 of the second and third optical films 41 and 42. The abscissa represents a slow axis azimuth Φ6 of the second optical film 41 in the unit of "degree (°)", and the ordinate represents a transmittance in the unit of "%". The transmittance is observed along a visual line of an azimuth of 0° and a viewing angle of 50°. The in-plane retardations Re6 and Re7 of the second and third optical films 41 and 42 are both set to 50 nm.

It can be seen that the transmittances change almost similarly at least in a range between 30 nm and 70 nm with respect to the in-plane retardation Re5. A low transmittance is obtained in a range between 30° and 60° with respect to the in-plane slow axis azimuth Φ6 of the second optical film 41. These evaluation results indicate that the viewing angle characteristics are not influenced greatly even if the in-plane retardation Re5 of the first optical film 40 is not uniform in the in-plane and varies in a range between 30 nm and 70 nm.

Figure 19:
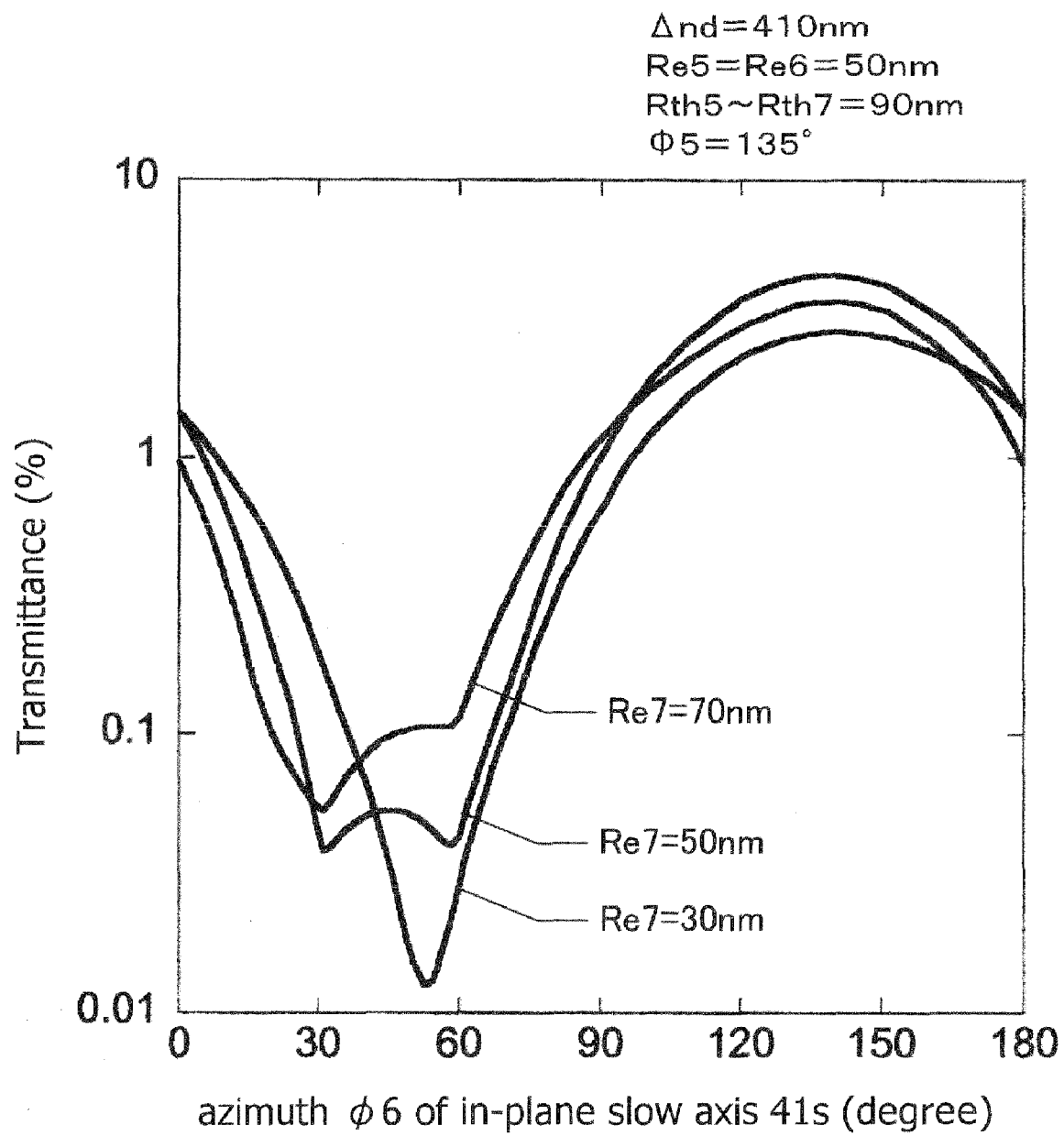
FIG. 19 is a graph showing simulation results of the relation between an azimuth of an in-plane slow axis and a transmittance of a second optical film when in-plane retardations of first and second optical films of the liquid crystal display unit of the fourth embodiment are set equal and the in-plane retardation of the third optical film is changed.

FIG. 19 shows simulation results of viewing angle characteristics when the in-plane retardation Re7 of the third optical film 42 is different from the in-plane retardations Re5 and Re6 of the first and second optical films 40 and 41. The abscissa represents a slow axis azimuth Φ6 of the second optical film 41 in the unit of "degree (°)", and the ordinate represents a transmittance in the unit of "%". The transmittance is observed along a visual line of an azimuth of 0° and a viewing angle of 50°. The in-plane retardations Re5 and Re6 of the first and second optical films 40 and 41 were both set to 50 nm.

The transmittances change almost similarly at least in a range between 30 nm and 70 nm with respect to the in-plane retardation Re7. A low transmittance is obtained in a range between 30° and 60° with respect to the in-plane slow axis azimuth Φ6 of the second optical film 41. These evaluation results indicate that the viewing angle characteristics are not influenced greatly even if the in-plane retardation Re7 of the third optical film 42 is not uniform in the in-plane and varies in a range between 30 nm and 70 nm.

Figure 20:
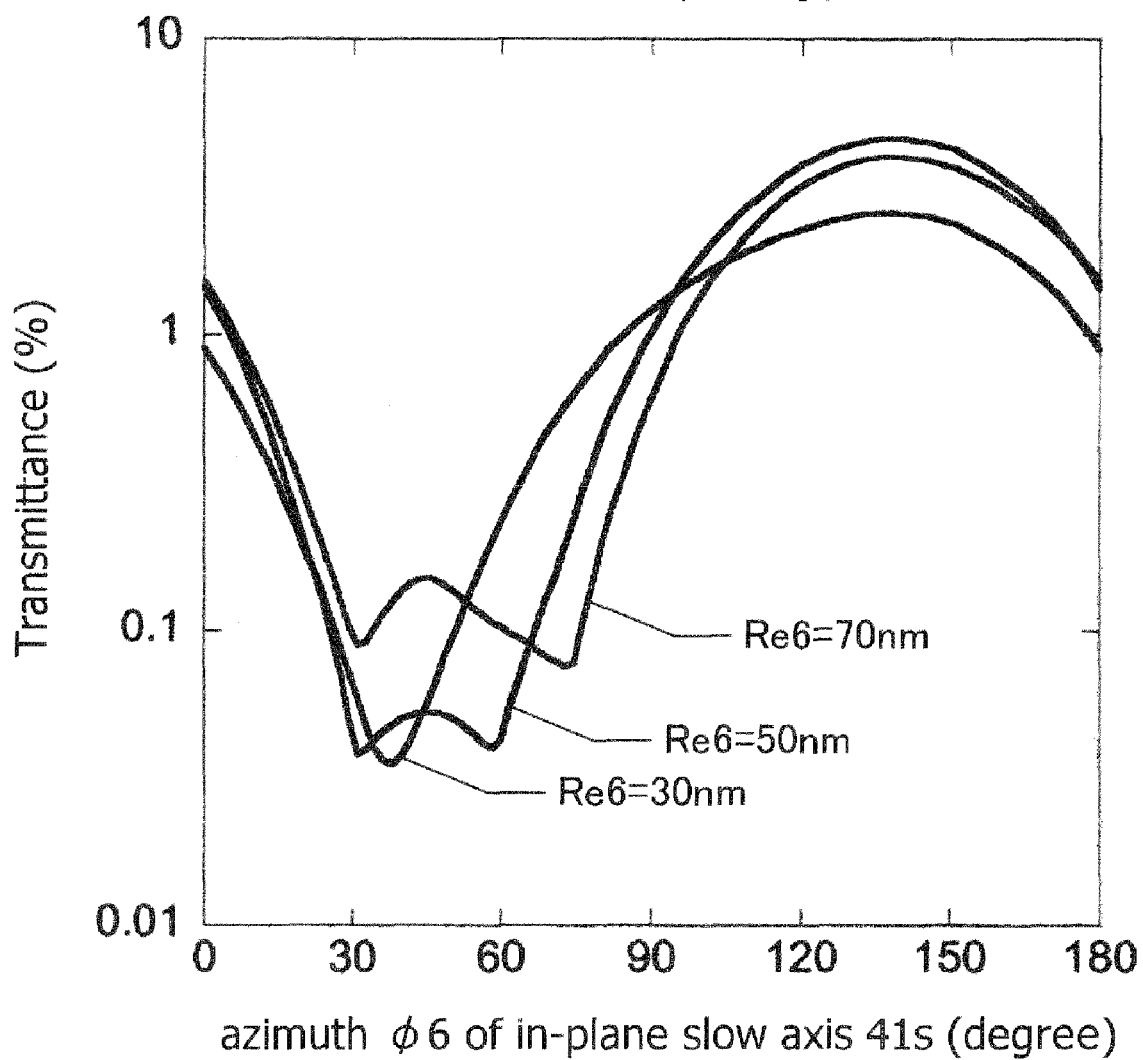
FIG. 20 is a graph showing simulation results of the relation between an azimuth of an in-plane slow axis and a transmittance of a second optical film when in-plane retardations of first and third optical films of the liquid crystal display unit of the fourth embodiment are set equal and the in-plane retardation of the second optical film is changed.

FIG. 20 shows simulation results of viewing angle characteristics when the in-plane retardation Re6 of the second optical film 41 is different from the in-plane retardations Re5 and Re7 of the first and third optical films 40 and 42. The abscissa represents a slow axis azimuth Φ6 of the second optical film 41 in the unit of "degree (°)", and the ordinate represents a transmittance in the unit of "%". The transmittance is observed along a visual line of an azimuth of 0° and a viewing angle of 50°. The in-plane retardations Re5 and Re7 of the first and third optical films 40 and 42 are both set to 50 nm.

The transmittances change almost similarly at least in a range between 30 nm and 70 nm with respect to the in-plane retardation Re6. A low transmittance is obtained in a range between 30° and 60° with respect to the in-plane slow axis azimuth Φ6 of the second optical film 41. These evaluation results indicate that the viewing angle characteristics are not influenced greatly even if the in-plane retardation Re6 of the second optical film 41 is not uniform in the in-plane and varies in a range between 30 nm and 70 nm.

It can be considered from the above-described analysis results that it is preferable to set the in-plane slow axis azimuth Φ5 of the first optical film 40 to 135° in order to realize good viewing angle characteristics. Namely, it is preferable that the in-plane slow axis 40s of the first optical film 40 and the absorption axis 32a of the front side polarizer 30 are disposed to be parallel to each other. In this case, the in-plane slow axis azimuth Φ6 of the second optical film 41 is preferably set in a range between 30° and 60°. Namely, it is preferable that an angle between the in-plane slow axis 41s of the second optical film 41 and the absorption axis 32a of the front side polarizer 30 is set in a range between 75° and 105°. It is preferable that the in-plane slow axis 41s of the second optical film 41 and the in-plane slow axis 42s of the third optical film 42 are disposed to be perpendicular to each other. The in-plane axis retardations Re5 to Re7 of the first to third optical films 40 to 42 are preferably set in a range between 30 nm and 70 nm. Further, it is preferable that a difference between each of the in-plane retardations Re5 to Re7 of the first to third optical films 40 to 42 and an average of the in-plane retardations of the first to third optical films 40 to 42 is 10 nm or smaller than 10 nm.

The above-described structures can effectively suppress the viewing angle characteristics from being degraded when the retardation Δnd of the liquid crystal cell 20 is in a range between 550 nm and 1080 nm.

It is preferable that a total of the in-plane retardations Rth5 to Rth7 of the first to third optical films 40 to 42 falls in a range between 0.5 times and 1 time the retardation Δnd of the liquid crystal cell 20 (between half of the retardation Δnd and the retardation Δnd).

Further, the viewing angle improvement effects can be obtained even if the first to third optical films having an in-plane retardation larger than 0 and not larger than 300 nm are used. A negative biaxial film having such optical anisotropy is available easily.

[Fifth Embodiment]

Next, the fifth embodiment will be described. For the liquid crystal display device of the fifth embodiment, the thickness direction retardations Rth5 to Rth7 of the first to third optical films 40 to 42 of the liquid crystal display device shown in FIG. 14 are set to 300 nm. The thickness direction retardation of 300 nm corresponds to a maximum value in a range capable of uniformly working an optical film using norbornene based cyclic olefin. A retardation Δnd of the liquid crystal cell 20 is set to 1080 nm and a pretilt angle of liquid crystal molecules is set to 89.9°. An in-plane slow axis azimuth Φ5 of the first optical film 40 is set to 135°, and the in-plane slow axis 42s of the third optical film 42 and the in-plane slow axis 41s of the second optical film 41 are disposed to be perpendicular to each other. Transmittance simulation is conducted in three cases where all the in-plane retardations Re5 to Re7 of the first to third optical films 40 to 42 are set to 30 nm, 50 nm, and 70 nm.

Figure 21:
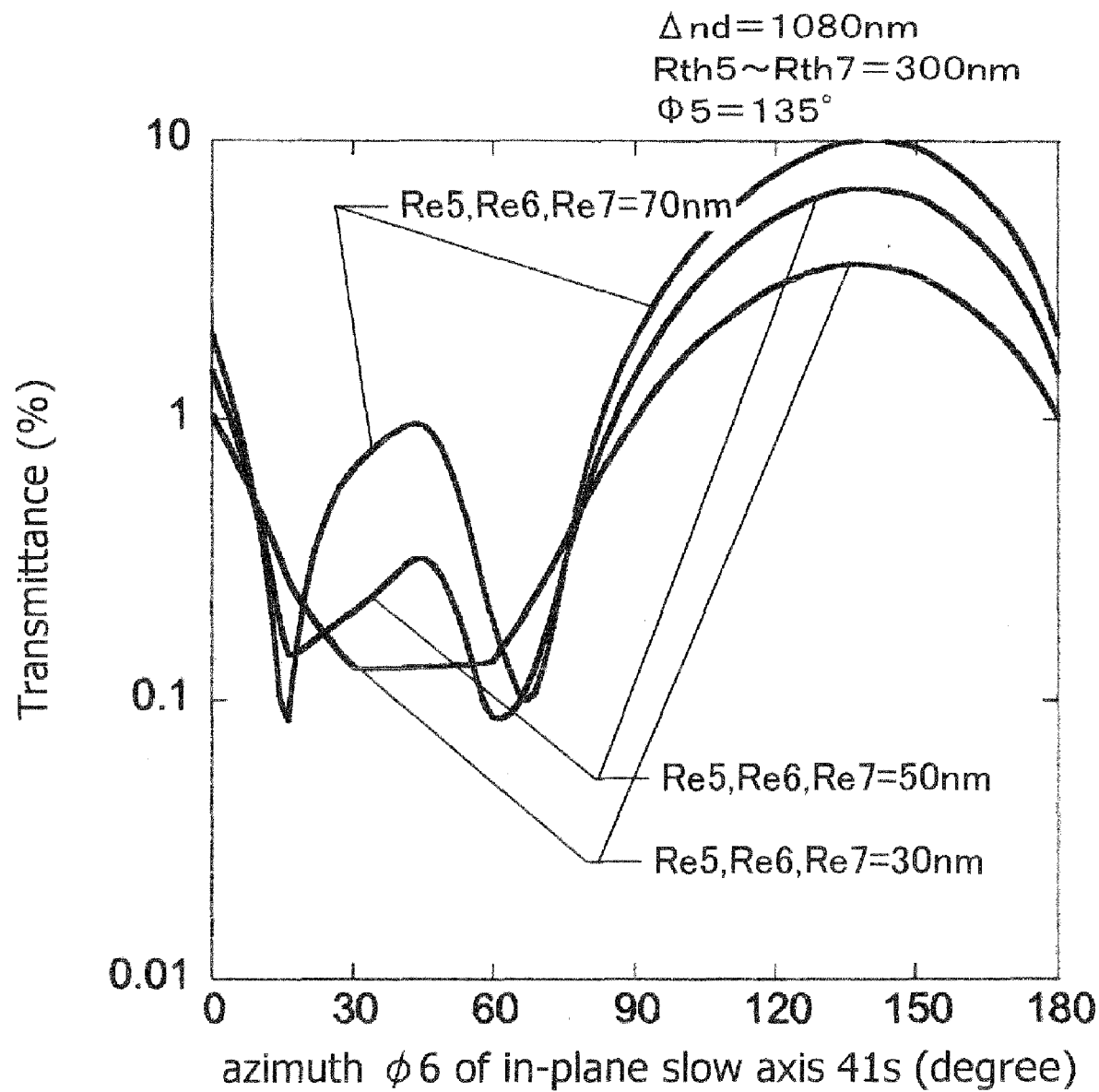
FIG. 21 is a graph showing simulation results of the relation between an azimuth of an in-plane slow axis and a transmittance of a second optical film of a liquid crystal display unit according to a fifth embodiment.

FIG. 21 shows simulation results. The abscissa represents a slow axis azimuth Φ6 of the second optical film 41 in the unit of "degree (°)", and the ordinate represents a transmittance in the unit of "%". The transmittance is observed along a visual line of an azimuth of 0° and a viewing angle of 50°. A transmittance becomes low in a range between 15° and 70° with respect to the in-plane slow axis azimuth Φ6 in all cases of the in-plane retardations Re5 to Re7 of the first to third optical films 40 to 42 of 30 nm, 50 nm, and 70 nm. This range includes the preferable range between 30° and 60° with respect to the in-plane slow axis azimuth Φ6 of the fourth embodiment.

It is expected from the fourth and fifth embodiments that the viewing angle improvement effects can be obtained even if the first to third optical films 40 to 42 are used having the thickness direction retardation being in a range between 50 nm and 300 nm.

[Sixth Embodiment]

Figure 22:
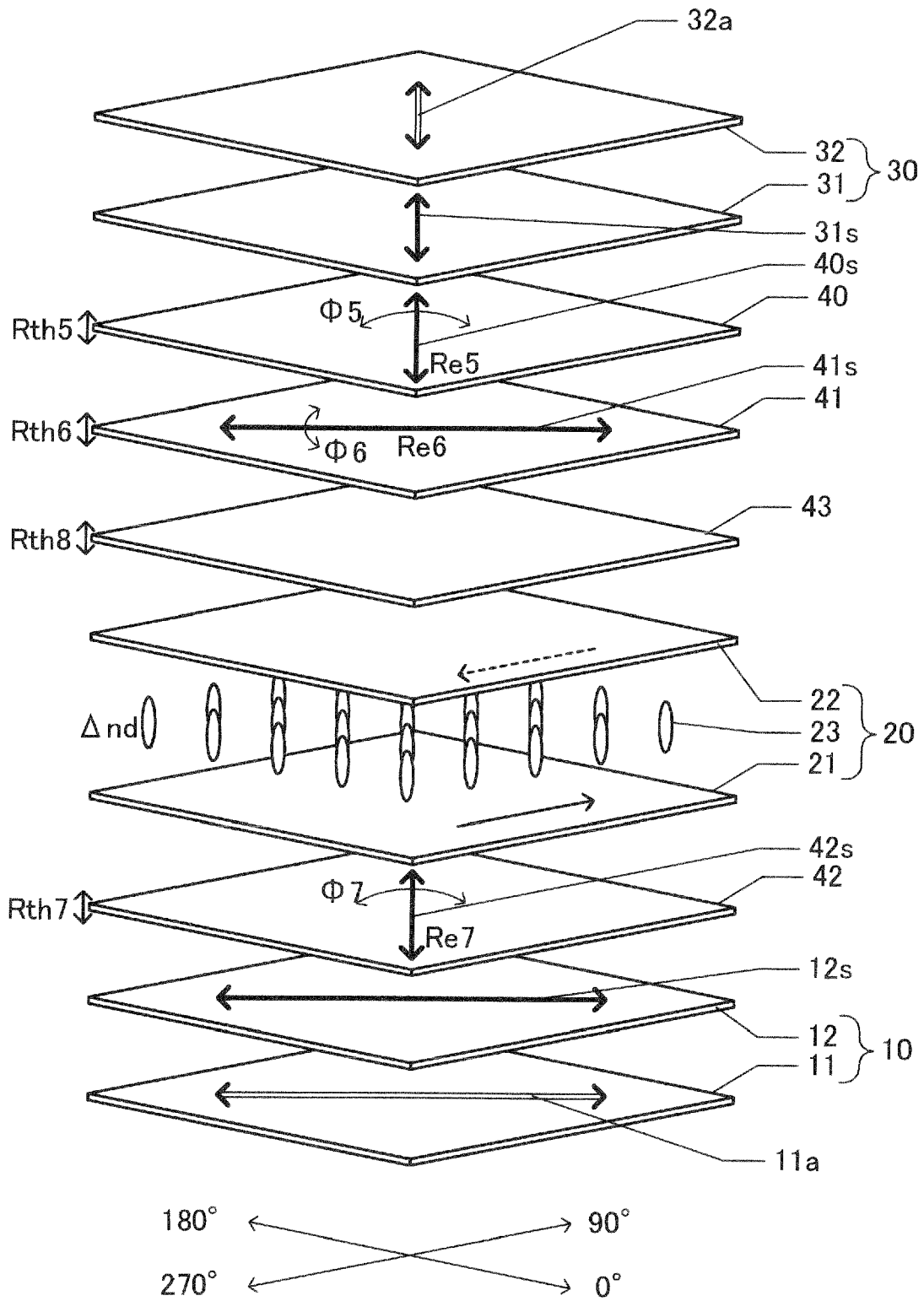
FIG. 22 is a schematic diagram showing the outline structure of a liquid crystal display unit according to a sixth embodiment.

FIG. 22 is a schematic diagram showing the outline structure of a liquid crystal display device according to the sixth embodiment. In the following, description will be made on different points from the liquid crystal display device of the fourth embodiment shown in FIG. 14. A fourth optical film 43 is disposed between the second optical film 41 and liquid crystal cell 20. Other arrangements are the same as those of the fourth embodiment.

The first to third optical films 40 to 42 are negative biaxial films. Each of the in-plane retardations Re5 to Re 7 is 50 nm, and each of the thickness direction retardations Rth5 to Rth7 is 220 nm. The negative biaxial film having such optical anisotropy can be realized by using norbornene based cyclic olefin, and is readily available. The fourth optical film 43 is a negative C plate having a thickness direction retardation Rth8 of 220 nm. Namely, the in-plane retardation of the fourth optical film 43 is 0.

Figure 23:
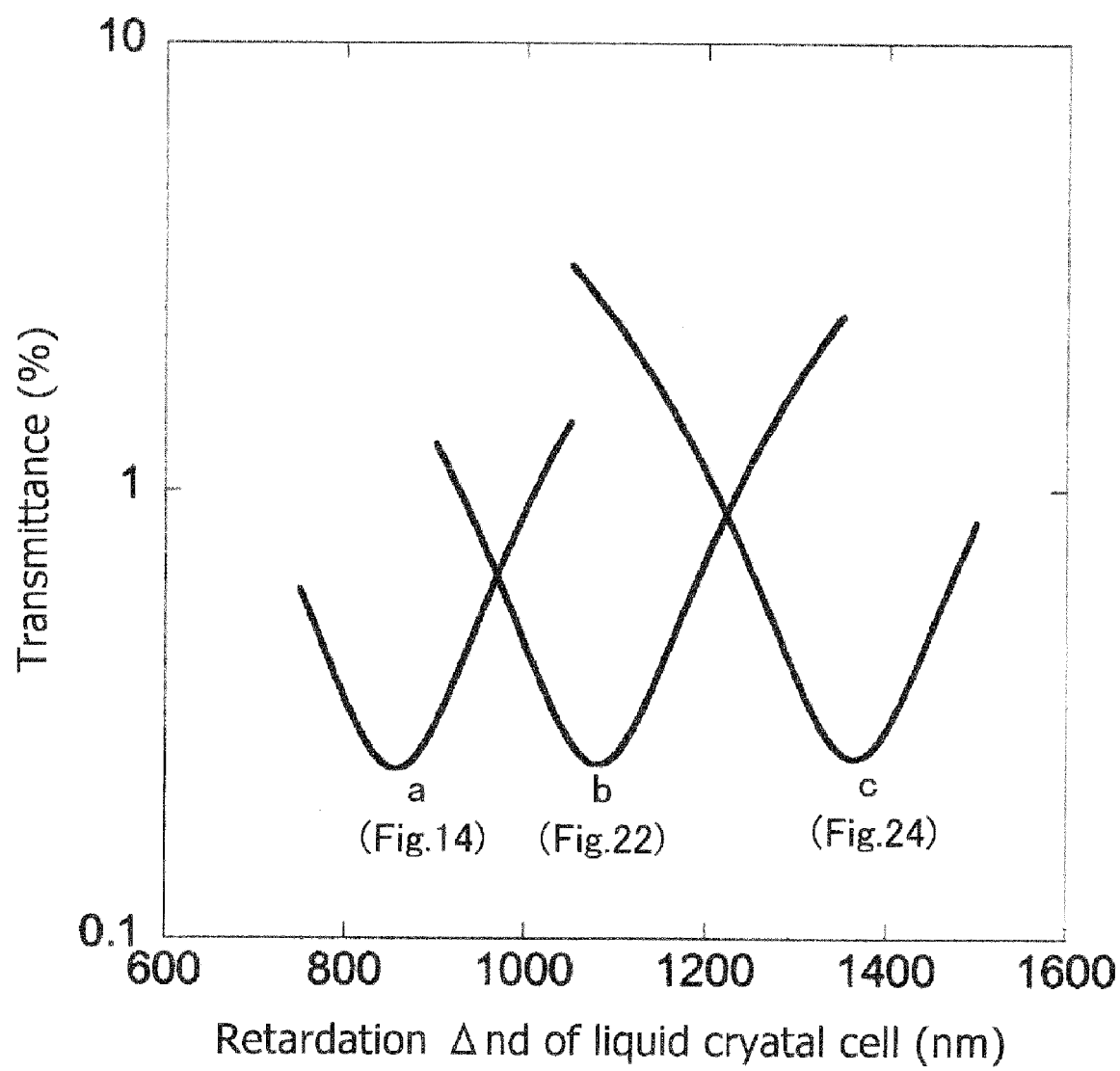
FIG. 23 is a graph showing simulation results of the relation between a retardation and a transmittance of each liquid crystal cell of the liquid crystal display devices of the fourth, sixth and seventh embodiments.

FIG. 23 shows simulation results of a relation between a retardation Δnd of the liquid crystal cell 20 and a transmittance. The abscissa represents a retardation Δnd of the liquid crystal cell 20 in the unit of "nm", and the ordinate represents a transmittance in the unit of "%". The in-plane slow axis azimuth Φ5 of the first optical film 40 and the in-plane slow axis azimuth Φ7 of the third optical film 42 are both set to 135°, and the in-plane slow axis azimuth Φ6 of the second optical film 41 is set to 45°. The transmittance is observed along a visual line of an azimuth of 0° and a viewing angle of 50°.

A curve b in FIG. 23 indicates a transmittance of the liquid crystal display device of the sixth embodiment shown in FIG. 22, and a curve a indicates a transmittance of the liquid crystal display device of the fourth embodiment shown in FIG. 14. Both the transmittances have a downward convex curve and have similar shapes. The liquid crystal display device of the sixth embodiment shown in FIG. 22 has a minimum transmittance at a larger retardation Δnd. A difference between retardations Δnd indicating minimum transmittances corresponds to the thickness direction retardation Rth8 of the fourth optical film 43 made of the negative C plate. As the fourth optical film 43 of the negative C plate is disposed, good viewing angle characteristics can be realized for the liquid crystal cell 20 having a larger retardation Δnd.

An optical film available in markets as a negative C plate does not always have an in-plane retardation of strictly 0, but has an in-plane retardation of about 7 nm in some cases. As the fourth optical film 43, a negative biaxial film having an in-plane retardation of 7 nm or smaller than 7 nm may be used.

Although the fourth optical film 43 is made of a single negative C plate in the sixth embodiment, it may be made of a plurality of negative C plates. Further, the fourth optical film 43 may be disposed between the liquid crystal cell 20 and third optical film 42. Furthermore, when a plurality of negative C plates are used, some C plates may be disposed between the liquid crystal cell 20 and second optical film 41, and the remaining C plates are disposed between the liquid crystal cell 20 and third optical film 42.

As described above, by disposing the fourth optical film 43, an insufficient total of the thickness direction retardations Rth5 to Rth7 of the first to third optical films 40 to 42 is compensated so that better viewing angle characteristics can be obtained.

The thickness direction retardation of the fourth optical film 43 is preferably in a range between 50 nm and 300 nm. The negative C plate having the thickness direction retardation in this range is readily available. Providing the fourth optical film 43 is effective particularly when the retardation Δnd of the liquid crystal cell 20 is in a range between 460 nm and 1380 nm.

It is preferable that a total of the thickness direction retardations Rth5 to Rth8 of the first to fourth optical films 40 to 43 falls in a range between 0.5 times and 1 time the retardation Δnd of the liquid crystal cell 20 (between half of the retardation Δnd and the retardation Δnd).

[Seventh Embodiment]

Figure 24:
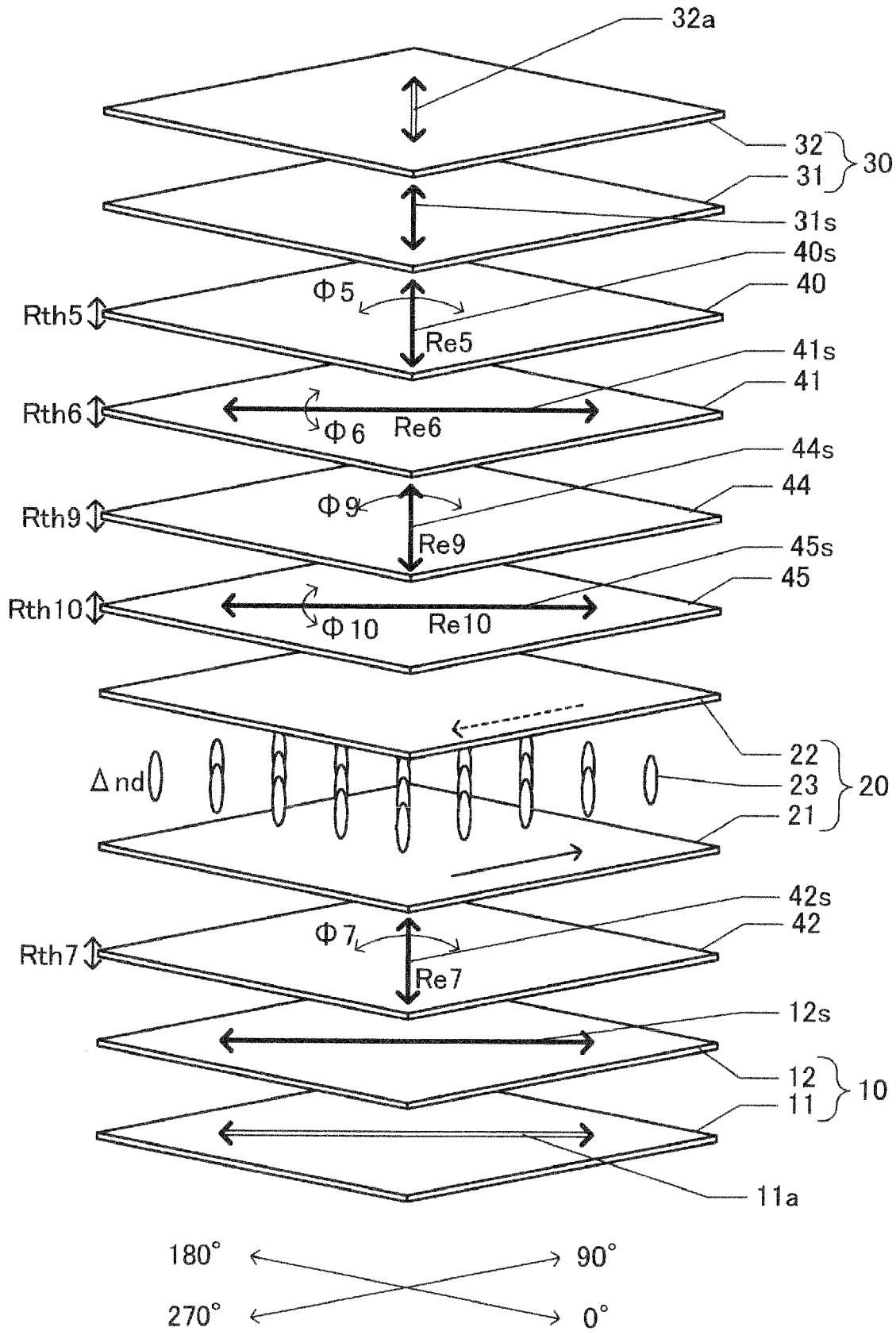
FIG. 24 is a schematic diagram showing the outline structure of a liquid crystal display unit according to the seventh embodiment.

FIG. 24 is a schematic diagram showing the outline structure of a liquid crystal display device according to the seventh embodiment. In the seventh embodiment, a fifth optical film 44 and a sixth optical film 45 are disposed instead of the fourth optical film 43 of the liquid crystal display device of the sixth embodiment shown in FIG. 22. The fifth optical film 45 is disposed on the side of the second optical film 41, whereas the sixth optical film 45 is disposed on the side of the liquid crystal cell 20. The arrangement of other optical films is the same as the sixth embodiment. The fifth optical film 44 and sixth optical film 45 are positive A plates or negative biaxial films. The in-plane slow axis azimuth 44s of the fifth optical film 44 and the in-plane slow axis azimuth 45s of the sixth optical film 45 are preferably disposed to be perpendicular to each other.

A relation between a transmittance and a retardation Δnd of the liquid crystal cell 20 is obtained through simulation, under the conditions that each of the in-plane retardations Re5 to Re7, Re9 and Re10 of the first to third optical films 40 to 42, and fifth and sixth optical films 44 and 45 is 50 nm, and each of the thickness direction retardations Rth5 to Rth7, Rth9 and Rth10 is 220 nm. The transmittance is observed along a visual line of an azimuth of 0° and a viewing angle of 50°.

The simulation result is indicated by a curve c in FIG. 23. The in-plane slow axis azimuth Φ5 of the first optical film 40 and the in-plane slow axis azimuth Φ7 of the third optical film 42 are set to 135°, and the in-plane slow axis azimuth Φ6 of the second optical film 41 is set to 45°. The in-plane slow axis azimuth Φ9 of the fifth optical film 44 is set to 90°, and the in-plane slow axis azimuth Φ10 of the sixth optical film 45 is set to 10°.

A shape of the curve c is similar to the shapes of other curves a and b. As compared to the curve b indicating the transmittance of the liquid crystal display device shown in FIG. 22, the curve c takes a minimum value at a larger retardation Δnd. This is because a total of the thickness direction retardations Rth9 and Rth10 of the fifth and sixth optical films 44 and 45 is larger than the thickness direction retardation Rth8 of the fourth optical film 43 shown in FIG. 22. In this manner, the viewing angle compensation can be performed even in the case that the retardation Δnd of the liquid crystal cell is larger, by disposing the two positive A plates or negative biaxial films having in-plane slow axes, which are perpendicular to each other, between the liquid crystal cell 20 and second optical film 41.

A relation between a transmittance and an in-plane slow axis azimuth Φ9 of the fifth optical film 44 is obtained through simulation. The in-plane slow axis azimuth Φ9 is varied while maintaining the perpendicular relation between the in-plane slow axis 44s of the fifth optical film 44 and the in-plane slow axis 45s of the sixth optical film 45.

Figure 25:
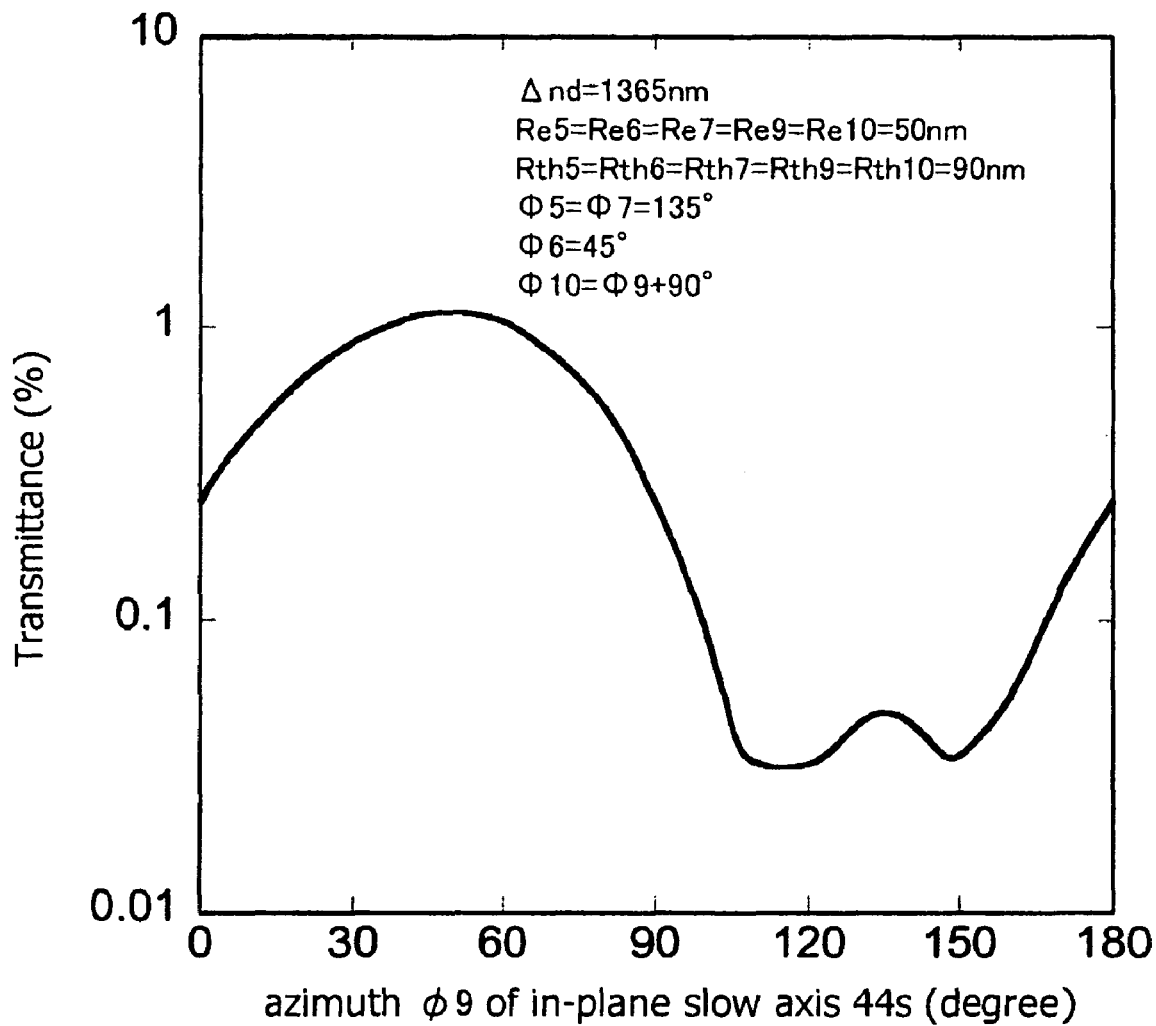
FIG. 25 is a graph showing simulation results of the relation between an azimuth of the in-plane slow axis and a transmittance of a fifth optical film of the liquid crystal display unit of the seventh embodiment.

FIG. 25 shows simulation results. The abscissa represents an in-plane slow axis azimuth Φ9 in the unit of "degree (°)", and the ordinate represents a transmittance in the unit of "%". The transmittance is observed along a visual line of an azimuth of 0° and a viewing angle of 50°. A relatively low transmittance is obtained in a range between 90° and 180° with respect to the in-plane slow axis azimuth Φ9 of the fifth optical film 44. In order to obtain good viewing angle characteristics, the in-plane slow axis azimuth Φ9 is set preferably in a range between 90° and 180°, and more preferably in a range between 115° and 155°. Namely, it is preferable that the in-plane slow axis 44s of the fifth optical film 44 and the in-plane slow axis 41s of the adjacent second optical film 41 is made perpendicular to each other or a shift angle from the perpendicular relation is set in a range of ±20°.

It is preferable that a positive A plate or negative biaxial film having an in-plane retardation larger than 30 nm and smaller than or equal to 70 nm and a thickness direction retardation larger than or equal to 50 nm and smaller than or equal to 300 nm is used as the first to third optical films 40 to 42 and fifth and sixth optical films 44 and 45. The structure of the seventh embodiment is effective particularly in a range between 510 nm and 1380 nm with respect to the retardation Δnd of the liquid crystal cell 20.

In the seventh embodiment, a pair of fifth and sixth optical films 44 and 45 having in-plane slow axes perpendicular to each other is disposed between the second optical film 41 and liquid crystal cell 20. Instead, a plurality of pairs of negative biaxial films having in-plane slow axes perpendicular to each other may be disposed. By disposing the plurality of pairs, viewing angle compensation can be performed even if the retardation Δnd of the liquid crystal cell 20 is larger.

It is preferable that a total of the thickness direction retardations Rth5 to Rth7, Rth9 and Rth10 of the first to third optical films 40 to 42 and fifth and sixth optical films 44 and 45 falls in a range between 0.5 times and 1 time the retardation Δnd of the liquid crystal cell 20 (between half of the retardation Δnd and the retardation Δnd).

[Eighth Embodiment]

Figure 26:
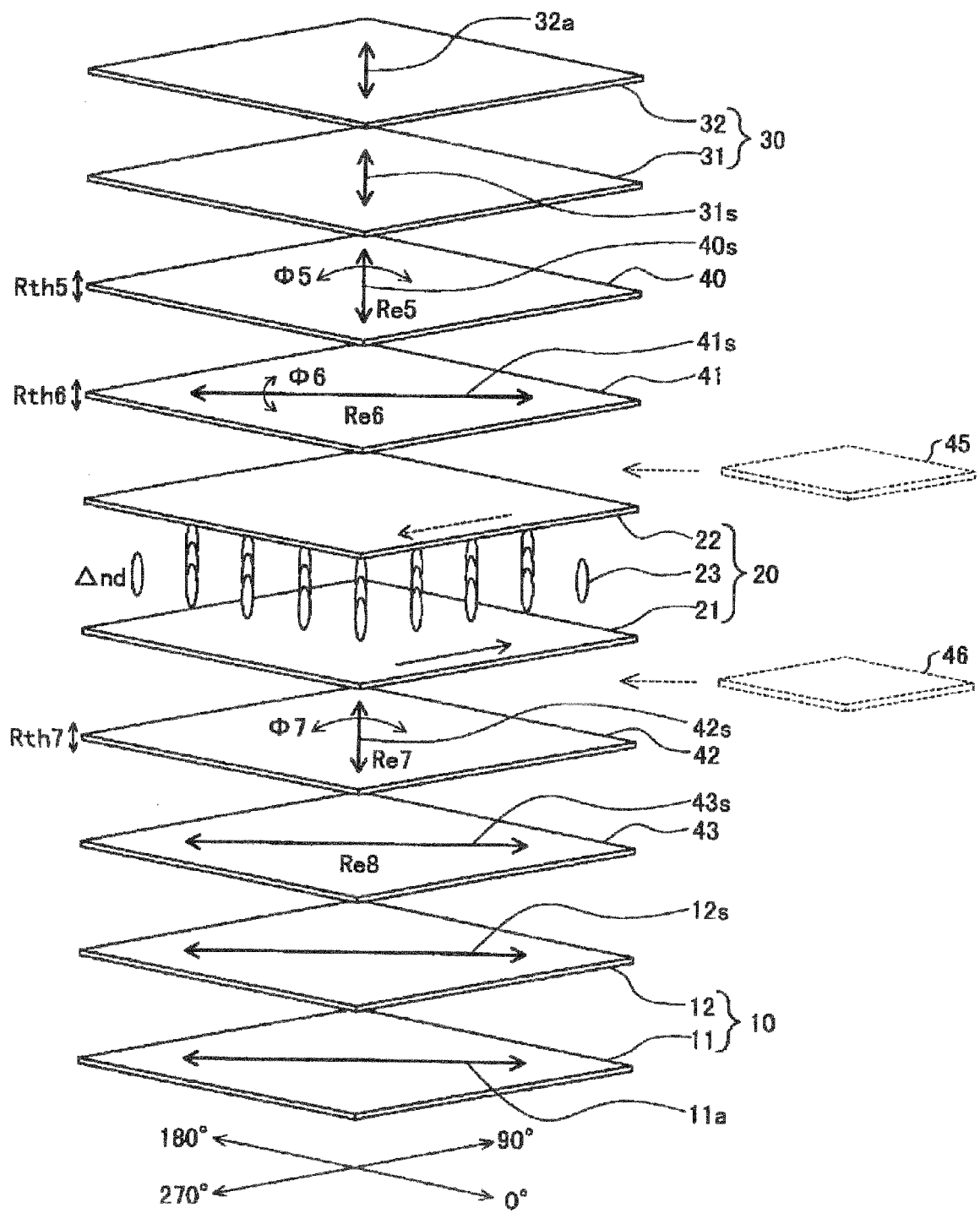
FIG. 26 is a schematic diagram showing the outline structure of a liquid crystal display unit according to an eighth embodiment.

FIG. 26 is a schematic diagram showing the outline structure of a liquid crystal display device according to the eighth embodiment. A first optical film 40 and a second optical film 41 made of negative biaxial films having the same optical characteristics are disposed in this order from the polarizer toward the liquid crystal cell 20 between the front side polarizer 30 and liquid crystal cell 20. A third optical film 42 and a fourth optical film 43 made of negative biaxial films having the same optical characteristics are disposed in this order from the liquid crystal cell 20 toward the rear side polarizer 10 between the rear side polarizer 10 and liquid crystal cell 20. The optical characteristics of the four optical films 40 to 43 are the same. Two negative biaxial films are disposed on both sides of the liquid crystal cell 20. The absorption axes 32a and 11a of the polarizers are respectively parallel (same azimuth angle), to the slow axes 40s and 12s of the adjacent negative biaxial films, and the slow axes 41s and 43s of the negative biaxial films on the side of the liquid crystal cell 20 are respectively perpendicular to the slow axes 40s and 12s of the negative biaxial films on the side of the polarizer.

A retardation Δnd of the liquid crystal cell 20 is, for example, 500 nm. The first to fourth optical films 40 to 43 have optical anisotropy satisfying nx>ny≧nz. Each of the in-plane retardations Re5 to Re8 of the first to fourth optical films 40 to 43 satisfies 0 nm<Re≦300 nm and preferably 30 nm≦Re≦70 nm, e.g., 50 nm, and each of the thickness direction retardations Rth5 to Rth8 satisfies 50 nm≦Rth≦300 nm and preferably 90 nm≦Rth≦300 nm, e.g., 90 nm. A maximum Rth=1200 nm becomes possible by using four optical films.

Slow axis azimuths of a negative biaxial film and optical characteristics of the liquid crystal display device in an off state are studied through simulation. A retardation Δnd of the liquid crystal cell 20 is set to 500 nm, and the four optical films 40 to 43 have the same optical characteristics of Re=50 nm and Rth=90 nm. An total of Rth of all optical films is 360 nm which is about more than 70% of the retardation of 500 nm of the liquid crystal cell. An azimuth of the absorption axis 11a of the rear side polarizer 10 is 45°, and an azimuth of the absorption axis 32a of the front side polarizer 30 is 135°. Influence of the slow axis azimuth of each of the four optical films 40 to 43 upon a transmittance in an off state is studied.

Figure 27:
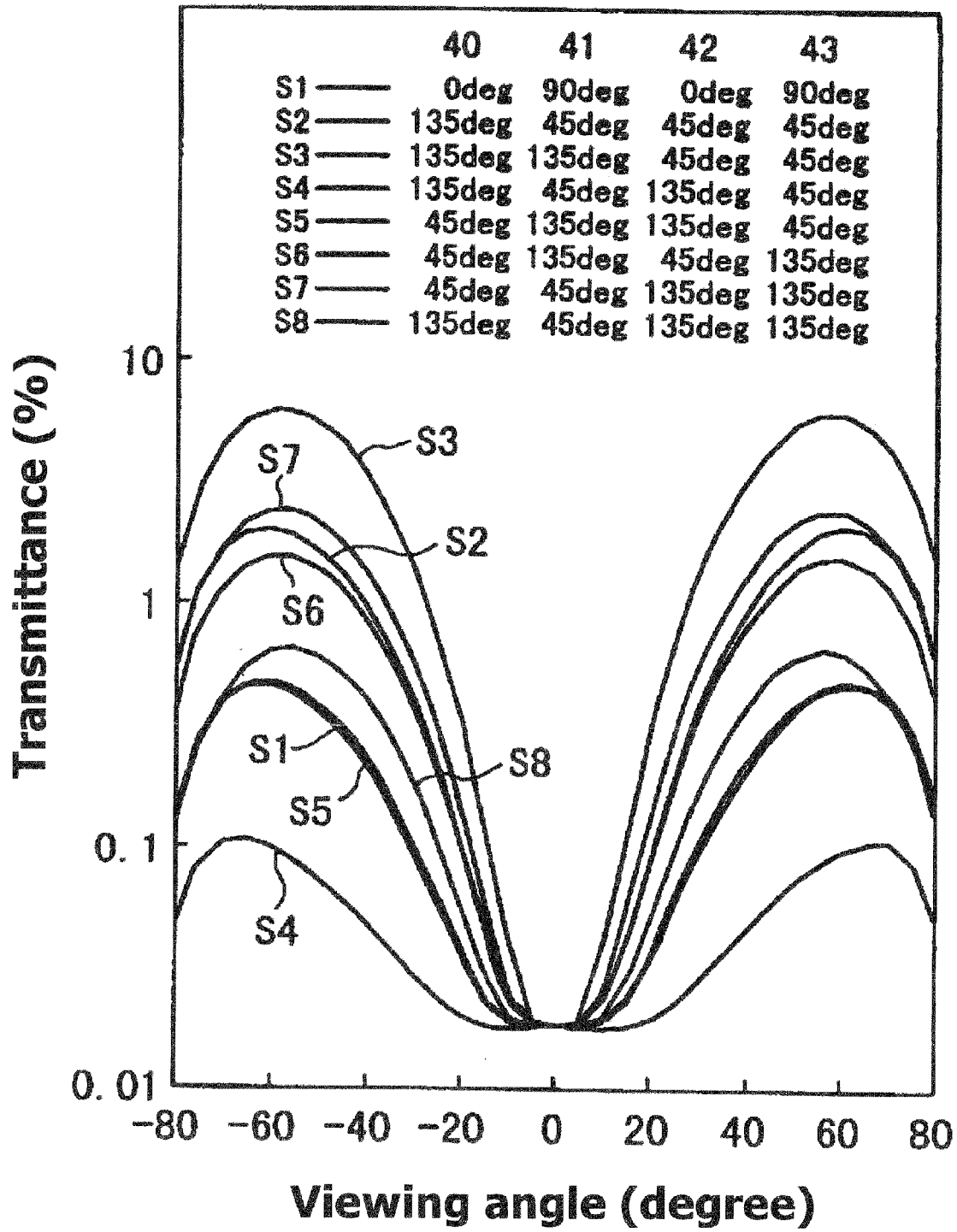
FIG. 27 is a graph showing simulation results of a change in a transmittance (optical leak) during an off state relative to a change in an observation direction from right and left from a substrate normal direction, of each sample having a different slow axis of an optical film of the liquid crystal display unit of the eighth embodiment.

FIG. 27 is a graph showing a change in a transmittance (optical leak) in an off state of each sample with respect to a change in an angle between a substrate normal and a viewing angle to the right and left from the substrate normal direction. As shown, a sample S1 has slow axes of optical films disposed at 0° and 90° of the center azimuths of the absorption axes of the polarizers in cross-Nichol configuration, and samples S2 to S8 of seven types selects slow axis azimuths of four optical films from 45° and 135° perpendicular or parallel to the absorption axes of the polarizers.

The sample S4 has excellent characteristics that a transmittance is extremely low in a wide angle range even if the viewing angle is inclined from the substrate normal direction. The slow axes of the optical films 40 and 43 on the polarizer side are 135° and 45° which are parallel to the absorption axes of the adjacent polarizers. However, transmittances of the samples S2 sand S3 having the slow axis azimuths of 135° and 45° of the optical films 40 and 43 increase steeply as the viewing angle becomes large, and are not preferable.

In the four optical films of the sample 4 having the most excellent characteristics, the slow axis of the optical film on the polarizer side is parallel to the absorption axis of the polarizer, and the slow axis of the optical film on the liquid crystal cell side is perpendicular to the slow axis of the optical film on the polarizer side. It can be considered that this slow axis arrangement is most effective for suppressing optical leak at a viewing angle inclined from the substrate normal direction.

The first to fourth optical films 40 to 43 may be configured of positive A plates instead of negative biaxial films. Also in this case, the preferred azimuths of the slow axes are considered to remain unchanged.

There is an error of angle setting. Although the optical films 40-41 and the optical films 42-43 are prepared in a bonded state, it is considered that a relative position to the polarizer is established during assembly in many cases. Influence of an angle error generated at the assembly stage has been checked. Influence of a shift of the slow axis azimuth of each of the optical films 40 and 43 from the absorption axis azimuth of adjacent polarizers has been studied. The slow axis azimuths of the optical films 41 and 42 are set perpendicular to the slow axis azimuths of the adjacent optical films 40 and 43, respectively. An observing azimuth is a right (azimuth of 0°) and viewing angle is 50°.

Figure 28:
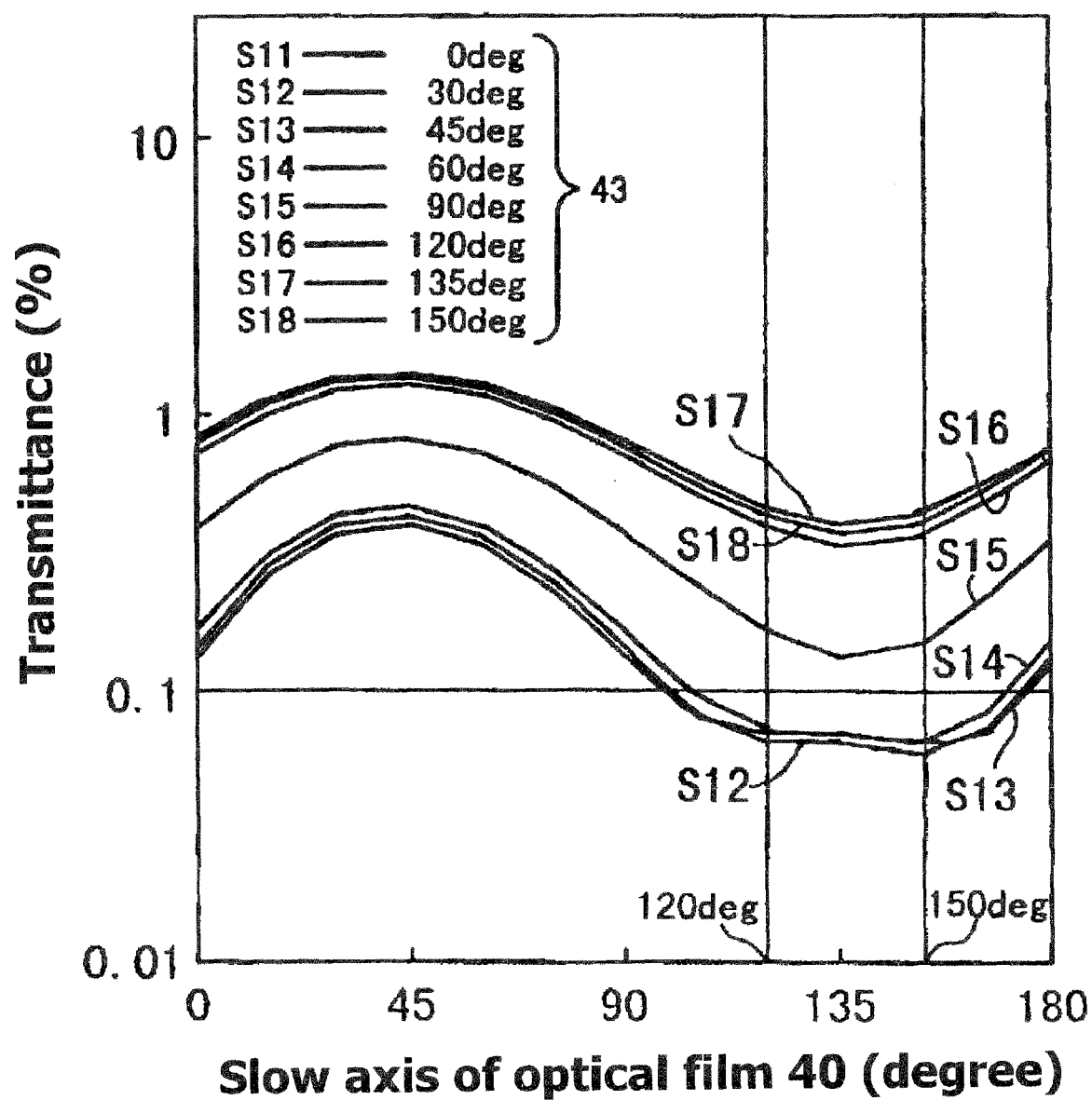
FIG. 28 is a graph showing simulation results of a change in a transmittance during an off state relative to a change in a slow axis azimuth of an optical film on the polarizer side.

FIG. 28 is a graph showing a change in a transmittance at a viewing angle of 50° in an absence of voltage application, with respect to an azimuth, when the perpendicular optical film pair 40-41 is rotated relative to the absorption axis azimuth (135°) of the polarizer 30 and the perpendicular optical film pair 42-43 is rotated relative to the absorption axis azimuth (45°) of the polarizer 10. The abscissa represents a slow axis azimuth of the optical film 40, and the ordinate represents a transmittance. The characteristics of Samples S12, S13 and S14 are particularly excellent in a range between 120° and 150° with respect to the slow axis azimuth of the optical film 40. The slow axis azimuths between 120° and 150° of the first optical film 40 are in a range of ±15° from the absorption axis azimuth (135°) of the adjacent polarizer 30. Samples S12, S13 and S14 have the slow axes of the fourth optical film 43 of 30°, 45° and 60° which are in a range of ±15° from the absorption axis azimuth (45°) of the adjacent polarizer 10. It can be considered from these results that the azimuth range of ±15° can be regarded as approximately the same azimuth. If an angle between two azimuths has a relation of a range between −15° and +15°, this relation is called approximately parallel, and a relation of a range between 75° and 105° is called approximately perpendicular.

In the above-described studies, the in-plane retardations Re of the four optical films are all set to 50 nm. How the relation shown in FIG. 28 rotating the slow axes of the first and fourth optical films changes, is checked at Re of 30 nm and 70 nm.

Figure 29:
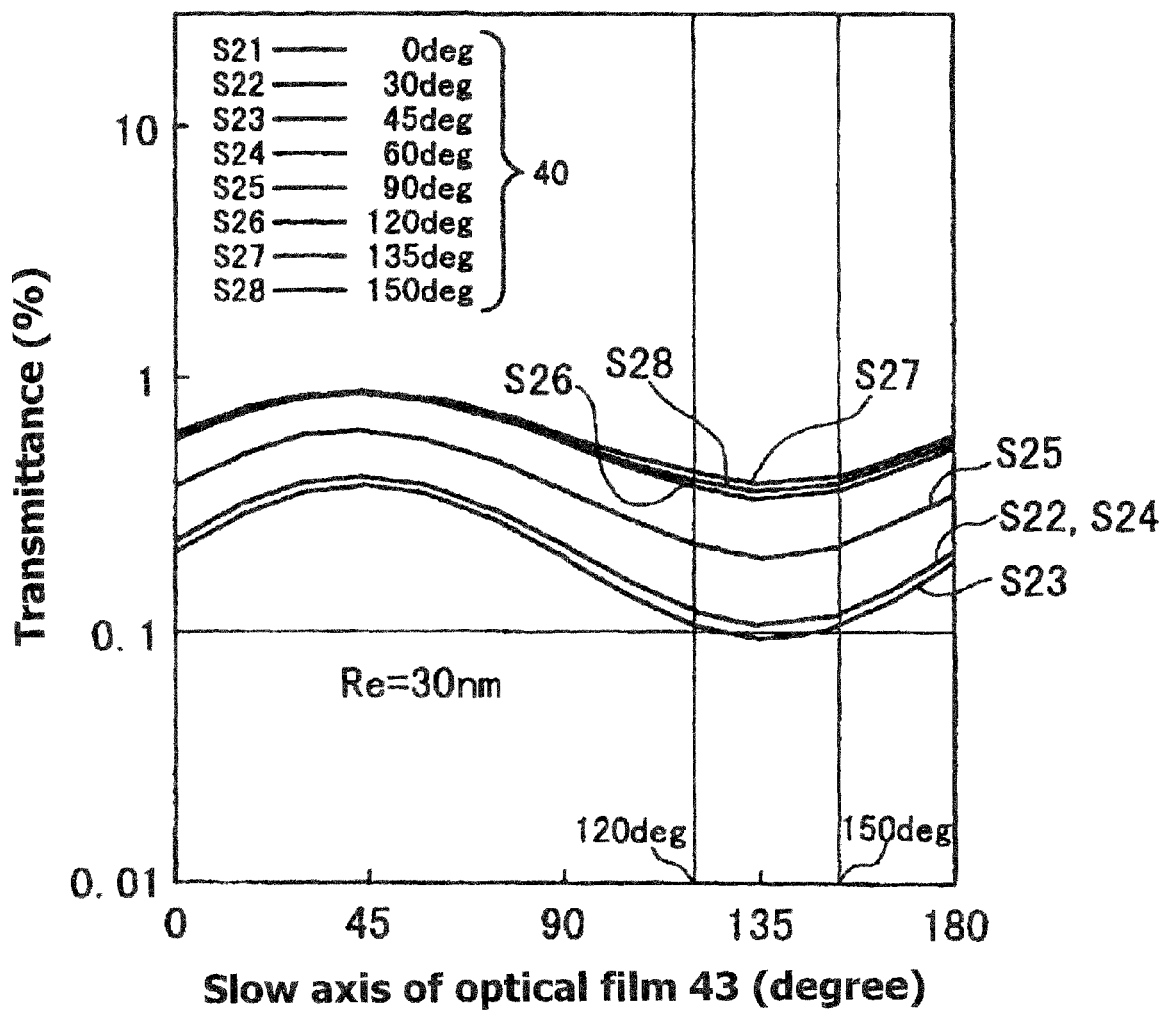
FIG. 29 is a graph showing simulation results of a change in a transmittance similar to that shown in FIG. 5 when Re is set to 30 nm for the liquid crystal display unit of the eighth embodiment.
Figure 30:
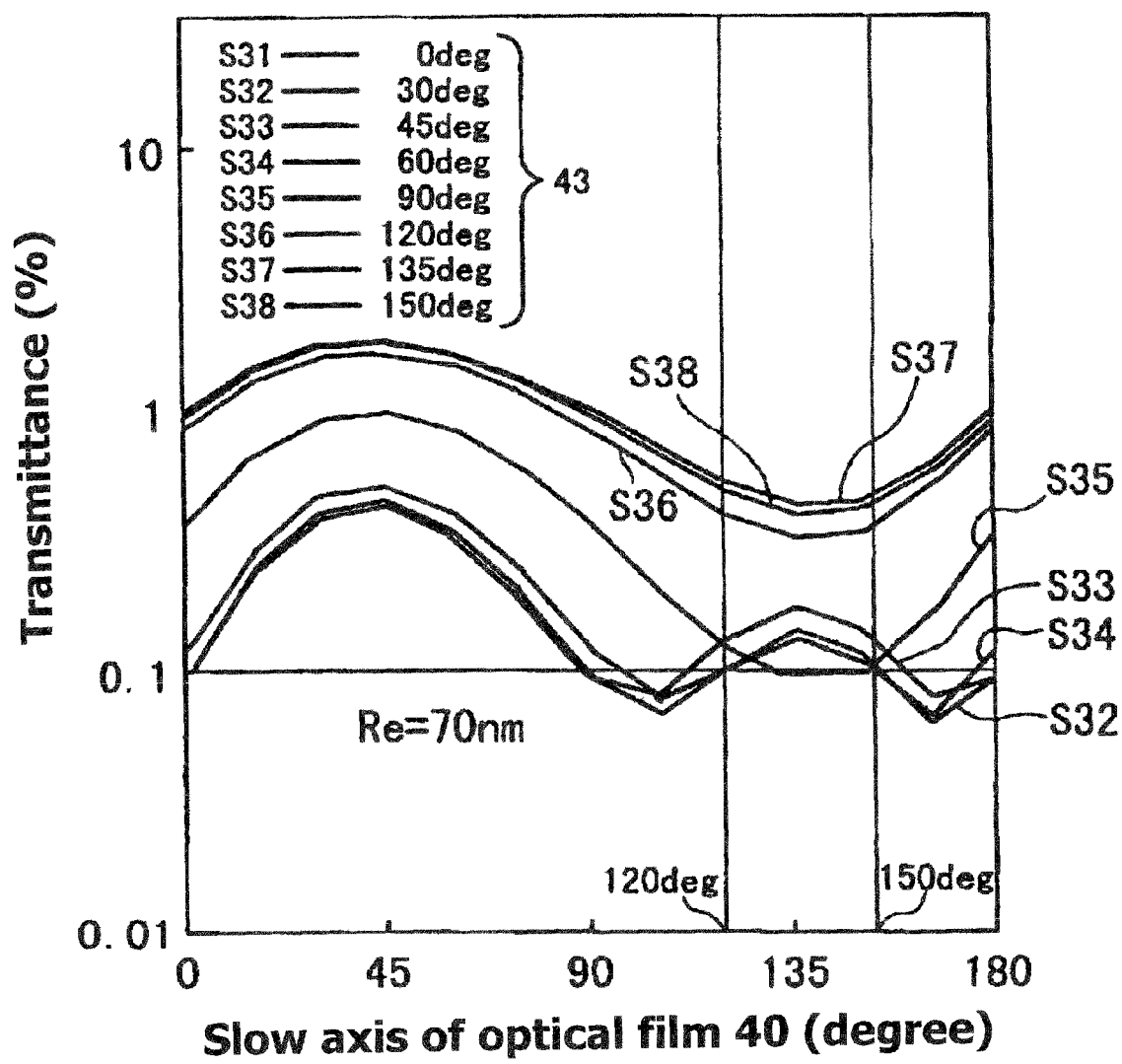
FIG. 30 is a graph showing simulation results of a change in a transmittance similar to that shown in FIG. 5 when Re is set to 70 nm for the liquid crystal display unit of the eighth embodiment.

FIG. 29 shows transmittances at Re=30 nm, and FIG. 30 shows transmittances at Re=70 nm. In FIG. 29, although the transmittance (optical leak) increases slightly, almost a similar tendency to that of FIG. 28 can be observed. There is no change in the conclusion that the slow axis azimuth of an optical film adjacent to the polarizer is preferably in a range of ±15° from the absorption axis of the polarizer.

In FIG. 30, transmittances of samples S32, S33 and S34 near at 135° change to an upward convex shape, and are higher than a transmittance of a sample S35 in a partial portion of a range between 120° and 150°. However, since the transmittances in the range between 120° and 150° are low, it can be considered that there is no change in the conclusion that the slow axis azimuth of an optical film adjacent to the polarizer is preferably in a range of ±15° from the absorption axis of the polarizer. In-plane retardation Re is preferably 30 nm to 70 nm. If FIG. 30 is excluded and FIGS. 28 and 29 are adopted, the optical characteristics are more preferable and Re of 30 nm to 50 nm is more preferable.

In the above-described studies, all the four optical films has the same optical characteristics. In actual optical films, the perfectly uniform optical characteristics, Re and Rth in particular, are difficult to realize. Reviews are conducted through simulation for the case that only the second optical film 41 has a different Re from those of the other optical films.

Figure 31:
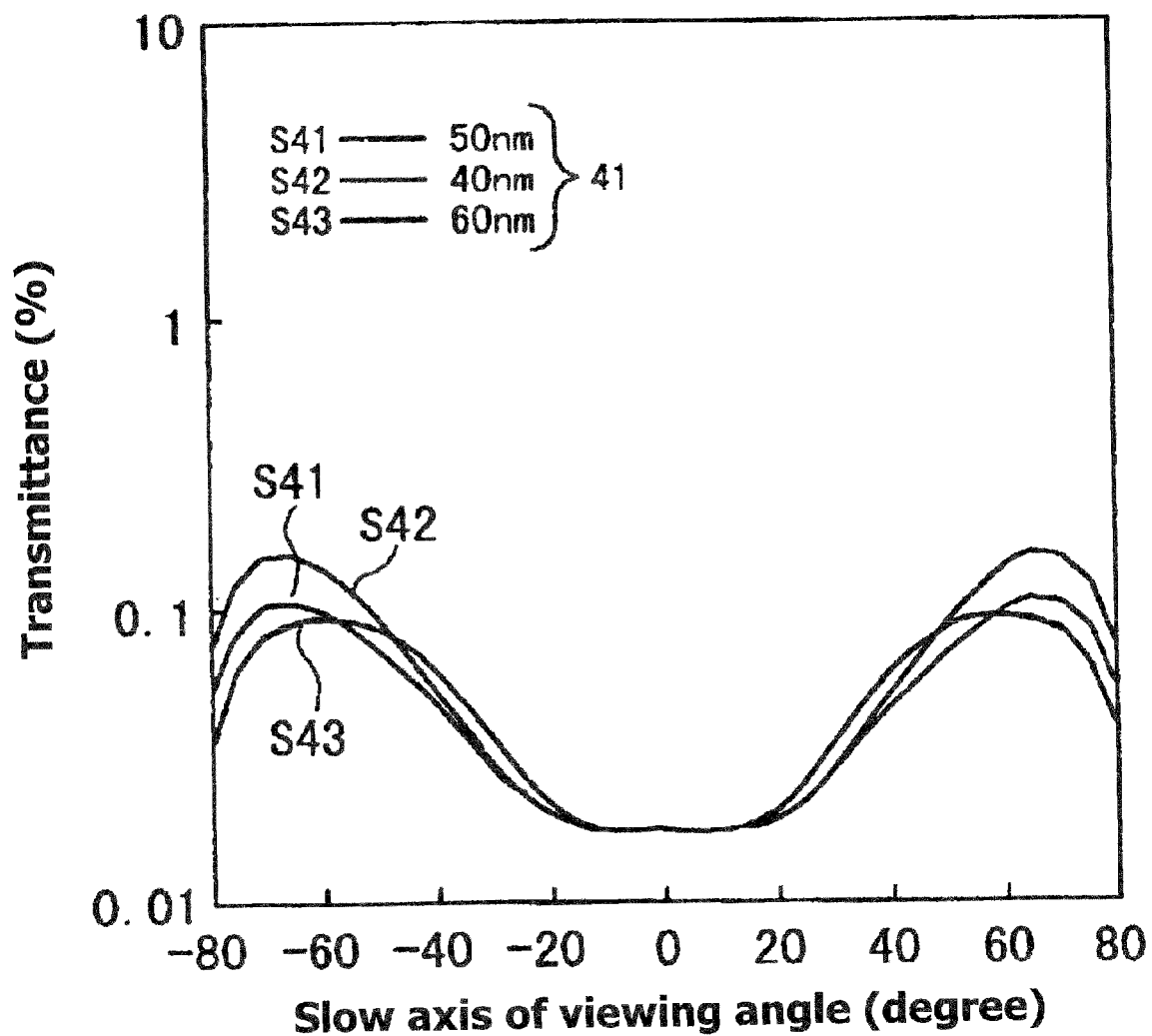
FIG. 31 is a graph showing simulation results of a change in a transmittance (optical leak) relative to a change in a viewing angle when Re of a second optical film of the liquid crystal display unit of the eighth embodiment.

FIG. 31 is a graph showing a change in a transmittance (optical leak) with respect to a viewing angle at the in-plane retardations Re of the second optical film of 50 nm (S41), 40 nm (S42) and 60 nm (S43). Re of all other optical films is 50 nm. It can be seen that even if Re of the second optical film changes in a range between 40 nm and 60 nm, a remarkable change in the viewing angle characteristics does not appear. Namely, even if Re of the second optical film has a variation of ±10 nm at the center of 50 nm, it can be considered that a significant change in the viewing angle characteristics will not occur. Similar simulations have been conducted also for the first, third and fourth optical films, and it has been found that influence upon the visual angle characteristics is small in each case. It can be considered that variation in a range of ±10 nm with respect to in-plane retardation Re of the optical film is allowable. The optical characteristics having a suppressed retardation variation of ±10 nm are called approximately the same optical characteristics.

A liquid crystal display device is actually manufactured and an exterior observation is conducted. A retardation Δnd of a liquid crystal cell is set to about 500 nm, each optical film is made of norbornene based COP, the retardations are set to Re=50 nm and Rth=90 nm. The optical films 40, 41, 42 and 43 are bonded at slow axis azimuths of 135°, 45°, 135° and 45°, respectively. It has been confirmed from the exterior observation that good background visual angle characteristics are obtained similar to the above-described simulations.

Reviews are conducted through simulation for the case that the retardation Δnd is set to 1500 nm which is considered optimum and the thickness direction retardation Rth of each optical film is set to 300 nm. Re is 50 nm similar to FIG. 26.

The slow axis azimuths of four optical films are set parallel or perpendicular to the absorption axes of the polarizers. More specifically, in sample S51, the slow axis azimuths of the optical films 40 to 43 are set to 45°, 45°, 135° and 135°, respectively. In sample S52, the slow axis azimuths of the optical films 40 to 43 are set to 45°, 135°, 45° and 135°, respectively. In sample S53, the slow axis azimuths of the optical films 40 to 43 are set to 135°, 45°, 135° and 45°, respectively.

Figure 32:
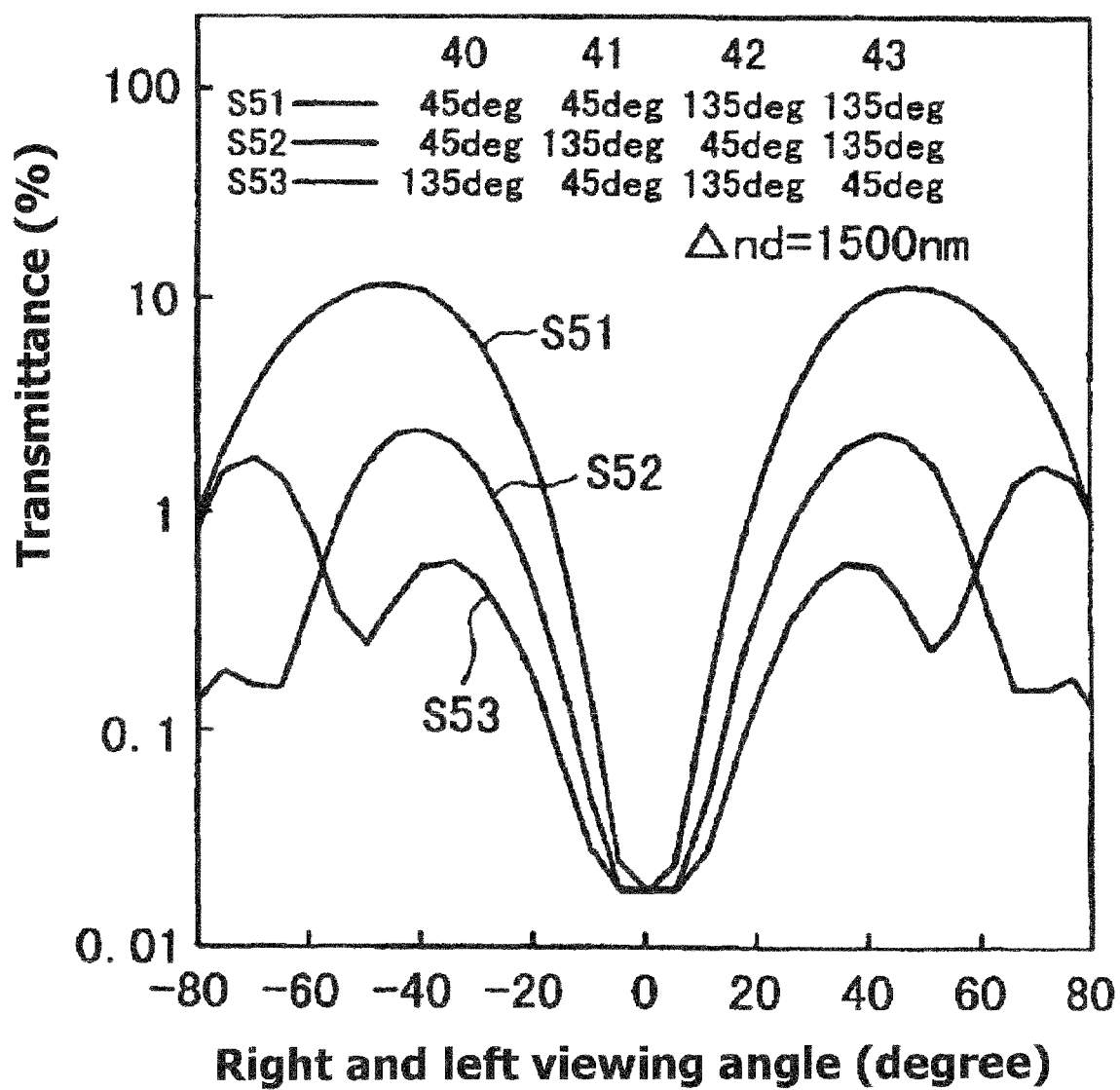
FIG. 32 is a graph showing simulation results of a change in a transmittance relative to a viewing angle in the case of Δnd=1500 nm and Rth=300 nm of the liquid crystal display unit of the eighth embodiment.

FIG. 32 is a graph showing simulation results of a transmittance with respect to a viewing angle, at Δnd=1500 nm and Rth=300 nm. The abscissa represents an inclination angle of −80° to +80° to the right and left of a viewing angle from a substrate normal direction, and the ordinate represents a transmittance in the unit of "%". A transmittance becomes lowest under the conditions of 135°, 45°, 135° and 45°. As compared to the characteristics of the sample S4 shown in FIG. 27, it can be understood that an angle range of a low transmittance becomes narrow. Since it is apparent that as the retardation Δnd of the liquid crystal cell increases, the transmittance at a deep viewing angle rises, it can be estimated that the maximum Δnd capable of obtaining good viewing angle characteristics is about 1500 nm.

A liquid crystal display device having the optical films with the optimum slow axis azimuths in the simulation is actually manufactured and an exterior observation is conducted. Similar to the simulation results, optical leak at a deep viewing angle is suppressed to some degree. As compared to Δnd=500 nm, it has been found that the degree of optical leak is considerably large.

Although the description uses the case that optical films are made of biaxial films, good viewing angle characteristics can be realized even if films having positive uniaxial optical anisotropy at Nz=1, so-called A plates, are used.

A total of thickness direction retardations Rth of all optical films preferably satisfies the following condition: 1·Δnd>total of Rth>0.5·Δnd with respect to the retardation Δnd of the liquid crystal cell.

In the above-described eighth embodiment, C plates are not used in view of cost reduction. C plates may be used in combination. As indicated by broken lines in FIG. 26, a C plate 45 may be inserted between the second optical film 41 and liquid crystal cell 20, a C plate 46 may be inserted between the liquid crystal cell 20 and third optical film 42, or both the C plates may be used.

[Ninth Embodiment]

Figure 33:
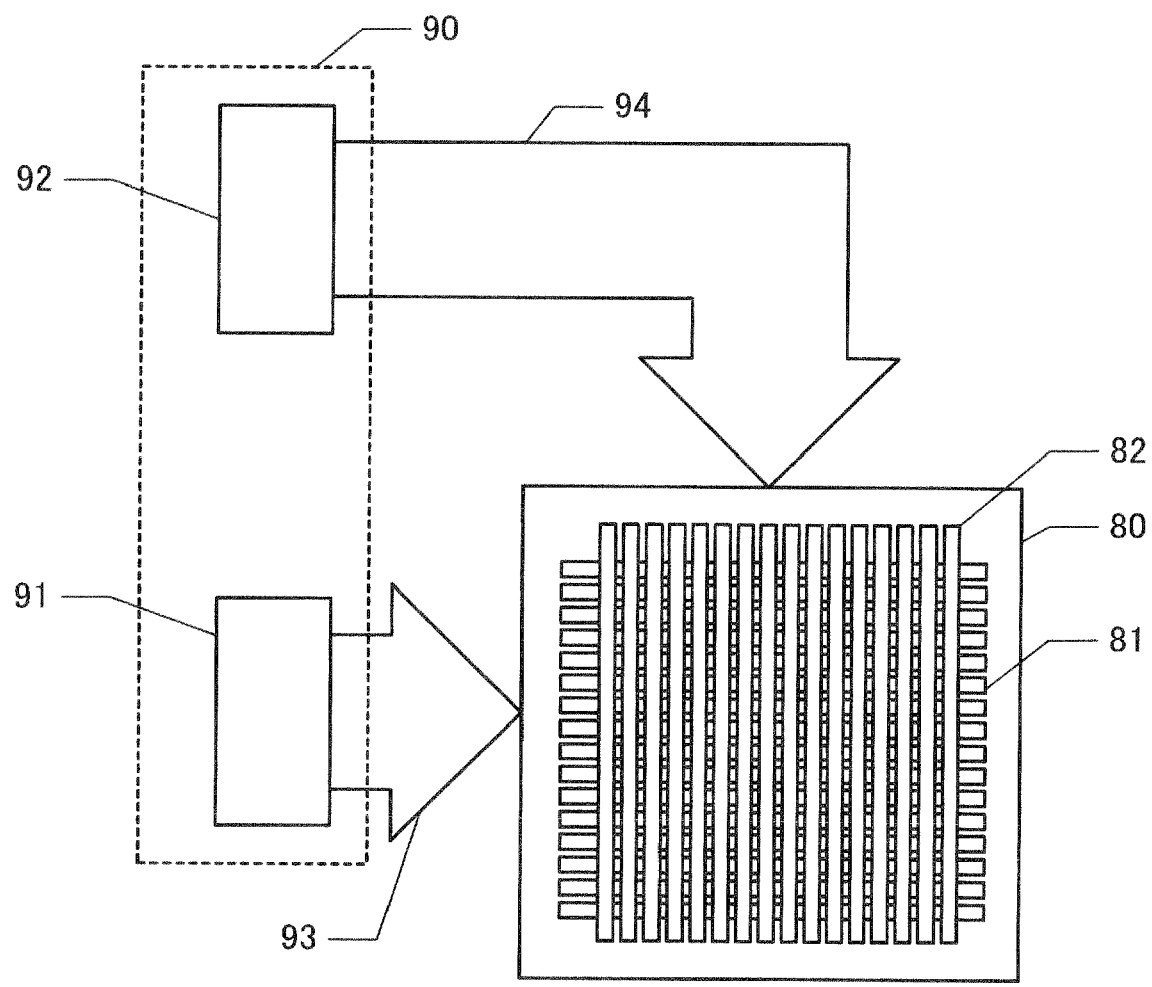
FIG. 33 is a block diagram of a liquid crystal display device.

FIG. 33 is a block diagram showing a display apparatus using the liquid crystal display unit of the first to eighth embodiments. A liquid crystal display unit 80 includes a plurality of common electrodes 81 disposed in parallel and a plurality of segment electrodes 82 disposed at a right angle relative to the common electrodes 81. A cross point of the common electrode 81 and segment electrode 82 constitutes a pixel.

A drive circuit 90 includes a segment output circuit 92 and a common output circuit 91. The common output circuit 91 supplies a common voltage to the common electrode 81 via a common bus 93. The segment output circuit 92 supplies a segment voltage to the segment electrode 82 via a segment but 94. The drive circuit 90 multiplex-drives the liquid crystal display unit 80. If a potential difference applied between the common electrode 81 and segment electrode 82 of a pixel is equal to or lower than an off-voltage, the pixel is a black state, whereas if the potential difference is higher than an on-voltage, the pixel is a white state.

By adopting the structure of the above-described embodiments for the liquid crystal display unit 80, the viewing angle characteristics of the black state can be improved.

The present invention has been described in connection with the preferred embodiments. The invention is not limited only to the above embodiments. It will be apparent to those skilled in the art that other various modifications, improvements, combinations, and the like can be made.

What are claimed are:

1. A liquid crystal display device comprising:
    first and second polarizers in cross Nichol configuration;
    a liquid crystal cell disposed between the first and second polarizers and establishing vertical alignment in a state of no voltage application;
    a first optical film disposed between the liquid crystal cell and the first polarizer and having optical anisotropy;
    a second optical film disposed between the first optical film and the liquid crystal cell and having optical anisotropy; and
    a third optical film disposed between the second polarizer and the liquid crystal cell and having optical anisotropy;
    wherein:
    each of the first to third optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is a direction perpendicular to a film surface, an in-plane retardation is larger than 0 nm and equal to or smaller than 300 nm, and a thickness direction retardation is equal to or larger than 50 nm and equal to or smaller than 300 nm;
    a slow axis of the first optical film is parallel to an absorption axis of the first polarizer;
    a slow axis of the second optical film and a slow axis of the third optical film are perpendicular to each other; and
    an angle between the slow axis of the second optical film and the absorption axis of the first polarizer is in a range between 75° and 105°.

2. The liquid crystal display device according to claim 1, wherein:
    a retardation of the liquid crystal cell is in a range between 550 nm and 1080 nm; and
    in-plane retardations of the first to third optical films are in a range between 30 nm and 70 nm.

3. The liquid crystal display device according to claim 1, wherein a total of thickness direction retardations of the first to third optical films falls in a range between 0.5 times and 1 time the retardation of the liquid crystal cell.

4. The liquid crystal display device according to claim 1, further comprising:
    a fourth optical film disposed between the second optical film and the liquid crystal cell or between the third optical film and the liquid crystal cell and having an in-plane retardation smaller than 7 nm and a thickness direction retardation equal to or larger than 50 nm and equal to or smaller than 300 nm,
    wherein a retardation of the liquid crystal cell is in a range between 460 nm and 1380 nm.

5. The liquid crystal display device according to claim 4, wherein a total of thickness direction retardations of the first to fourth optical films falls in a range between 0.5 times and 1 time the retardation of the liquid crystal cell.

6. The liquid crystal display device according to claim 1, further comprising fifth and sixth optical films disposed between the second optical film and the liquid crystal cell or between the third optical film and the liquid crystal cell and having optical anisotropy,
    wherein each of the fifth and sixth optical films satisfies nx>ny≧nz where nx, ny and nz are x-, y- and z-components of a refractive index in which an x-axis is an in-plane slow axis azimuth of each of the optical films, a y-axis is an in-plane azimuth perpendicular to the x-axis and a z-axis is a direction perpendicular to a film surface, an in-plane retardation of each of the fifth and sixth optical films is larger than 30 nm and equal to or smaller than 70 nm, a thickness direction retardation is equal to or larger than 50 nm and equal to or smaller than 300 nm, and a retardation of the liquid crystal cell is in a range between 510 nm and 1380 nm.

7. The liquid crystal display device according to claim 6, wherein a total of thickness direction retardations of the first to third optical films and the fifth and sixth optical films falls in a range between 0.5 times and 1 time the retardation of the liquid crystal cell.

8. The liquid crystal display device according to claim 1, wherein a difference between an in-plane retardation of each of the first to third optical films and an average of retardations of the first to third optical films is equal to or smaller than 10 nm.

* * * * *